(12) United States Patent
Buckingham et al.

(10) Patent No.: US 8,646,158 B2
(45) Date of Patent: *Feb. 11, 2014

(54) MULTI-PIVOT LATCH ASSEMBLIES

(75) Inventors: Fred Buckingham, Elkhart, IN (US); Mark E. Main, Bremen, IN (US)

(73) Assignee: AmSafe Commercial Products, Inc., Elkhart, IN (US)

( * ) Notice: Subject to any disclaimer, the term of this patent is extended or adjusted under 35 U.S.C. 154(b) by 470 days.

This patent is subject to a terminal disclaimer.

(21) Appl. No.: 12/775,268

(22) Filed: May 6, 2010

(65) Prior Publication Data

US 2010/0247230 A1 Sep. 30, 2010

Related U.S. Application Data

(63) Continuation-in-part of application No. 12/485,778, filed on Jun. 16, 2009, now Pat. No. 8,220,118, which is a continuation-in-part of application No. 12/415,906, filed on Mar. 31, 2009, now Pat. No. 8,291,555, which is a continuation-in-part of application No. 12/060,095, filed on Mar. 31, 2008, now Pat. No. 7,918,001.

(51) Int. Cl.
*F16B 45/02* (2006.01)

(52) U.S. Cl.
USPC ........................................ 24/599.1; 24/599.3

(58) Field of Classification Search
USPC ............ 24/599.1, 599.3, 598.7, 598.4, 598.1, 24/637–639, 641, 642, 645, 654, 651, 24/601.5; 292/215; 297/485, 250.1, 253
See application file for complete search history.

(56) References Cited

U.S. PATENT DOCUMENTS

| | | | |
|---|---|---|---|
| 805,674 A | 11/1905 | Senderling |
| 820,383 A | 5/1906 | Ashland |
| 867,162 A | 9/1907 | Seidl |
| 940,917 A | 11/1909 | Asquith |
| 1,171,380 A | 2/1916 | Arthur |
| 1,299,821 A | 4/1919 | Carpmill et al. |
| 1,397,237 A | 11/1921 | Schenk |
| 2,124,276 A | 7/1938 | Steigenberger |

(Continued)

FOREIGN PATENT DOCUMENTS

| | | |
|---|---|---|
| CA | 2450995 A1 | 2/2003 |
| CA | 2522705 A1 | 11/2004 |

(Continued)

OTHER PUBLICATIONS

U.S. Appl. No. 60/307,899, filed Jul. 26, 2001, Woodard.

(Continued)

*Primary Examiner* — Robert J Sandy
(74) *Attorney, Agent, or Firm* — Perkins Coie LLP

(57) ABSTRACT

Latch assemblies for releasably engaging anchor members and other attachment points in vehicles are disclosed herein. A latch assembly configured in accordance with one embodiment of the disclosure includes a latch and an ejector movably coupled to a frame. In some embodiments, a biasing member urges the ejector toward a position that holds the latch in a first or open position prior to attachment to an anchor member. When the anchor member presses against the ejector, the biasing member causes the ejector to rotate latch from the first or open position to a second position about a first pivot point, and then from the second position to a third or fully closed position about a second pivot point.

22 Claims, 42 Drawing Sheets

(56) References Cited

U.S. PATENT DOCUMENTS

| | | | |
|---|---|---|---|
| 2,393,551 A | 1/1946 | Morin | |
| 2,398,947 A | 4/1946 | Marinsky | |
| 2,549,841 A | 4/1951 | Morrow et al. | |
| 2,763,451 A | 9/1956 | Moran | |
| 2,856,663 A | 10/1958 | Elsner | |
| 2,938,254 A | 5/1960 | Gaylord | |
| 3,013,517 A | 12/1961 | Isham | |
| 3,128,520 A | 4/1964 | Carter et al. | |
| 3,414,947 A | 12/1968 | Holmberg et al. | |
| 3,540,091 A | 11/1970 | Marosy | |
| 3,675,499 A | 7/1972 | Marosy | |
| 4,027,361 A | 6/1977 | Yoneya | |
| 4,136,422 A | 1/1979 | Ivanov et al. | |
| 4,184,234 A | 1/1980 | Anthony et al. | |
| 4,419,874 A | 12/1983 | Brentini et al. | |
| 4,487,588 A | 12/1984 | Lewis, III et al. | |
| 4,525,901 A | 7/1985 | Krauss | |
| 4,542,563 A | 9/1985 | Befort | |
| 4,606,577 A | 8/1986 | Hirama et al. | |
| 4,660,889 A | 4/1987 | Anthony et al. | |
| 4,685,177 A | 8/1987 | Escaravage | |
| 4,721,338 A | 1/1988 | Kondo | |
| 4,876,770 A | 10/1989 | Bougher | |
| 4,919,484 A | 4/1990 | Bougher et al. | |
| 4,925,221 A | 5/1990 | Carmody et al. | |
| 5,005,266 A | 4/1991 | Fister et al. | |
| 5,005,267 A | 4/1991 | Sugimoto | |
| 5,031,962 A | 7/1991 | Lee | |
| 5,377,386 A | 1/1995 | Griffith | |
| 5,430,914 A | 7/1995 | Patterson et al. | |
| 5,466,044 A | 11/1995 | Barley et al. | |
| 5,471,714 A | 12/1995 | Olson et al. | |
| 5,487,588 A | 1/1996 | Burleigh et al. | |
| 5,524,965 A | 6/1996 | Barley | |
| 5,568,676 A | 10/1996 | Freeman | |
| 5,669,663 A | 9/1997 | Feuerherdt | |
| 5,695,243 A | 12/1997 | Anthony et al. | |
| 5,774,947 A | 7/1998 | Anscher | |
| 5,779,319 A | 7/1998 | Merrick | |
| 5,816,651 A | 10/1998 | Feuerherdt | |
| 5,890,762 A | 4/1999 | Yoshida | |
| 5,915,630 A | 6/1999 | Step | |
| 5,918,934 A | 7/1999 | Siegrist | |
| 5,941,601 A | 8/1999 | Scott et al. | |
| 5,979,982 A | 11/1999 | Nakagawa | |
| 6,017,087 A | 1/2000 | Anthony et al. | |
| 6,030,046 A | 2/2000 | Dorow | |
| 6,082,819 A | 7/2000 | Jackson | |
| 6,183,044 B1 | 2/2001 | Koyanagi et al. | |
| 6,193,310 B1 | 2/2001 | Batalaris et al. | |
| 6,209,957 B1 | 4/2001 | Baloga et al. | |
| 6,234,572 B1 | 5/2001 | Shiino et al. | |
| 6,276,754 B1 | 8/2001 | Youssef-Agha et al. | |
| 6,400,145 B1 | 6/2002 | Chamings et al. | |
| 6,419,199 B1 | 7/2002 | Skofljanec et al. | |
| 6,425,632 B1 | 7/2002 | Anthony et al. | |
| 6,494,535 B2 | 12/2002 | Galbreath | |
| 6,510,593 B1 | 1/2003 | Kim | |
| 6,566,869 B2 | 5/2003 | Chamings et al. | |
| 6,669,288 B2 | 12/2003 | Yoshida et al. | |
| 6,796,610 B2 | 9/2004 | Nakagawa et al. | |
| 6,820,310 B2 | 11/2004 | Woodard et al. | |
| 6,948,219 B2 | 9/2005 | Kakuda et al. | |
| 6,962,394 B2 | 11/2005 | Anthony et al. | |
| 7,073,233 B2 | 7/2006 | Leva et al. | |
| 7,152,926 B2 | 12/2006 | Wrobel | |
| 7,246,854 B2 | 7/2007 | Dingman et al. | |
| 7,278,684 B2 | 10/2007 | Boyle | |
| 7,353,572 B2 | 4/2008 | Claus et al. | |
| D610,036 S | 2/2010 | Balensiefer, II | |
| 7,810,220 B2 | 10/2010 | Anthony et al. | |
| 7,862,124 B2 | 1/2011 | Dingman | |
| 8,291,555 B2 * | 10/2012 | Buckingham et al. | 24/599.1 |
| 2003/0197415 A1 | 10/2003 | Dingman | |
| 2004/0007909 A1 | 1/2004 | Bonk | |
| 2004/0195900 A1 | 10/2004 | The et al. | |
| 2004/0208692 A1 | 10/2004 | Anthony et al. | |
| 2006/0186675 A1 | 8/2006 | Suzumura et al. | |
| 2006/0250013 A1 | 11/2006 | Shao | |
| 2007/0067970 A1 * | 3/2007 | Claus et al. | 24/599.9 |
| 2009/0241305 A1 | 10/2009 | Buckingham | |
| 2009/0243310 A1 | 10/2009 | Buckingham | |
| 2009/0250946 A1 | 10/2009 | Buckingham | |
| 2010/0013282 A1 | 1/2010 | Balensiefer | |
| 2011/0243653 A1 | 10/2011 | Buckingham et al. | |

FOREIGN PATENT DOCUMENTS

| | | |
|---|---|---|
| DE | 19848231 A1 | 8/1999 |
| DE | 19946579 A1 | 4/2001 |
| EP | 0560184 A1 | 9/1993 |
| EP | 0566856 A1 | 10/1993 |
| EP | 0619201 A1 | 10/1994 |
| EP | 0619202 A1 | 10/1994 |
| EP | 0646491 A1 | 4/1995 |
| EP | 0703113 A2 | 3/1996 |
| EP | 0714806 A2 | 6/1996 |
| EP | 0841209 A1 | 5/1998 |
| EP | 0952032 A2 | 10/1999 |
| EP | 0970842 A1 | 1/2000 |
| EP | 982182 A1 | 3/2000 |
| EP | 1059194 A1 | 12/2000 |
| EP | 1099602 A1 | 5/2001 |
| EP | 1231100 A1 | 8/2002 |
| EP | 1414680 A1 | 5/2004 |
| EP | 1439977 A2 | 7/2004 |
| EP | 1472949 A1 | 11/2004 |
| EP | 1628525 A2 | 3/2006 |
| FR | 2782483 A1 | 2/2000 |
| GB | 2055952 A | 3/1981 |
| GB | 2346083 A | 8/2000 |
| GB | 2349813 A | 11/2000 |
| GB | 2365916 A | 2/2002 |
| JP | 2002012069 A | 1/2002 |
| WO | WO-03010024 A2 | 2/2003 |
| WO | WO-03010035 A1 | 2/2003 |
| WO | WO-2004093533 A2 | 11/2004 |
| WO | WO-2009009789 A1 | 1/2009 |
| WO | WO2009/124084 | 10/2009 |
| WO | WO-2010114571 A1 | 10/2010 |
| WO | WO2010147723 | 10/2010 |

OTHER PUBLICATIONS

U.S. Appl. No. 60/394,099, filed Jul. 5, 2002, Woodard.
"SafeGuard Buckle Up With Confidence," IMMI, 2002, 12 pages.
"SafeGuard Child Protection, Seat Attachment Systems," Brochure, IMMI, 2001, 5 pages.
"SafeGuard Child Seat Attachment Systems," IMMI, 1999, 2 pages.
Holmbergs, Isofix Connector C2, http://www.holmbergs.se/1/1.0.1.0/47/1/ [accessed May 21, 2010], 2 pages.
International Organization for Standardization (ISO), Draft Report of the 18th meeting of WG 1 held on Nov. 10 and 11, 1997 in Orlando, Florida, 11 pages.
International Search Report and Written Opinion for PCT/US2009/039019; Applicant: AmSafe Commercial Products, Inc.; Mailed on May 26, 2009, 12 pages.
International Search Report and Written Opinion for PCT/US2009/047559; Applicant: AmSafe Commercial Products, Inc.; Mailed on Aug. 7, 2009, 10 pages.
Novarace, EU ISOFIX, http://www.novarace.com/index.php?option=com_content&task=view&id=42&Itemid=62 [accessed May 21, 2010], 1 page.
Novarace, NOVAFIX, http://www.novarace.com/index.php?option=com_content&task=view&id=43&Itemid=51 [accessed May 21, 2010], 1 page.
Sabelt Racing Seatbelts and Accessories, http://childsafety.sabelt.com/index.php/eshop/category/Sabelt-Racing-Seatbelts-and-Accessories.html?a=/1/frmCatID/290/ [accessed May 21, 2010], 3 pages.
Holmbergs, ISOFIX—Connectors, Oct. 18, 2010, 1 page.

(56) References Cited

OTHER PUBLICATIONS

International Search Report and Written Opinion for PCT/US2011/032339. Applicant: AmSafe Commercial Products, Inc., Mailing Date Jul. 22, 2011, 7 pages.
Non-Final Office Action; U.S. Appl. No. 12/415,906, Mailing Date Oct. 11, 2011, 24 pages.
Non-Final Office Action; U.S. Appl. No. 12/060,095, Mailing Date Dec. 27, 2010, 20 pages.
Final Office Action; U.S. Appl. No. 12/415,906, Mar. 29, 2012, 7 pages.
Non-Final Office Action; U.S. Appl. No. 12/485,778, Dec. 9, 2011, 10 pages.

* cited by examiner

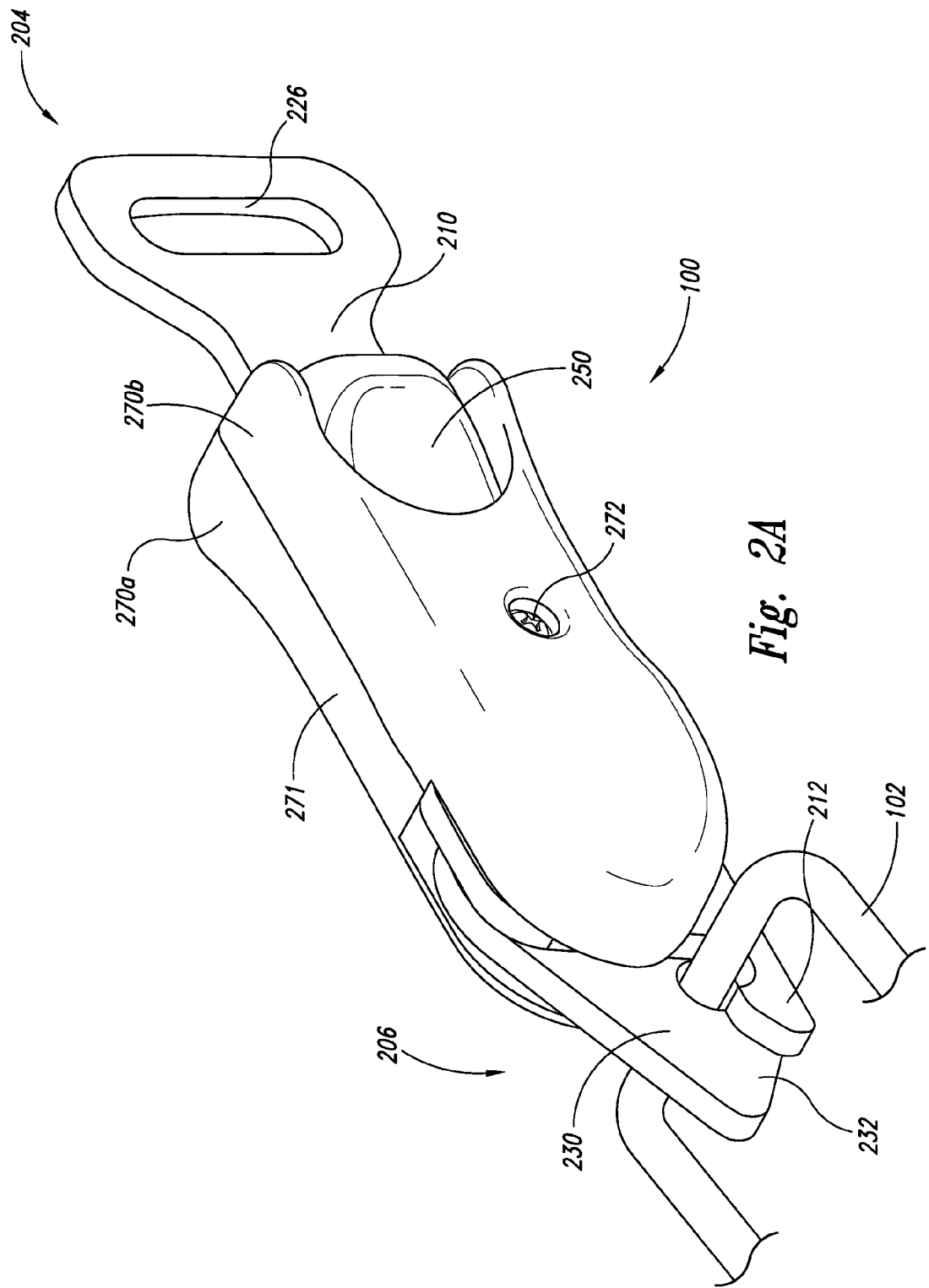

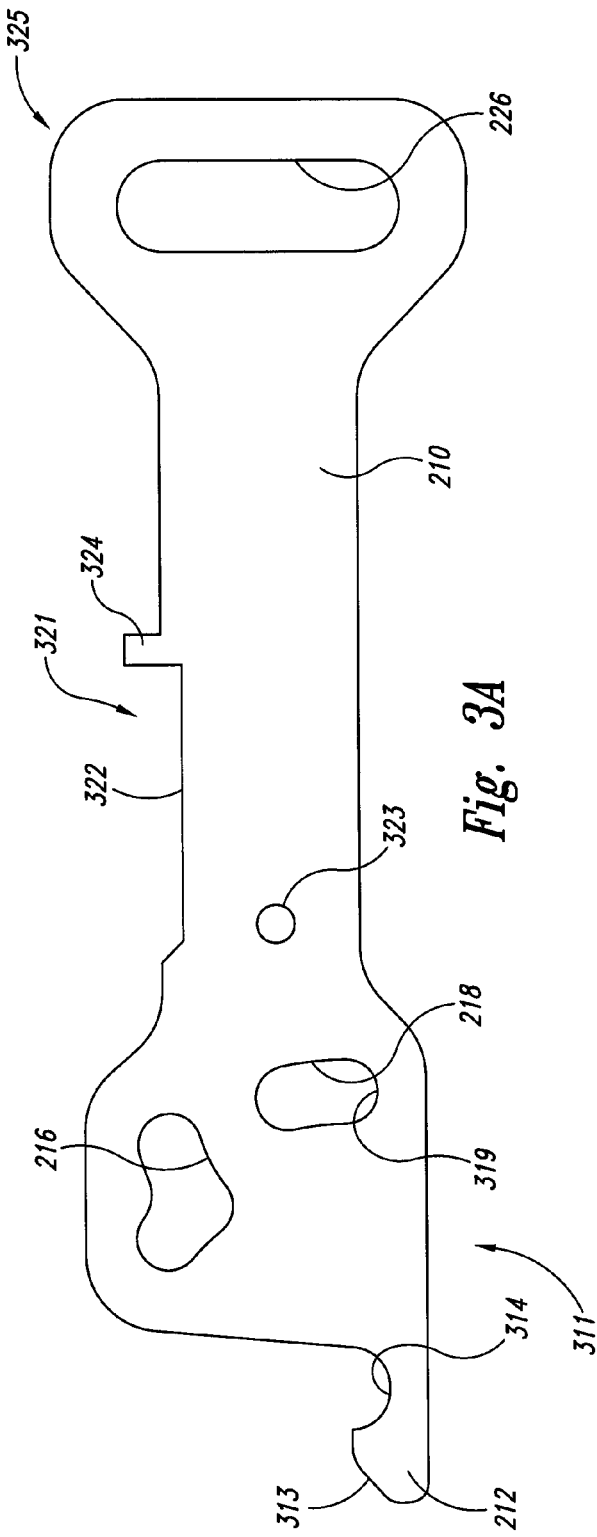
*Fig. 3A*
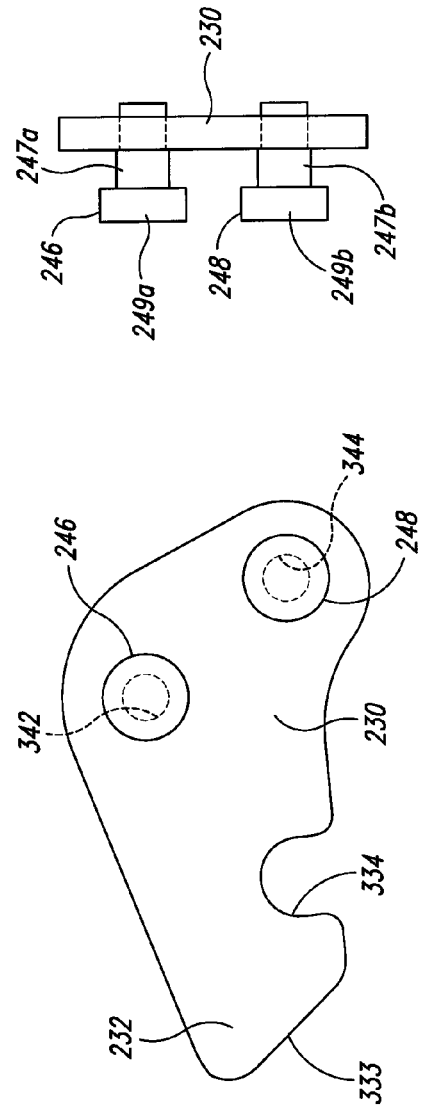
*Fig. 3B*
*Fig. 3C*

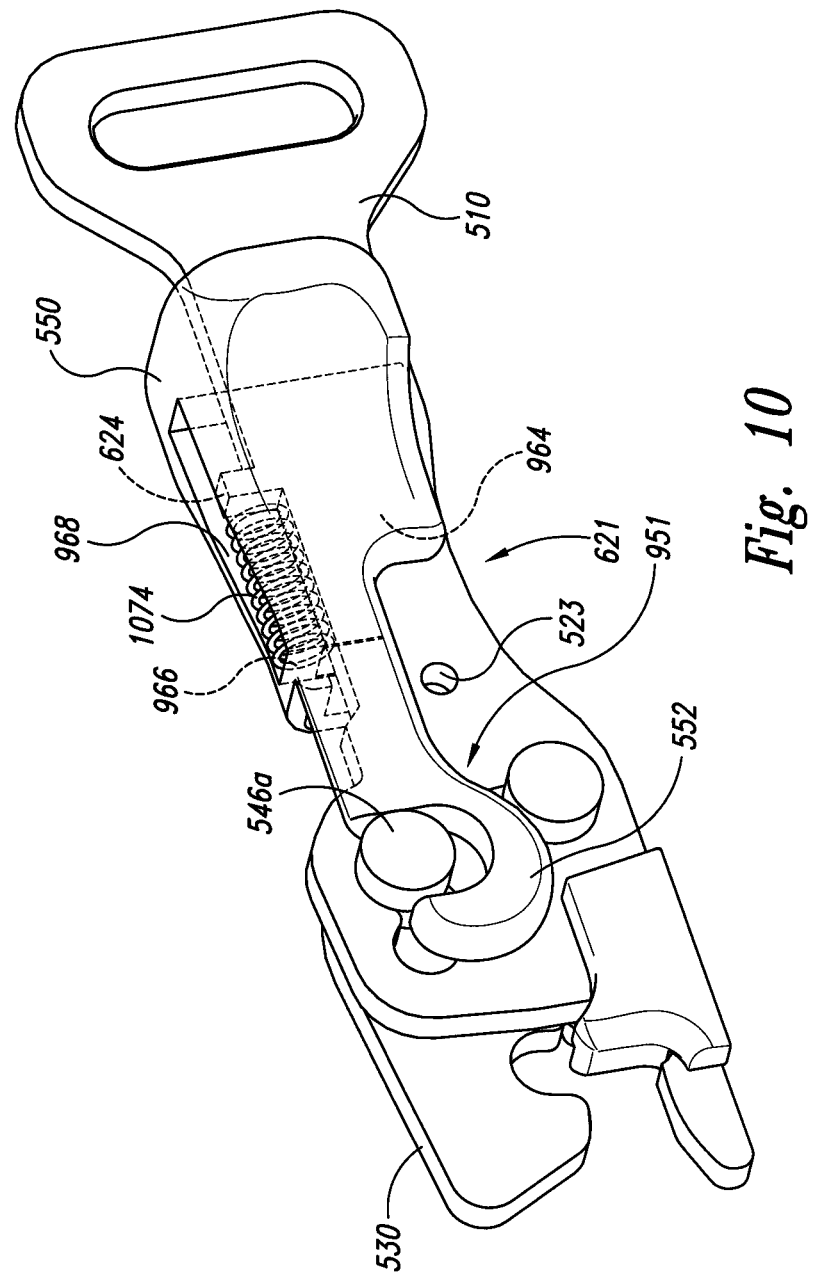

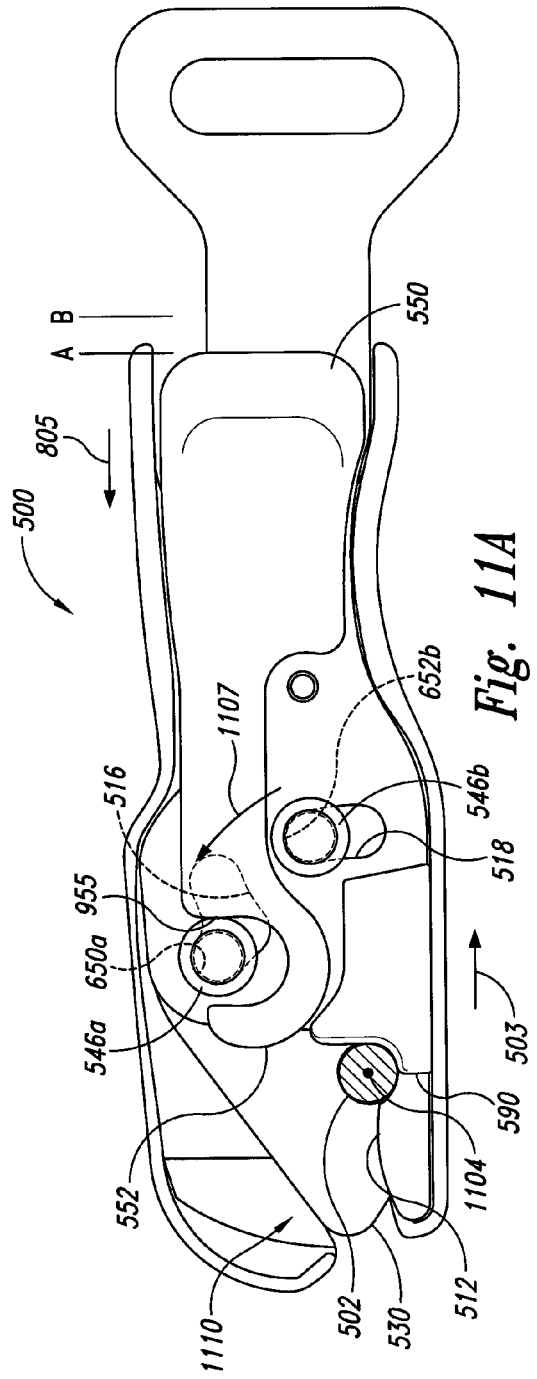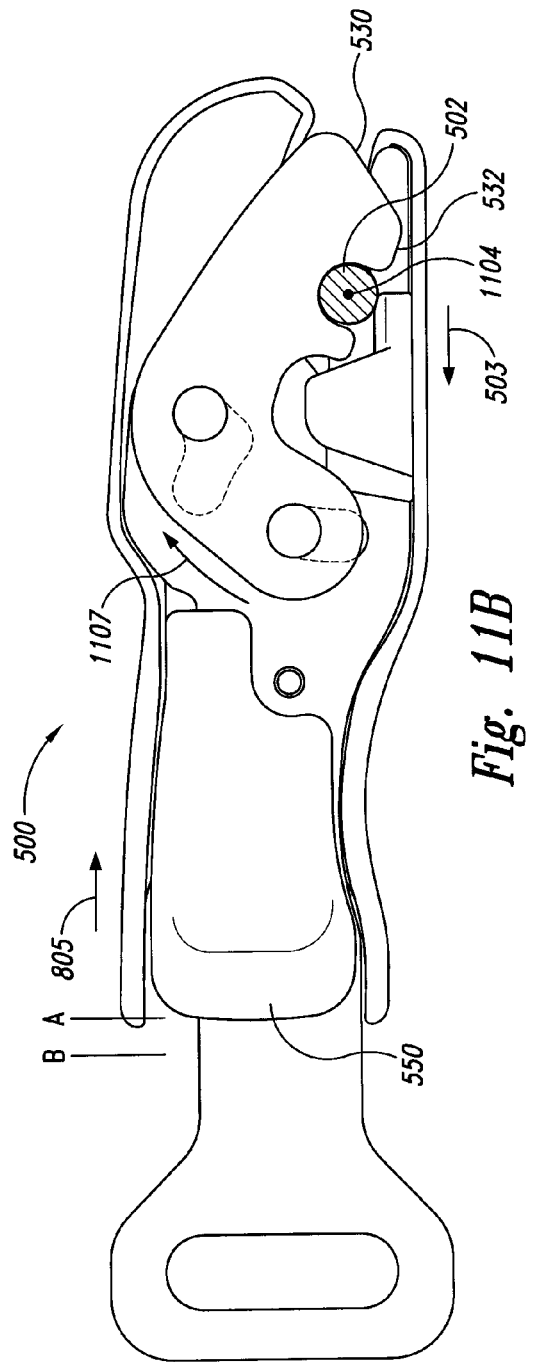
Fig. 11A
Fig. 11B

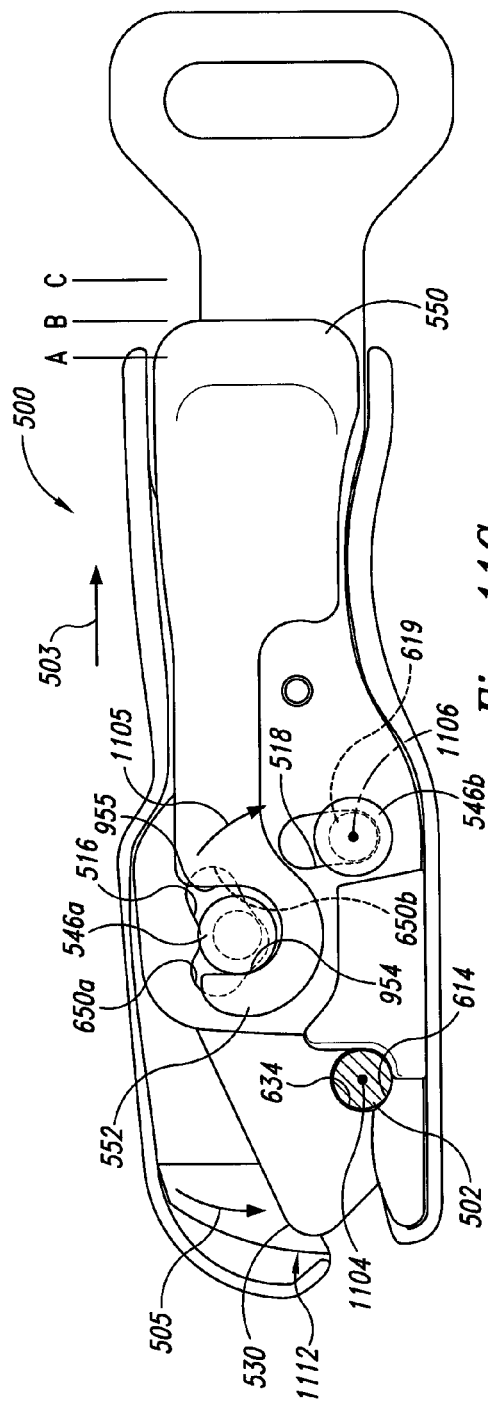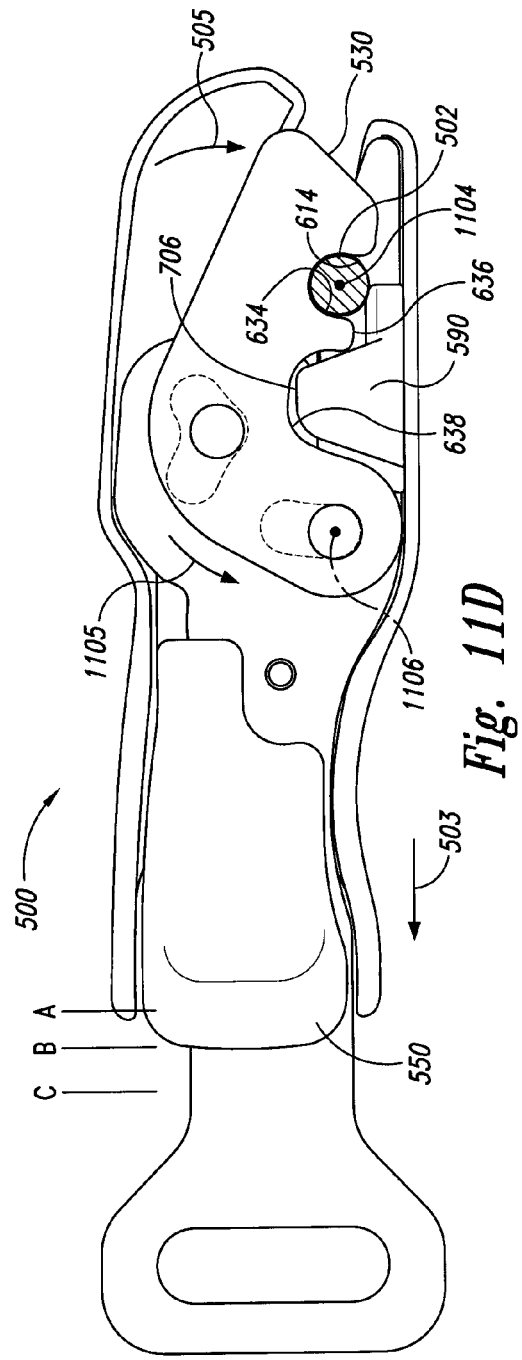
Fig. 11C
Fig. 11D

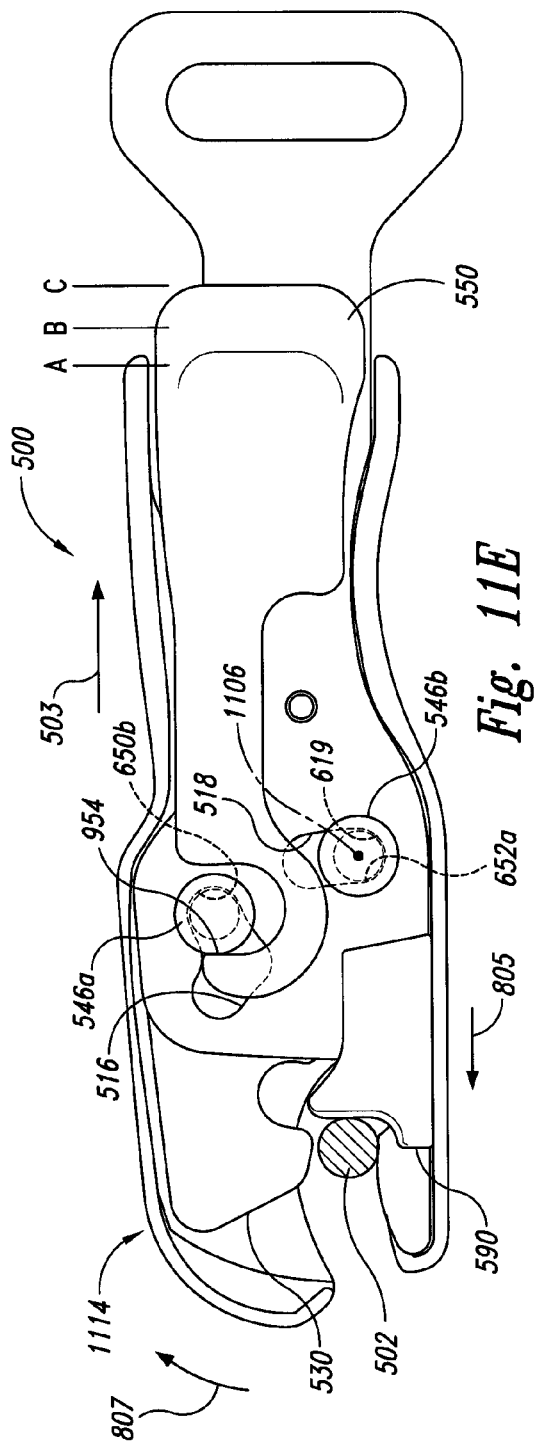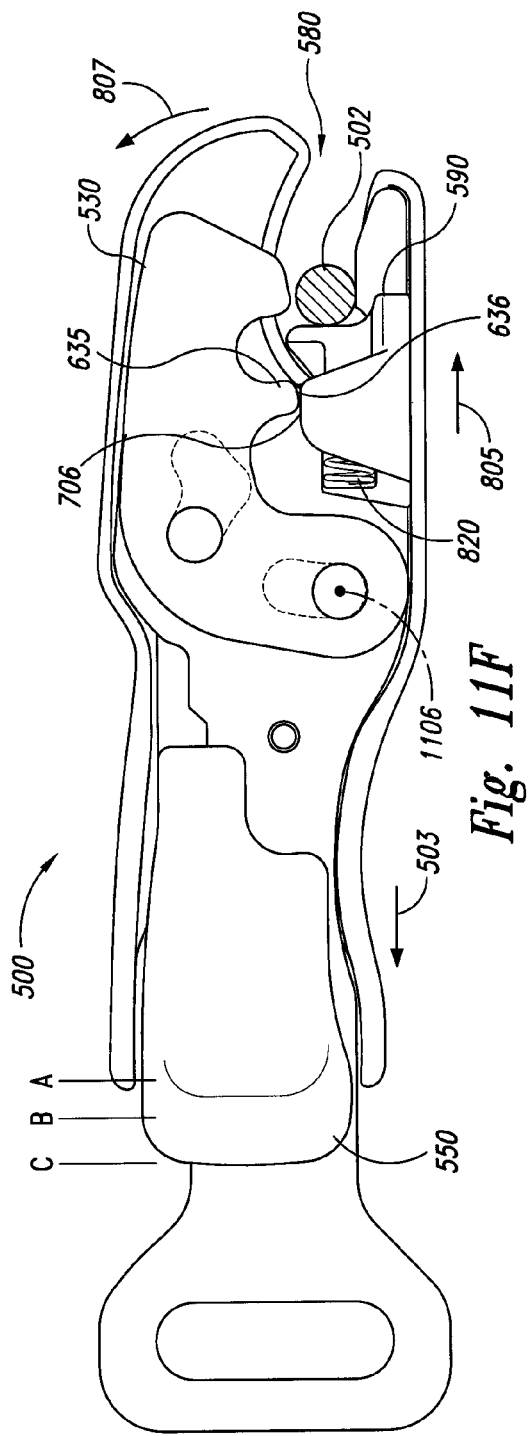

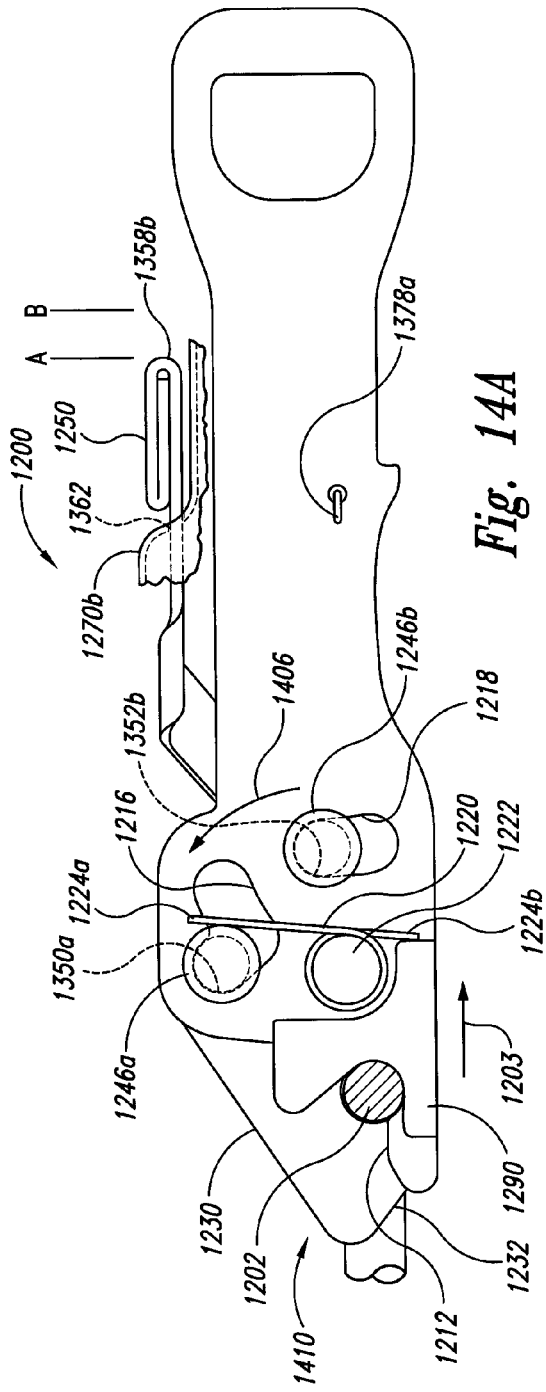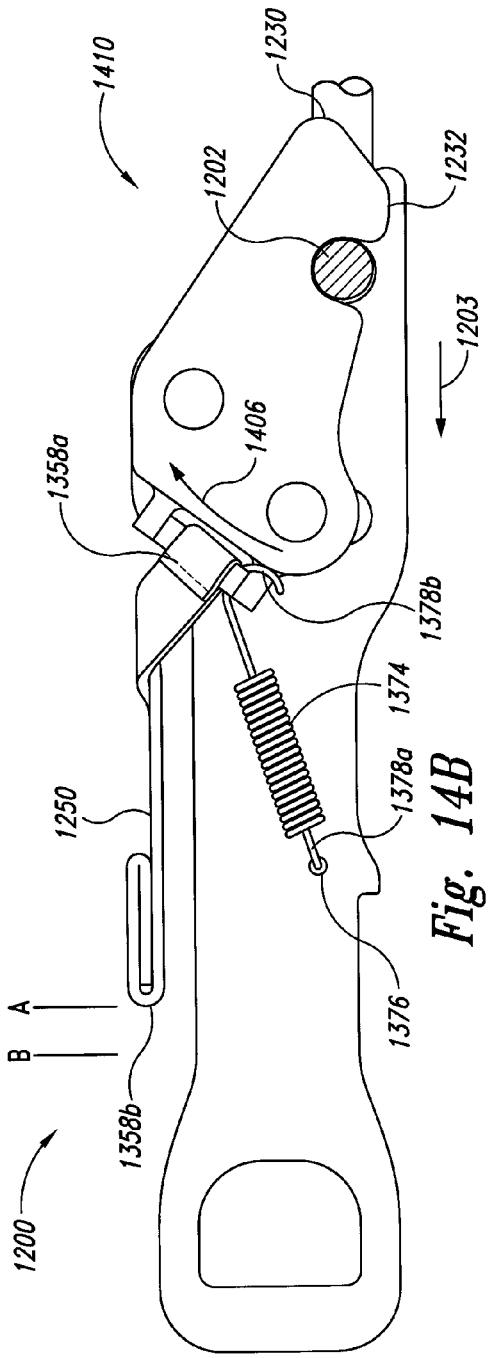
Fig. 14A
Fig. 14B

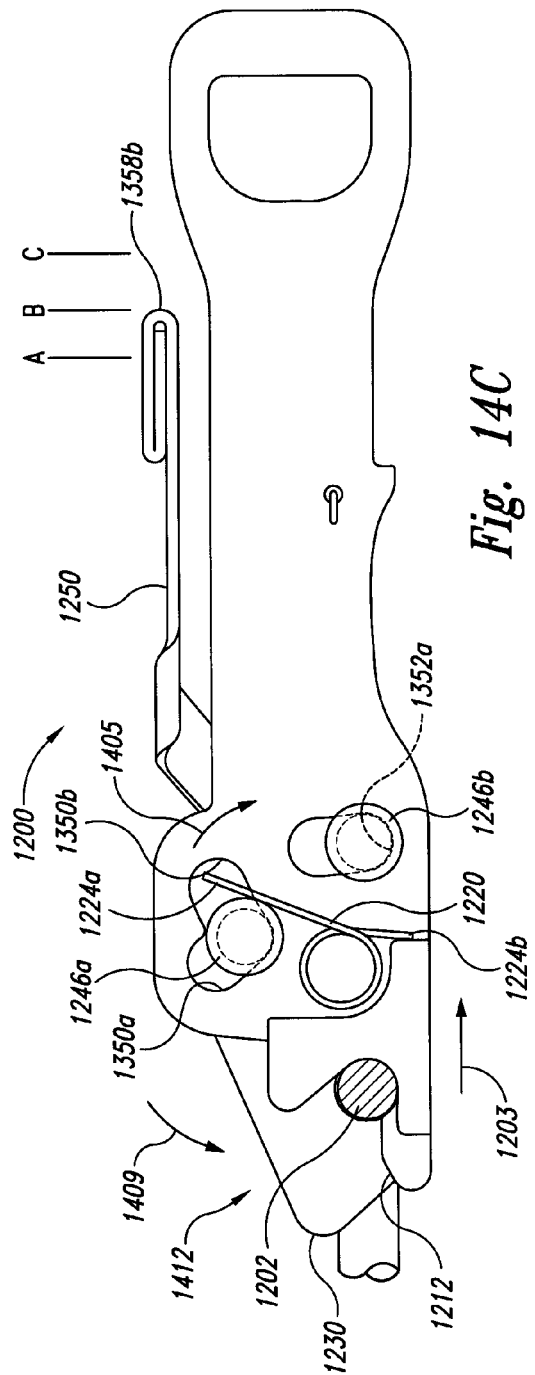
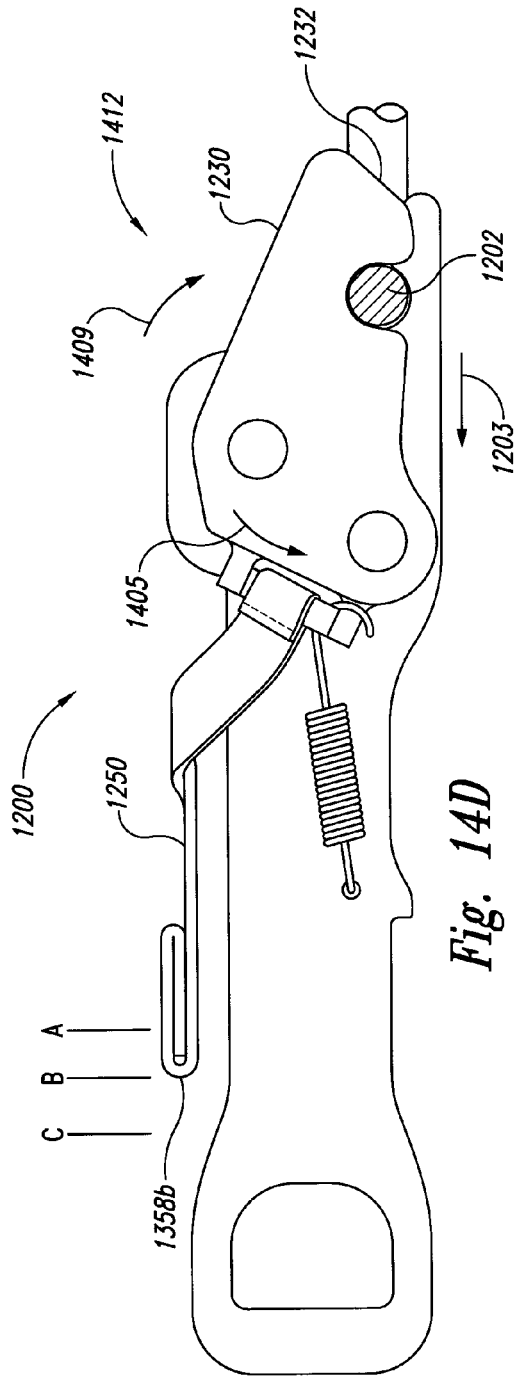
Fig. 14C
Fig. 14D

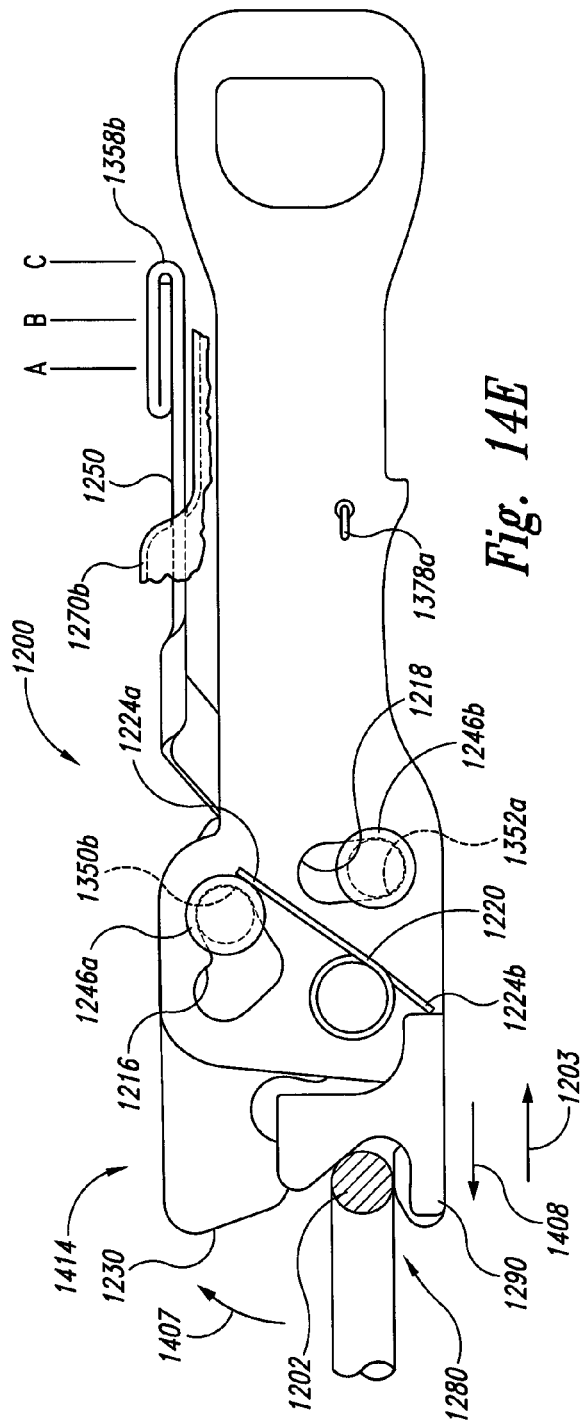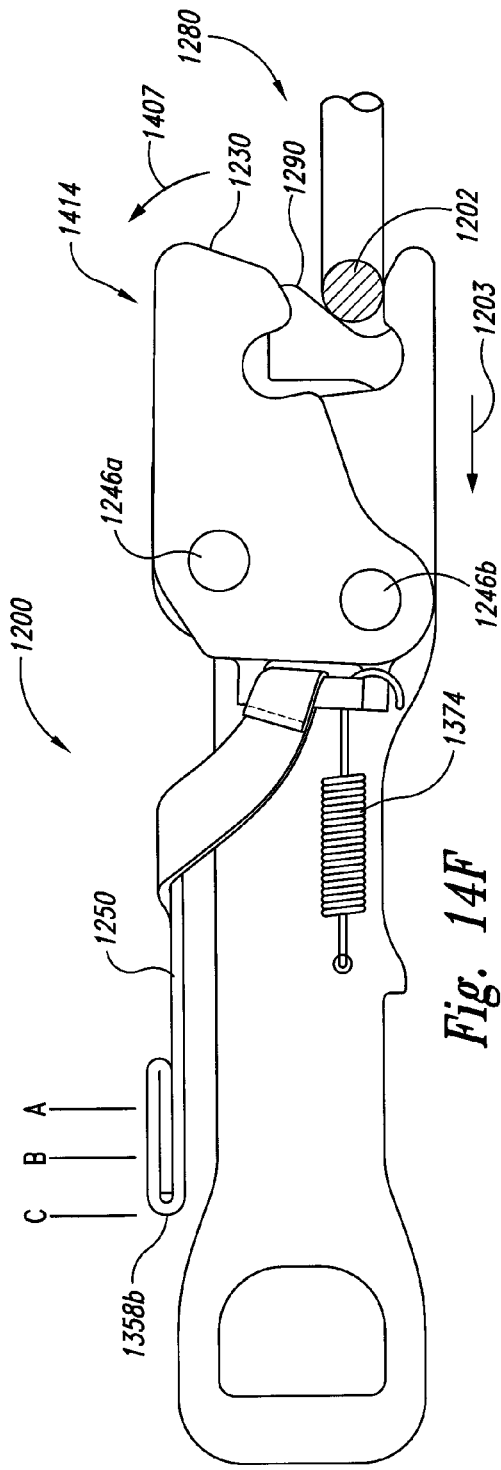

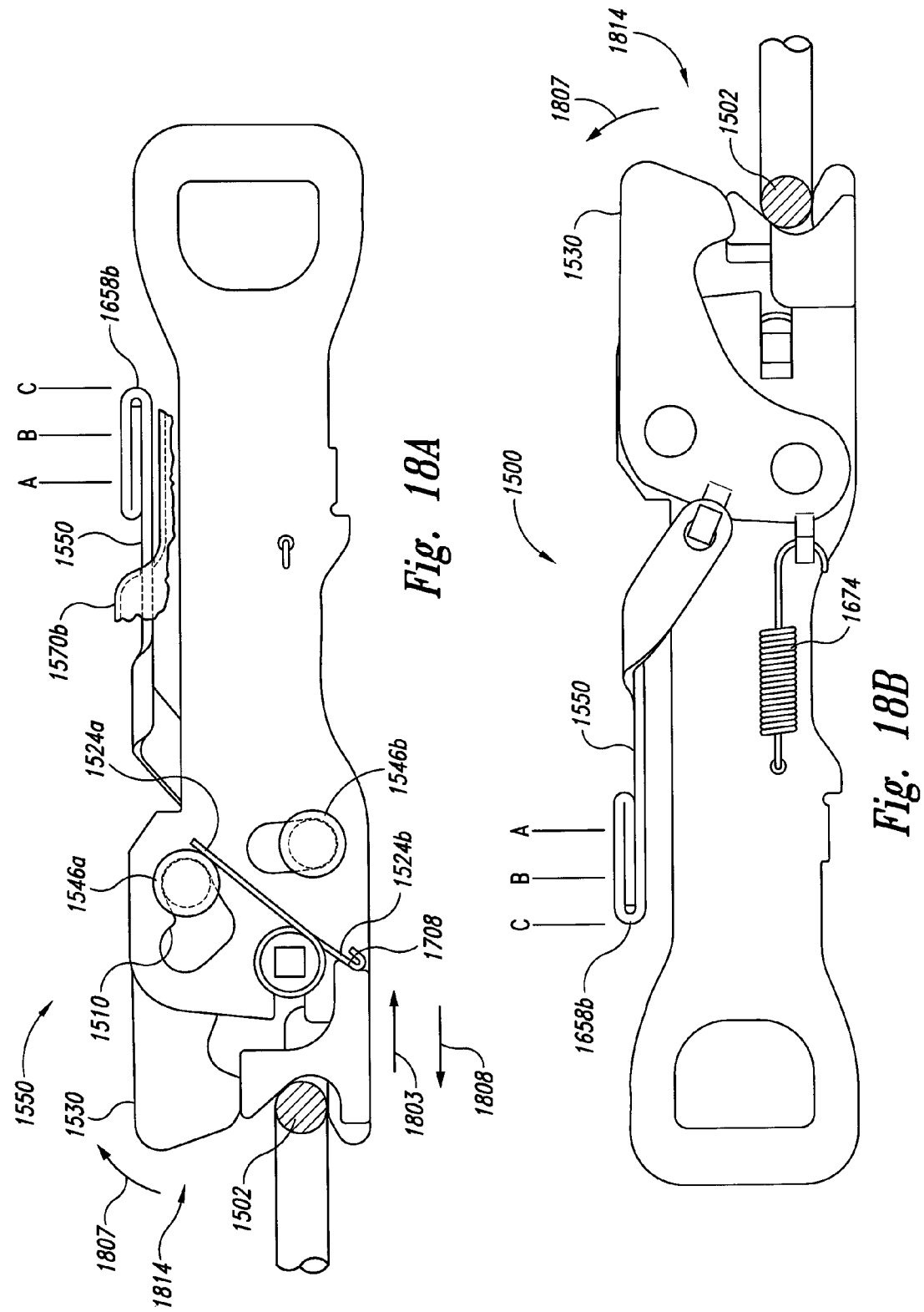

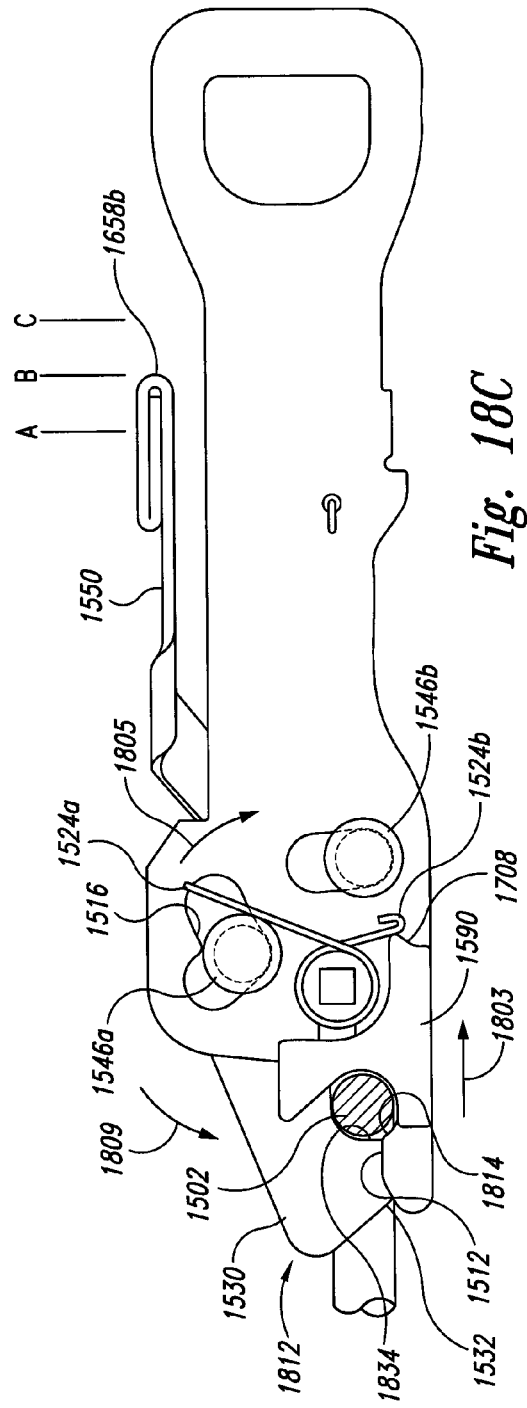
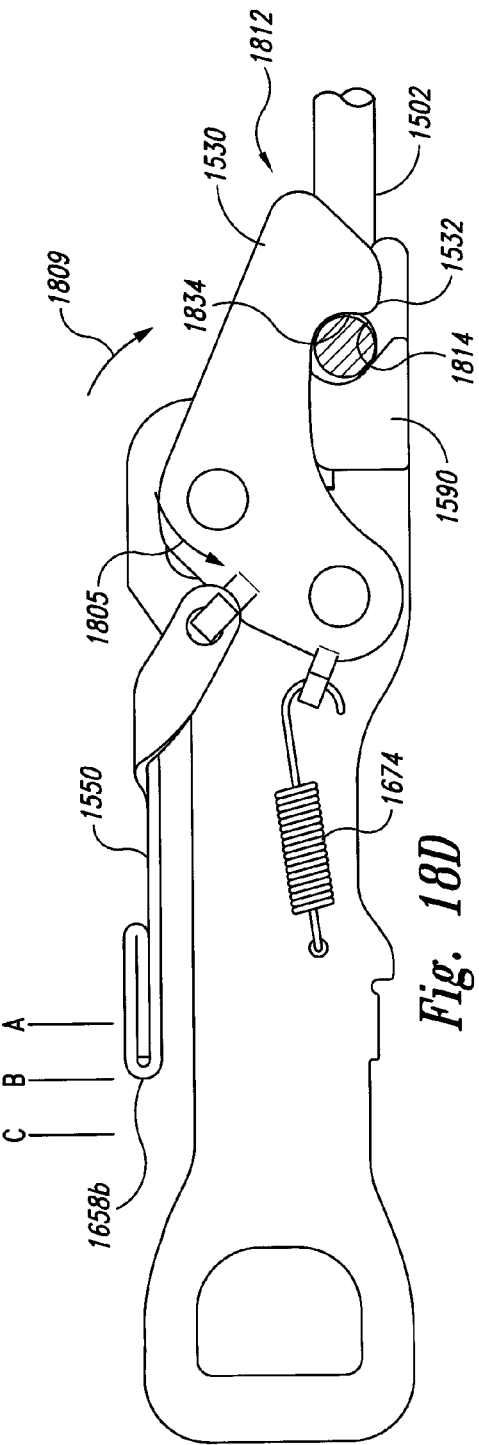

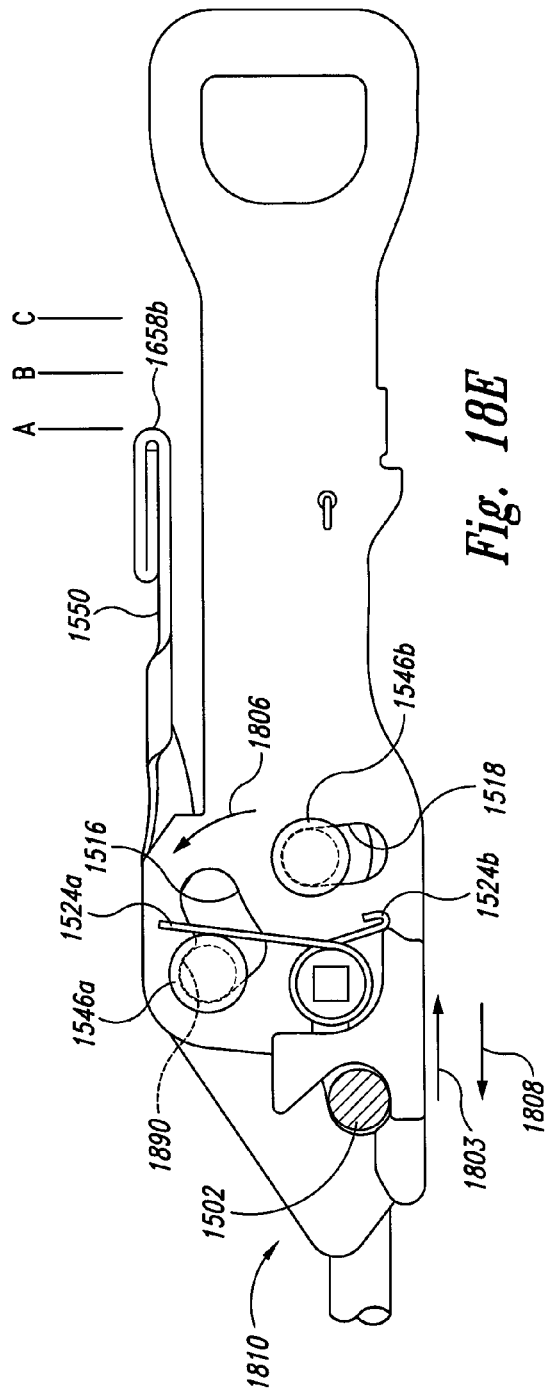
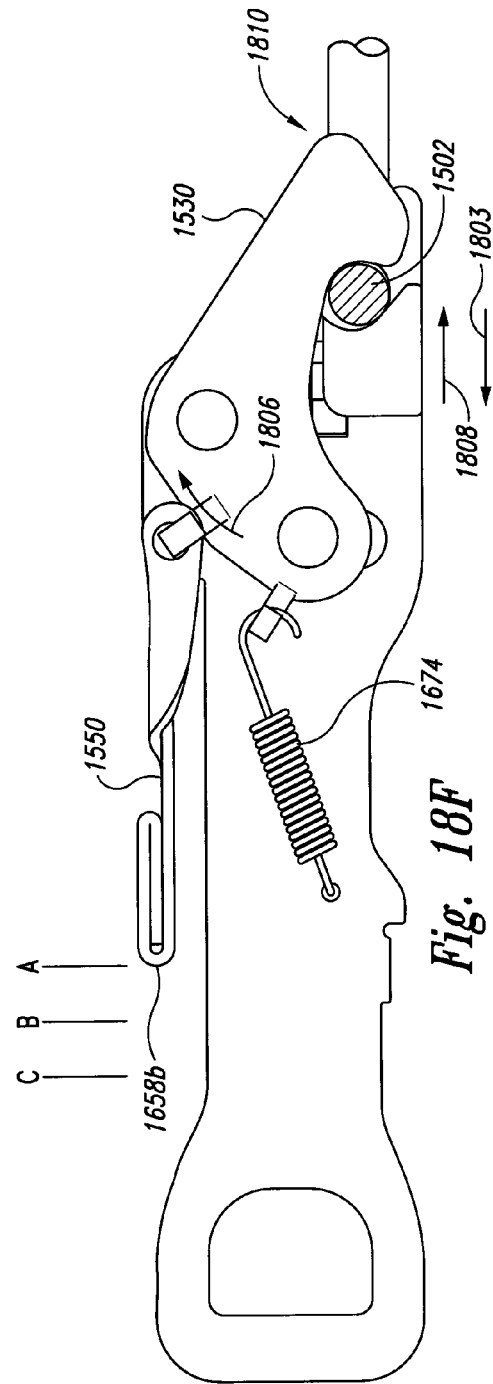

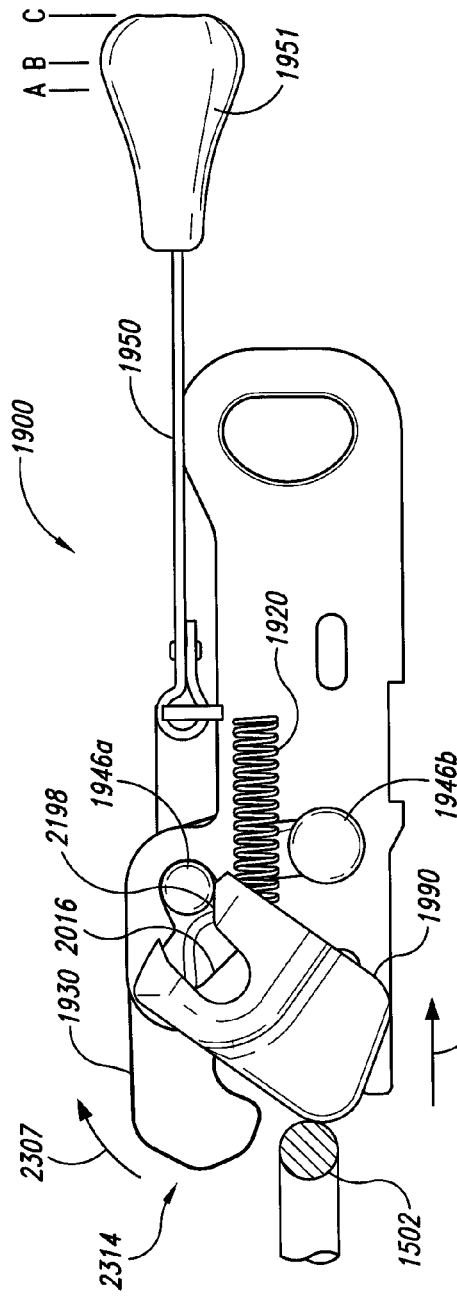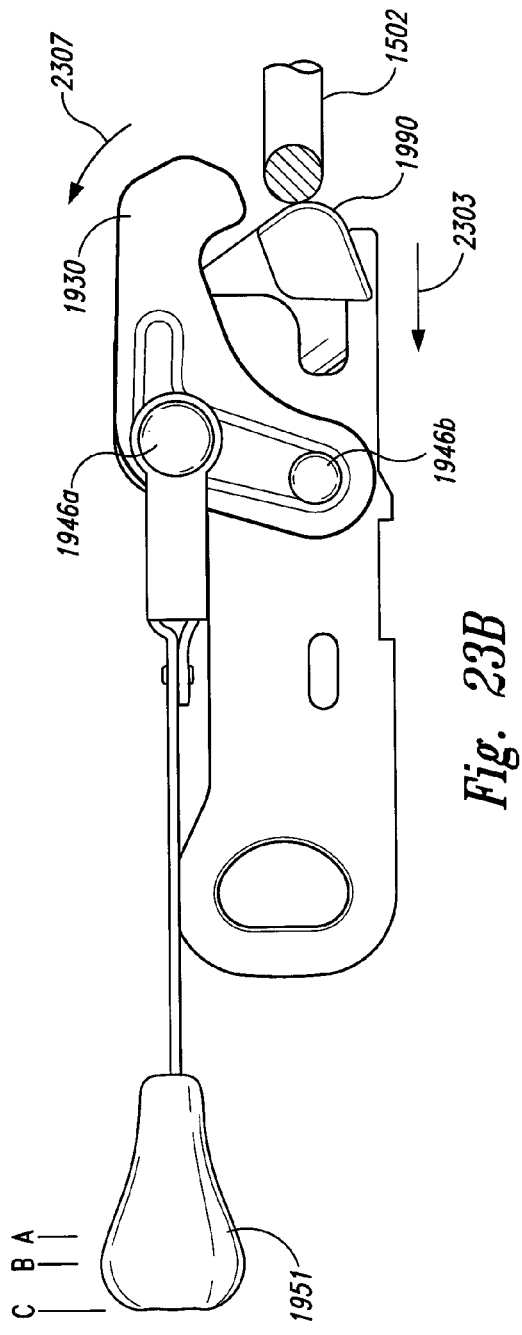
Fig. 23A
Fig. 23B

MULTI-PIVOT LATCH ASSEMBLIES

CROSS REFERENCE TO RELATED APPLICATION(S) INCORPORATED BY REFERENCE

The present application is a continuation-in-part application of U.S. patent application Ser. No. 12/485,778, filed Jun. 16, 2009 and entitled "MULTI-PIVOT LATCH ASSEMBLIES," which is a continuation-in-part application of U.S. patent application Ser. No. 12/415,906, filed Mar. 31, 2009 and entitled "MULTI-PIVOT LATCH ASSEMBLIES," which is a continuation-in-part of U.S. patent application Ser. No. 12/060,095, filed Mar. 31, 2008 and entitled "MULTI-PIVOT LATCH ASSEMBLIES," each of which is incorporated herein in its entirety by reference.

The subject matter of U.S. patent application Ser. No. 12/756,143, filed Apr. 7, 2010 and entitled "CHILD SAFETY SEAT ATTACHMENT BELT RETRACTOR SYSTEM," and the subject matter of corresponding U.S. Provisional Application No. 61/167,484, filed Apr. 7, 2009 and entitled "CHILD SAFETY SEAT ATTACHMENT BELT RETRACTOR SYSTEM," is incorporated into the present application in its entirety by reference.

TECHNICAL FIELD

The present disclosure relates generally to latch assemblies for use with restraint systems and, more particularly, to latch assemblies for releasably coupling webs for child seats and other personal restraint systems to anchors and other attach points in vehicles.

BACKGROUND

There are many types of personal restraint systems used in automobiles and other vehicles. One type of personal restraint system used for children is a portable child seat. Portable child seats are typically secured to seats in automobiles.

One method of securing the child seat includes attaching a web or belt from the child seat to a metal bar or an anchor in the vehicle with a releasable latch assembly. To accommodate different types of child seats, automobiles typically include several anchors at various locations. A lower anchor, for example, is typically positioned at the intersection between an upper seat back portion and a lower seat portion so that it does not interfere with a passenger sitting in the seat. The lower anchor is accessible, however, so that the latch assembly can be easily engaged with the anchor to secure the child seat in position.

SUMMARY

The following summary is provided for the benefit of the reader only, and is not intended to limit the disclosure as set forth by the claims in any way.

The present disclosure is directed generally to latch assemblies and other couplings for securing child seats, other passenger restraint systems, and/or cargo to anchor members and/or other structural attach points in vehicles. A latch assembly configured in accordance with one aspect of the disclosure includes a frame having first and second openings proximate a first jaw portion. A latch having a second jaw portion opposing the first jaw portion is movably coupled to the frame by a first guide feature movably received in the first opening and a second guide feature movably received in the second opening. A release actuator is operably coupled to the latch, and an ejector is movably mounted to the frame proximate the first jaw portion. A biasing member urges the ejector against the first guide feature to hold the latch in an open position. Pushing the ejector back against the biasing member causes the latch to close by pivoting about a first pivot point and then a second pivot point spaced apart from the first pivot point. In one aspect of this embodiment, the release actuator can include a flexible pull-strap for manual release of the latch assembly. Pulling on the release actuator causes the latch to open by pivoting about the second pivot point and then the first pivot point.

BRIEF DESCRIPTION OF THE DRAWINGS

FIG. 2A is an isometric view of a latch assembly configured in accordance with an embodiment of the disclosure with the latch assembly in a closed position.

FIGS. 3A and 3B are side views, FIG. 3C is a rear view.

FIG. 10 is an isometric view illustrating installation of the latch actuator of FIGS. 9A-9B on the latch assembly of FIGS. 5A and 5B.

FIGS. 11A-11F are a series of left and right side views illustrating various stages of operation of the latch assembly of FIGS. 5A and 5B in accordance with an embodiment of the disclosure.

FIGS. 14A-14F are a series of left and right side views illustrating various stages of operation of the latch assembly of FIGS. 12A and 12B in accordance with an embodiment of the disclosure.

FIG. 18A-18F are a series of left and right side views illustrating various stages of operation of the latch assembly of FIGS. 15A and 15B in accordance with an embodiment of the disclosure.

FIGS. 23A-23F are a series of left and right side views illustrating various stages of operation of the latch assembly of FIGS. 19A and 19B in accordance with an embodiment of the disclosure.

DETAILED DESCRIPTION

The following disclosure describes various types of latch assemblies and systems, and methods of using such latch assemblies and systems. Certain details are set forth in the following description and in FIGS. 1-23F to provide a thorough understanding of various embodiments of the disclosure. Other details describing well-known structures and systems often associated with latch assemblies, child seats, and related vehicle structures, however, are not set forth below to avoid unnecessarily obscuring the description of the various embodiments of the disclosure.

Many of the details and features shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Furthermore, various embodiments of the disclosure can include structures other than those illustrated in the Figures and are expressly not limited to the structures shown in the Figures. Moreover, the various elements and features illustrated in the Figures may not be drawn to scale.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Figure 1:
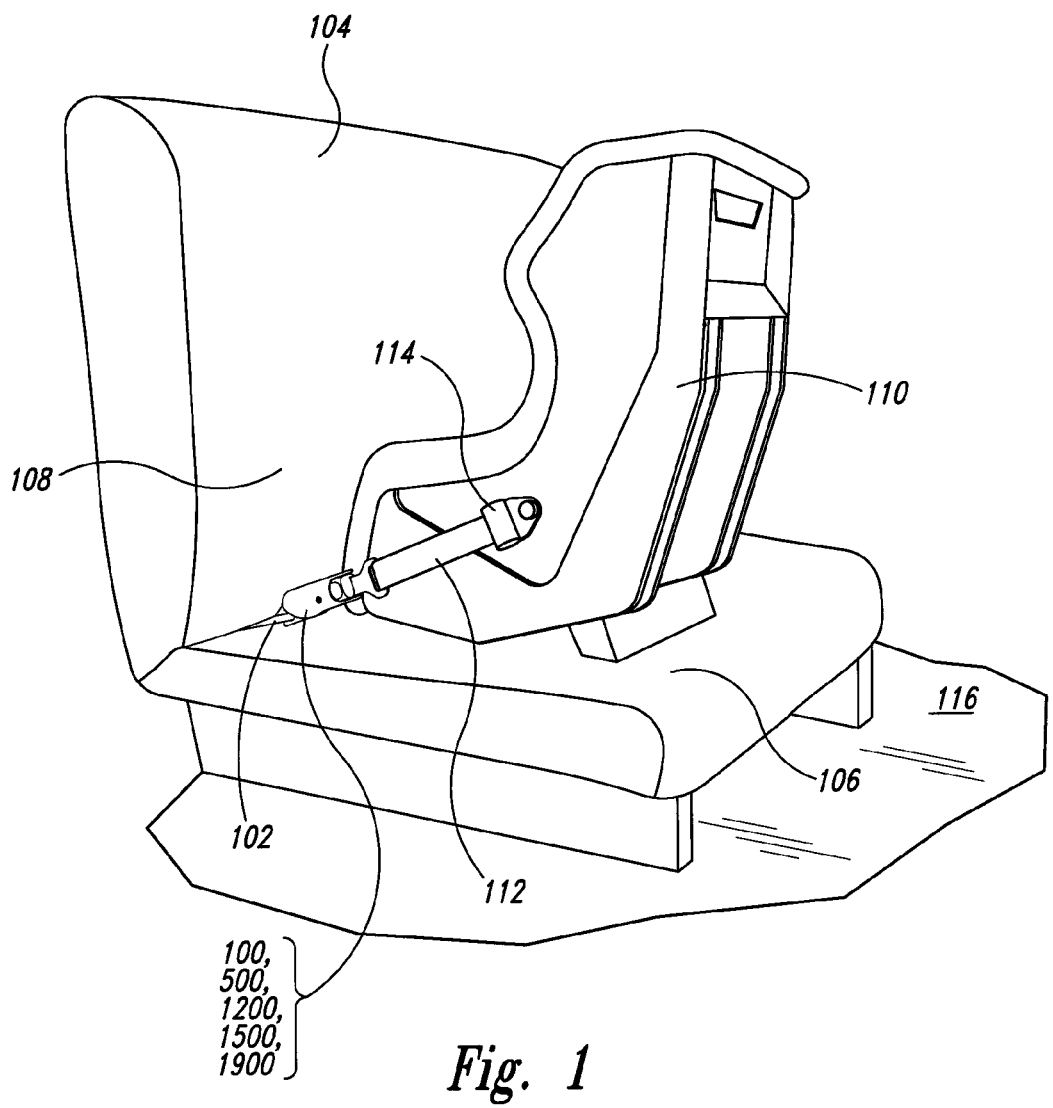
FIG. 1 is an isometric view of a child seat secured in a vehicle with a latch assembly configured in accordance with an embodiment of the disclosure.

FIG. 1 is an isometric view of a portable passenger restraint 110 (e.g., a child car seat) secured to a seat 104 in a vehicle 116 by a latch assembly 100 configured in accordance with an embodiment of the disclosure. The latch assembly 100 is coupled to the passenger restraint 110 by a web or belt 112 and an adjustable buckle 114. The latch assembly 100 is attached to the seat 104 by an anchor 102. In the illustrated embodiment, the anchor 102 is a metal bar or loop mounted between an upper seat portion 104 and a lower seat portion 106. In other embodiments, however, the latch assembly 100 can be attached to anchors or other structures positioned at other locations in the vehicle 116. For example, although a rear facing child car seat is shown in the embodiment illustrated in FIG. 1, the latch assemblies disclosed herein can also be used with other types of portable passenger restraints including, for example, forward facing child car seats. In the illustrated embodiment, only a single latch assembly 100 is shown. One skilled in the art will appreciate, however, that in other embodiments more than one latch assembly 100 may be used to secure the passenger restraint 110 to the seat 104 in accordance with the present disclosure. Moreover, one skilled in the art will appreciate that the latch assembly 100 can be used with various types of vehicles (e.g., automobiles, aircraft, rotorcraft, watercraft, etc.), and with other types of restraint systems (e.g., passenger, cargo, etc.).

FIG. 2A is an enlarged isometric view of the latch assembly 100 of FIG. 1. In the illustrated embodiment, the latch assembly 100 is in a closed position engaged with the anchor 102. The latch assembly 100 includes a latch 230 and an actuator 250 movably coupled to a frame 210. The latch assembly 100 also includes a body or housing 271 having a first housing portion 270a attached to a second housing portion 270b by a fastener 272 (e.g., a screw, bolt, rivet, etc.). The housing 271 at least partially covers the frame 210, the latch 230, and the actuator 250. The frame 210 includes a web opening 226 at a proximal end portion 204 of the latch assembly 100. The web opening 226 is configured to receive the belt 112 extending from the passenger restraint 110 (FIG. 1). Although the web opening 226 is configured to receive the belt 112 in the illustrated embodiment, in other embodiments the web opening 226 can be configured to be attached to or otherwise operably coupled to other structures. For example, in certain embodiments the web opening 226 can be configured to be releasably attached directly to the passenger restraint 110 or to a rigid structure carried by the passenger restraint 110. In still further embodiments, the web opening 226 can be fixedly attached directly to the passenger restraint 110. In the illustrated embodiment, the frame also 210 includes a first jaw 212 at a distal end portion 206 of the latch assembly 100. As shown in FIG. 2A, the first jaw 212 is configured to cooperate with a second jaw 232 of the latch 230 to releasably engage the anchor 102.

Figure 2B:
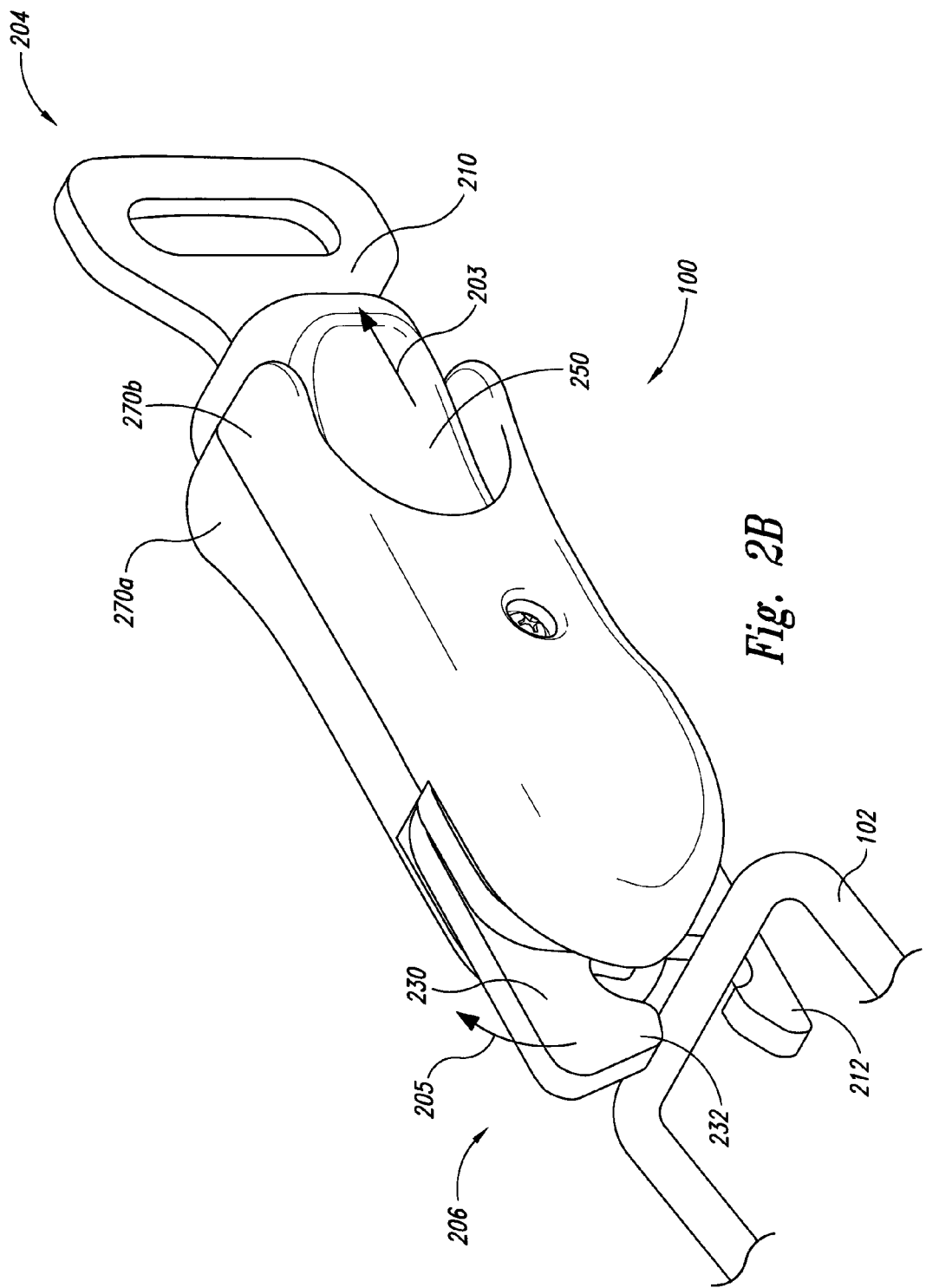
FIG. 2B is an isometric view of the latch assembly in an open position.

In FIG. 2B, the second jaw 232 has moved to the open position to release the anchor 102. As described in greater detail below with reference to FIGS. 4A-4C, when the actuator 250 is moved toward the proximal end portion 204 of the latch assembly 100 in a direction indicated by arrow 203, the latch 230 pivots to move the second jaw 232 away from the first jaw 212 in a direction indicated by arrow 205.

Figure 2C:
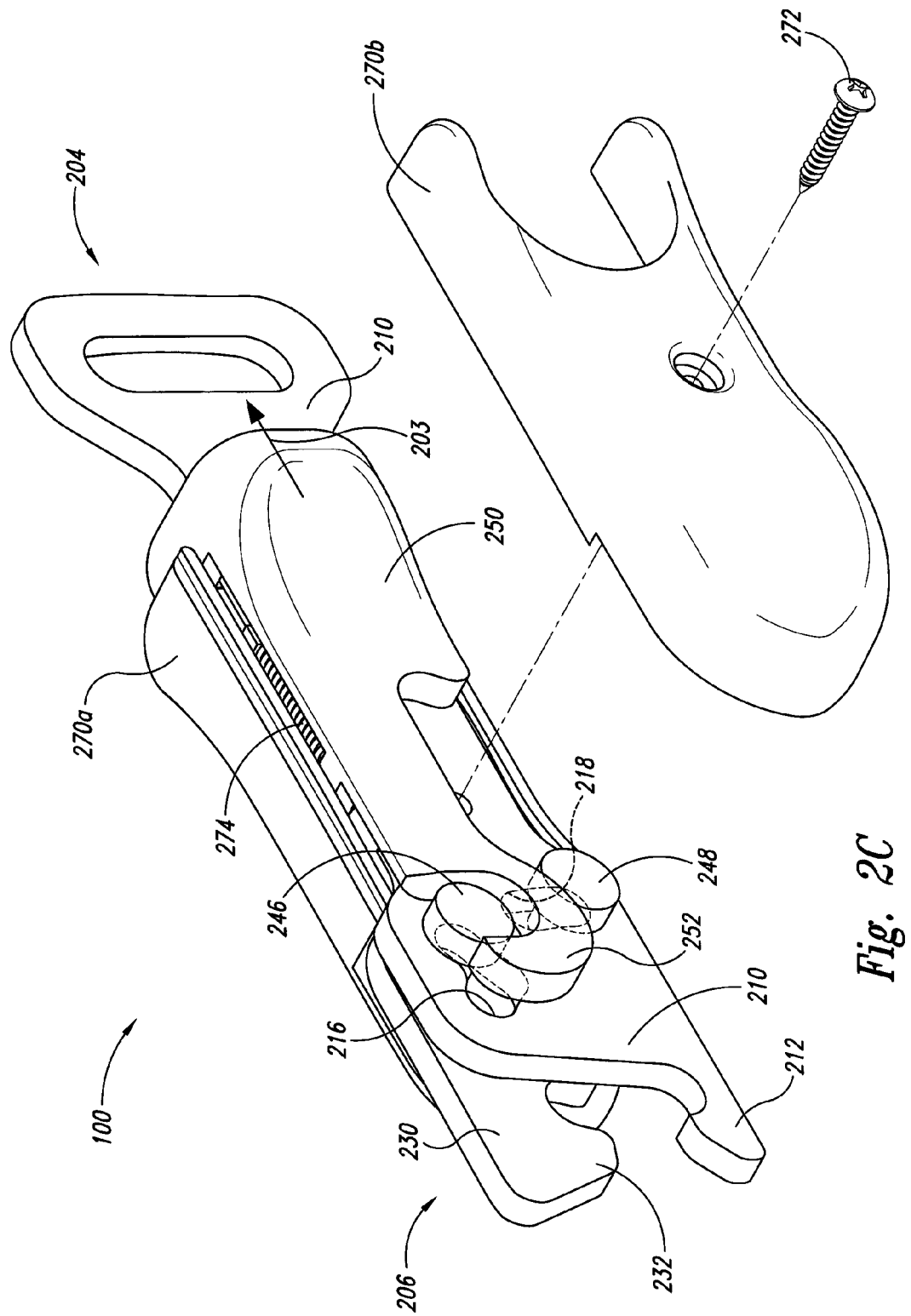
FIG. 2C is a partially exploded isometric view of the latch assembly of FIG. 2B.

FIG. 2C is a partially exploded isometric view of the latch assembly 100 of FIGS. 2A and 2B illustrating certain features of the latch assembly 100 in more detail. For example, a first guide pin or guide feature 246 projects from the latch 230 and is movably received in a corresponding first opening 216 in the frame 210. A second guide pin or guide feature 248 also projects from the latch 230 and is movably received in a corresponding second opening 218 in the frame 210. The actuator 250 includes a hook end portion 252 that engages the first guide feature 246 when the actuator 250 is moved toward the proximal end portion 204 of the latch assembly 100 in the direction indicated by arrow 203.

The latch assembly 100 also includes a biasing member 274 (e.g., a compression spring) operably coupled between the frame 210 and actuator 250. When the actuator 250 is moved toward the proximal end portion 204, the biasing member 274 is compressed thereby providing resistance to the movement of the actuator 250 in the direction of arrow 203. When the actuator 250 is released, the biasing member 274 urges the actuator 250 in a direction opposite to arrow 203 to move the second jaw 232 toward the closed position.

Figure 3D:
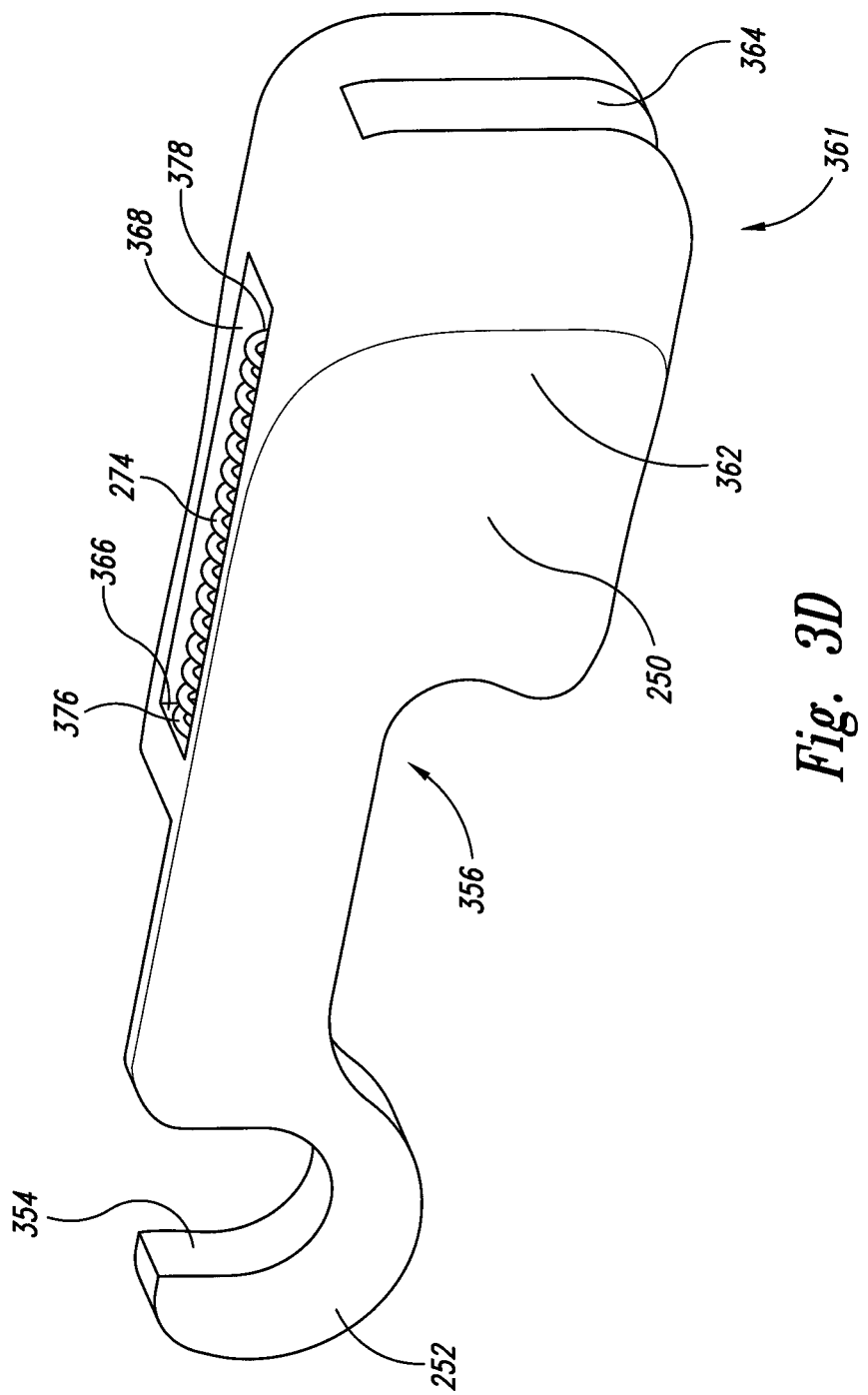
FIGS. 3D and 3E are isometric views, of various components of the latch assembly of FIGS. 2A-2C.
Figure 3E:
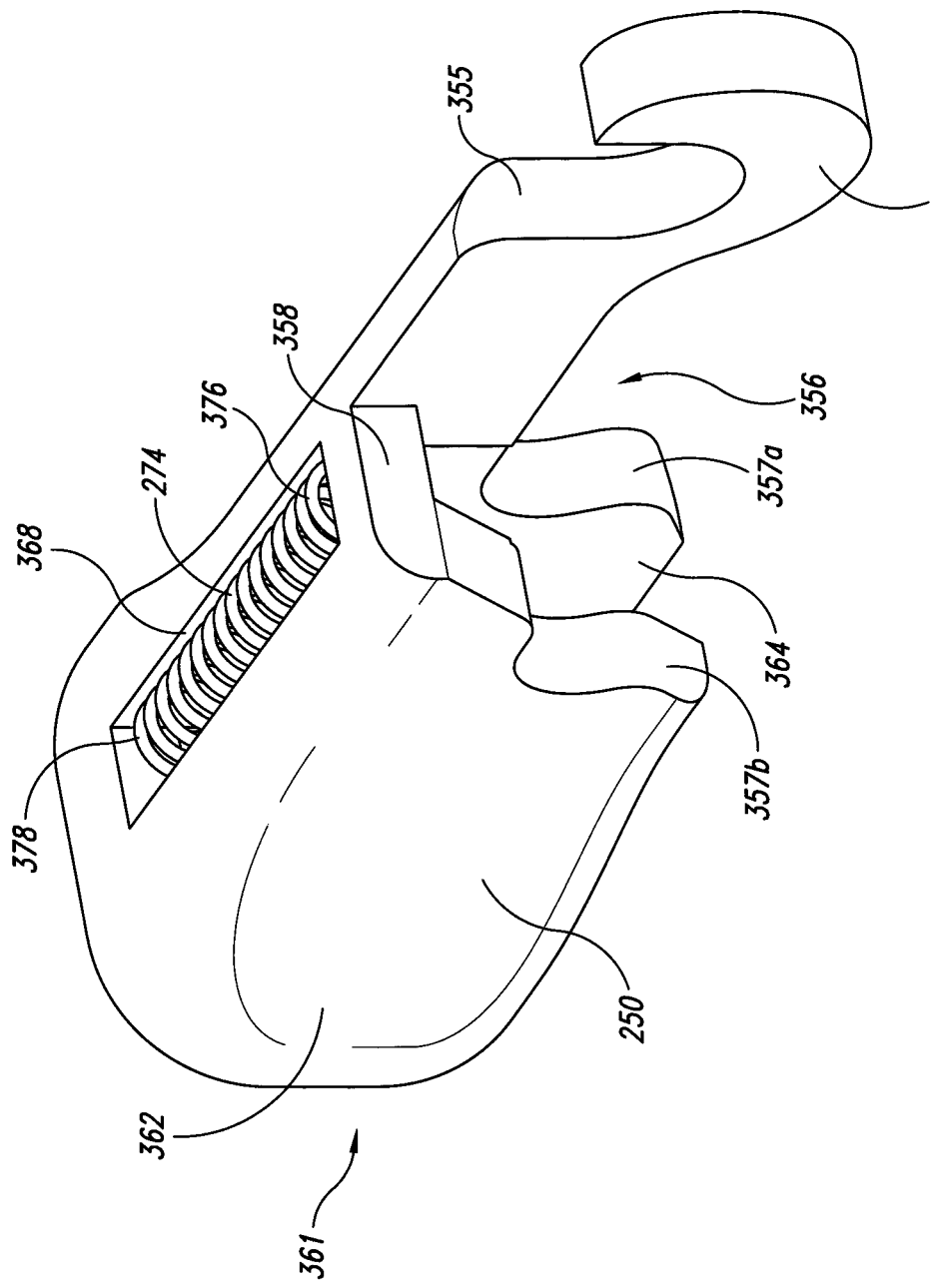

FIG. 3A is a side view of the frame 210, FIG. 3B is a side view of the latch 230, FIG. 3C is a rear view of the latch 230, and FIGS. 3D and 3E are isometric views of the actuator 250 of the latch assembly 100 illustrated in FIGS. 2A-2C. Referring first to FIG. 3A, the first jaw 212 includes a first inclined surface 313 and a first engagement surface 314. In the illustrated embodiment, the first engagement surface 314 has a generally hemispherical shape configured to receive an anchor having a corresponding cross sectional shape. In other embodiments, however, the first engagement surface 314 can have other shapes. For example, the first engagement surface 314 can have a rectilinear shape and/or include grooves or other features corresponding to the shape of the anchor and/or facilitating attachment thereto. In still further embodiments, the first engagement surface 314 can be generally flat and not include any retention features.

The first opening 216 and second opening 218 extend through a distal end portion 311 of the frame 210. In the illustrated embodiment, the first opening 216 is a slot having a generally "V" shape, and the second opening 218 is a slot having a generally linear shape. In other embodiments, however, the first opening 216 and second opening 218 can have different shapes to accommodate different motions of the first guide feature 246 and second guide feature 248, respectively.

The frame 210 also includes an aperture 323 that receives the fastener 272 illustrated in FIGS. 2A-2C that secures the first and second housing portions 270 to the latch assembly 100. The frame 210 also includes a first recess 322 and a stop 324 along an edge portion 321. The recess 322 receives the biasing member 274 (FIG. 2C) which presses against the stop 324 and urges the actuator 250 toward the distal end portion 311 of the frame 210. In the illustrated embodiment, the medial portion of the frame has a reduced height in relation to the distal end portion 311 and the proximal end portion 325. In other embodiments, however, the frame 210 can have other shapes and/or configurations.

FIG. 3B is a side view of the latch 230. In the illustrated embodiment, the second jaw 232 has a second inclined surface 333 to facilitate inserting the anchor 102 into the latch assembly 100 (FIGS. 2A-2C). For example, as the latch assembly 100 is pressed against the anchor 102, the anchor 102 contacts the first inclined surface 313 of the first jaw 212 and the second inclined surface 333 of the second jaw 232 and moves the second jaw 232 away from the first jaw 212 so that the anchor 102 can be received between the two jaws. The second jaw 232 also has a second engagement surface 334 configured to engage the anchor 102 with the first engagement surface 314 of the first jaw 212. In the illustrated embodiment, the second engagement surface 334 includes a generally hemispherical shape (similar to the first engagement surface 314 shown in FIG. 3A) corresponding to an anchor with a generally circular cross section. The latch assembly 230 further includes a first aperture 342 positioned to receive at least a portion of the first guide feature 346, and a second aperture 344 positioned to receive at least a portion of the second guide aperture 348.

FIG. 3C is a rear view of the latch 230 illustrating the first guide feature 246 and the second guide feature 248 projecting from the latch 230. In the illustrated embodiment, the first guide feature 246 and the second guide feature 248 each includes a shaft portion 247 and a head portion 249. Each shaft portion 247 is at least partially inserted into the latch 230. Each head portion 249 is spaced apart from the latch 230 and configured to retain the corresponding first guide feature 246 in the first opening 216 in the frame 210, and the second guide feature 248 in the second opening 248 in the frame 210. In certain embodiments, the first guide feature 246 and second guide feature 248 can include, for example, pins, posts, studs, and any other types of suitable guide features projecting from the latch 230. Moreover, in certain embodiments, the first guide feature 246 and the second guide feature 248 can be fixedly retained in the latch 230 (e.g., with a press-fit). In other embodiments, however, the first guide feature 246 and the second guide feature 248 can be rotatably retained in the latch 230 to allow them to spin with reference to the latch 230. Accordingly, the present disclosure is not limited to the particular types of guide features described above or shown in the Figures.

FIGS. 3D and 3E are isometric views of the actuator 250. Referring to FIGS. 3D and 3E together, in the illustrated embodiment the hook end portion 252 has a generally "U"-shaped configuration to engage the first guide feature 246 (FIG. 2C). More specifically, the hook end portion 252 includes a first abutment surface 354 and an opposing second abutment surface 355. The hook end portion 252 extends from one side of a medial portion 356 of the actuator 250 and has a reduced width with reference to the medial portion 356.

The medial portion 356 of the actuator 250 includes a cavity 368 configured to receive the biasing member 274. A first end portion 376 of the biasing member 274 presses against a corresponding contact surface 366 of the cavity 368. The cavity 368 intersects a channel 364 extending through the medial portion 356 as well as a proximal end portion 361 of the actuator 250. The medial portion 356 also includes a first cut-away portion 357a extending from the hook end portion 252, and a second cut-away portion 357b extending from a side surface 358 that is generally perpendicular to the hook end portion 252.

The width of the actuator 250 gradually increases from the medial portion 356 toward the proximal end portion 361 forming a raised grip surface 362. The grip surface 362 enables a user to manually slide or otherwise move the actuator 250 in the direction of the arrow 203 to facilitate operation of the latch assembly 100 (FIG. 2C). For example, a user can open the latch assembly 100 by pulling the actuator 250 in the direction of the arrow 203. One skilled in the art will appreciate that the actuator 250 can be any type of button, trigger, pull, etc. that can be actuated to open the latch assembly 100.

In the illustrated embodiment, the actuator 250 is configured to cooperate with the frame 210 and the latch 230 within the first and second housing portions 270. When the actuator 250 is positioned over the frame 210 as shown in, for example, FIG. 2C, the frame 210 can movably slide through the channel 364 of the actuator 250. Moreover, the stop 324 of the frame 210 can also movably slide through the cavity 368 of the actuator 250. The reduced width of the hook end portion 252 extending from the side surface 358 of the actuator 250 allows the first and second housing portions 270 to accommodate the actuator 250, the latch 230, and the frame 210. Moreover, the cut-away portions 357 allow the actuator 250 to slide within the first and second housing portions 270 without interfering with the fastener 272 holding the first and second housing portions 270 together.

Figure 4A:
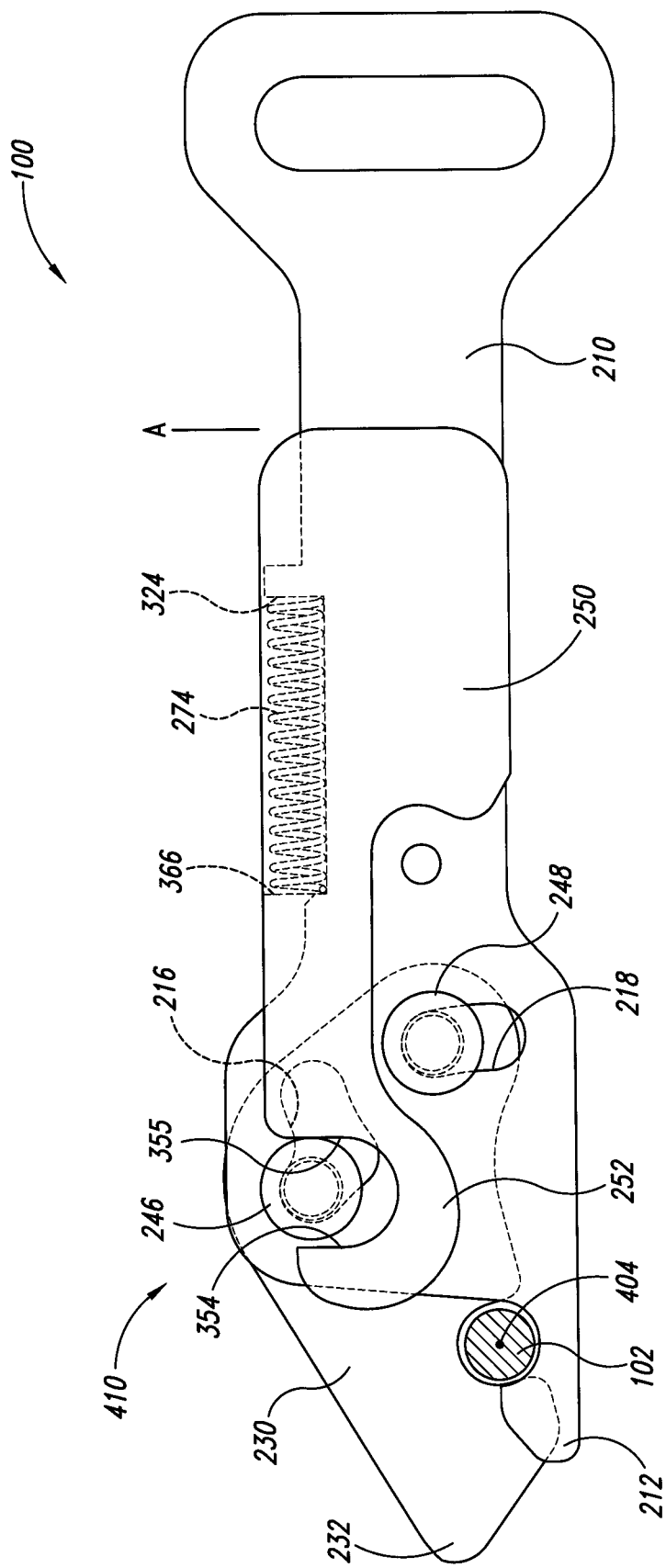
FIGS. 4A-4C are a series of side views illustrating various stages of operation of the latch assembly of FIGS. 2A-2C in accordance with an embodiment of the disclosure.
Figure 4B:
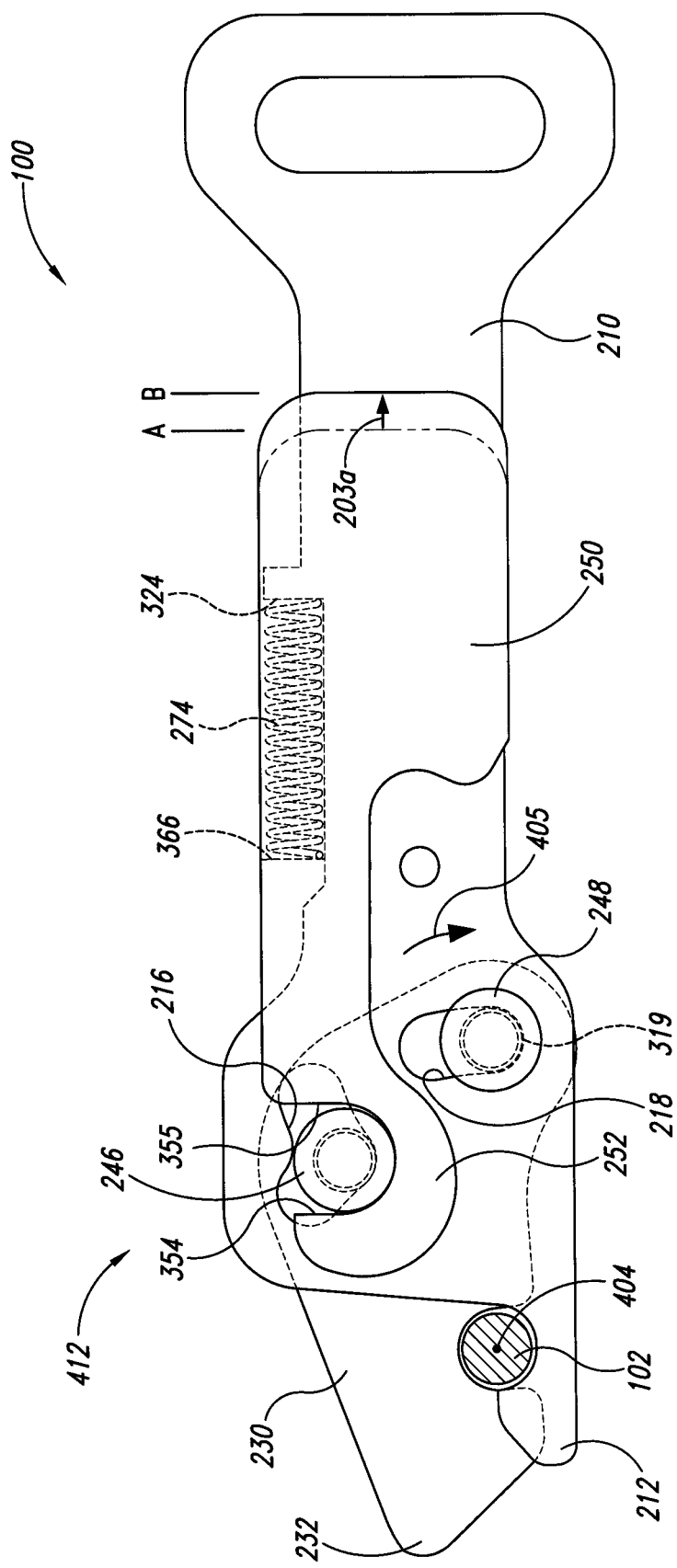
Figure 4C:
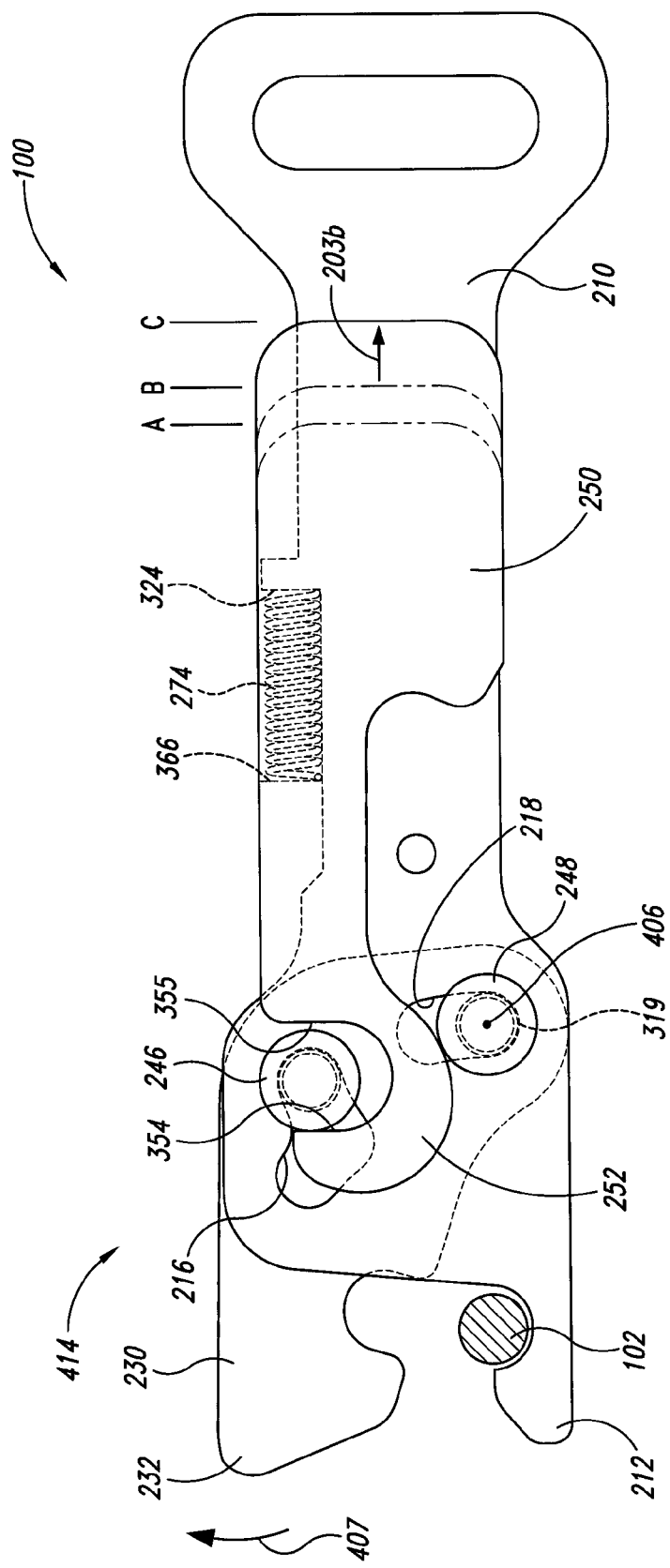

FIGS. 4A-4C are a series of side views illustrating the latch assembly 100 in various stages of opening. In the embodiment illustrated in FIGS. 4A-4C, the latch 230 rotates with reference to the frame 210 about two different pivot points. Referring first to FIG. 4A, when the latch assembly 100 is closed, the actuator 250 biases the latch 230 toward a first position 410 in which the first jaw 212 and the second jaw 232 capture and retain the anchor 102. More specifically, the biasing member 274 pushes against the contact surface 366 of the actuator 250 to urge the actuator 250 toward the latch 230. This causes the second abutment surface 355 of the actuator 250 to drive the first guide feature 246 toward an upper left portion of the "V"-shaped first opening 216 in the frame 210. When the first guide feature 246 is in this location, the second guide feature 248 is positioned toward an upper portion of the second opening 218 in the frame 210. With the latch 230 in this position, the actuator 250 is at position A in which latch assembly 100 retains the anchor 102 between the frame 210 and latch 230 until a user operates the actuator 250 to release the anchor 102.

In FIG. 4B, the latch assembly 100 is still closed (e.g., the anchor is retained between the first jaw 212 and second jaw 232), but the operator (not shown) has moved the actuator 250 from position A to position B causing the latch 230 to rotate about a first pivot point 404 at the anchor 102. As the actuator 250 moves in the direction of arrow 203a to the intermediate position B, the latch 230 rotates in the direction of an arrow 405 from the first position 410 shown in FIG. 4A to the second position 412 shown in FIG. 4B. As the latch 230 rotates toward the second position 412, the first guide feature 246 slides along the first abutment surface 354, and the latch 230 pivots about the first pivot point 404. In the illustrated embodiment, the first pivot point 404 is at least proximate to the anchor 102. As the latch 230 rotates about the first pivot point 404, the first guide feature 246 moves through the first opening, and the second guide feature 248 moves through the second openings 218 until the second guide feature 248 contacts the pivot surface 319 of the second opening 218. Although the latch 230 has rotated into the second position 412, the latch assembly 100 still retains the anchor 102 between the frame 210 and latch 230.

In FIG. 4C, the operator has moved the actuator 250 to position C to rotate the latch 230 to a third position 414 and open the latch assembly 100. In the third position 414, the second jaw 232 is rotated in the direction indicated by arrow 407 to be spaced apart from the first jaw 212. To rotate the latch 230 into the third position 414, the actuator 250 continues to move in the direction of arrow 203b from the intermediate position B to an unlocked position C. During this movement, the first abutment surface 354 continues to contact the first guide feature 246 and drives it toward an upper right portion of the "V"-shaped first opening 216. As the latch 230 pivots to the third position 414, however, the second guide feature 248 does not slide through the second opening 218. Instead, the second guide feature 248 remains at the pivot surface 319 of the second opening 218 and the latch 230 pivots about the second guide feature 248. In the illustrated embodiment, the second guide feature 248 represents a second pivot point 406. Accordingly, as the latch 230 rotates about the second pivot point 406, the first guide feature 246 moves through the first opening 216.

The embodiments of the latch assembly 100 described above provide several advantages over conventional latch assemblies. One advantage, for example, is that the latch 230 has to move through two different motions to release the anchor 102 from the latch assembly 100. For example, when a user operates the actuator 250, the latch 230 rotates from the first position 410 to the second position 412 about the first pivot point 404. During this first movement, however, the anchor 102 remains engaged between the first jaw 212 and the second jaw 232. To release the anchor 102, the latch 230 must be rotated again from the second position 412 to the third position 414 about the second pivot point 406. Rotating the latch 230 about multiple pivot points accordingly provides an increased number of movements to release the anchor 102 from the latch assembly 100. Pivoting the latch 230 about the multiple pivot points also helps to at least partially prevent an unintentional release of the anchor 102, as the second jaw 232 remains engaged with the anchor 102 when the latch 230 is in the first position and the second position 412.

Figure 5A:
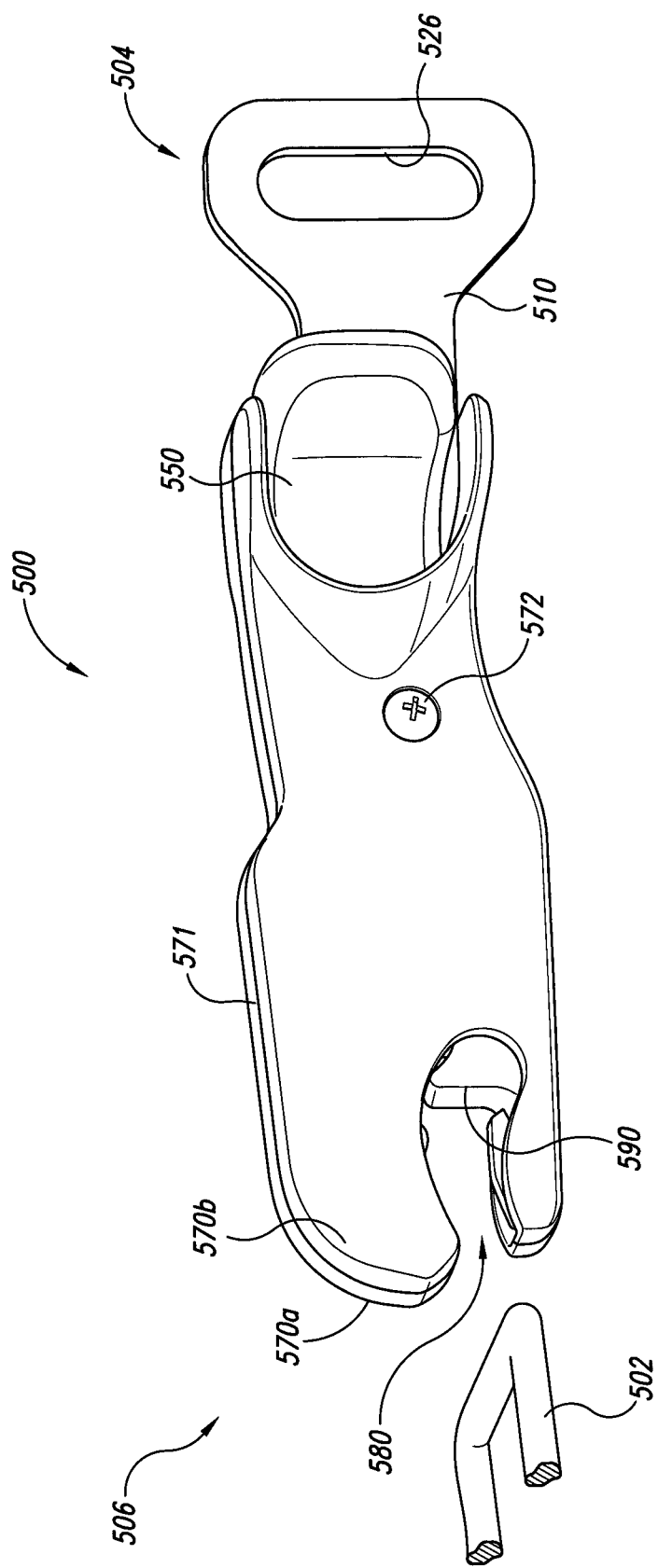
FIG. 5A is an isometric view of a latch assembly configured in accordance with another embodiment of the disclosure.
Figure 5B:
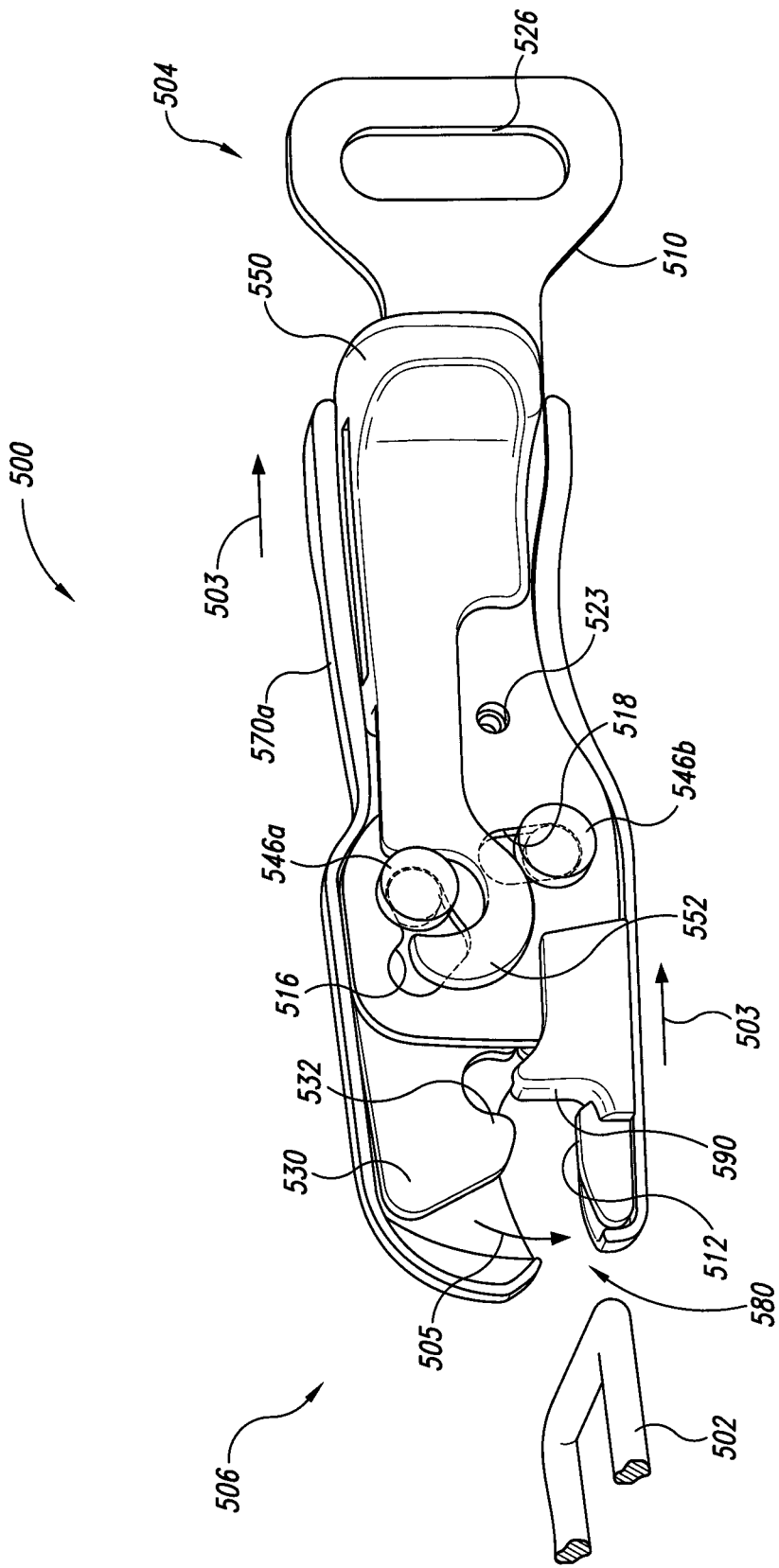
FIG. 5B is an isometric view of the latch assembly with part of the housing removed for purposes of illustration.

FIG. 5A is an isometric view of a latch assembly 500 configured in accordance with another embodiment of the disclosure, and FIG. 5B is an isometric view of the latch assembly 500 with a portion of a housing 571 removed for purposes of illustration. The latch assembly 500 can be used in a number of different restraint systems and in a number of different ways. For example, in one embodiment the latch assembly 500 can be used in place of the latch assembly 100 shown in FIG. 1 to secure the passenger restraint 110 to the seat 104. More specifically, the latch assembly 500 can be attached to the passenger restraint 110 by means of the belt 112 and the adjustable buckle 114 (or a suitable web retractor). The latch assembly 500 can then be releasably coupled to the anchor 102, and a similar latch and anchor arrangement can be used on the other side of the passenger restraint 110, to securely attach the passenger restraint 110 to the seat 104. In other embodiments, however, the latch assembly 500 can be attached to other anchors or structures in other arrangements and at other locations in the vehicle 116. Moreover, those skilled in the art will appreciate that the latch assembly 500 can be used with various types of vehicles (e.g., automobiles, aircraft, watercraft, military vehicles, etc.), and with other types of restraint systems (e.g., adult passenger, cargo, etc.).

Referring to FIGS. 5A and 5B together, the latch assembly 500 includes a pivotable member or latch 530 and a latch release actuator 550 operably coupled to a frame 510. The housing 571 at least partially covers the frame 510, the latch 530, and the actuator 550, and includes a first housing portion 570a attached to a second housing portion 570b by a fastener 572 (e.g., a screw, bolt, rivet, etc.) that extends through an aperture 523 in the frame 510. The latch 530 and the frame 510 can be formed from suitable types of metallic materials including, for example, steel or steel alloy sheet or plate that is stamped, forged, cut, machined, cast, or otherwise formed to shape. In other embodiments, the latch 530 and/or the frame 510 can be formed from other suitable metallic materials (e.g., aluminum, titanium, etc.), other suitable non-metallic materials (e.g., fiber-reinforced resin materials such as carbon fiber, etc.), and/or other suitable materials known in the art. The actuator 550 and the housing portions 570 can be manufactured from various types of injection molded plastics (e.g., polypropylene or other thermoplastic polymers), thermosetting resins, fiber-reinforced resins, Delrin®, and/or other suitable materials known in the art.

The latch assembly 500 includes a proximal end portion 504 and a distal end portion 506. The proximal end portion 504 includes a web aperture or opening 526 configured to receive and be securely attached to, for example, a conventional seat belt, strap or web (e.g., a woven fiber web), such as the belt 112 illustrated in FIG. 1. Although the web opening 226 of the illustrated embodiment is configured to be attached to a web, those of ordinary skill in the art will appreciate that in other embodiments the web opening 526 can be configured to be attached to other members or structures. For example, in some embodiments the web opening 526 can be attached directly to a child seat or other passenger restraint, or to a structural member carried by the passenger restraint. Accordingly, the latch assembly 500 described herein is not limited to the particular embodiments illustrated in the accompanying Figures, but can be utilized in a wide variety of applications to secure persons, cargo, equipment, etc. in moving vehicles without departing from the spirit or scope of the present disclosure.

The distal end portion 506 of the latch assembly 500 includes a mouth 580 configured to receive a metal bar or anchor 502. The anchor 502 can be at least generally similar in structure and function to the anchor 102 described above with reference to FIG. 1. As described in greater detail below, a latch blocking member or blocker 590 holds the latch 530 in the open position as illustrated in FIGS. 5A and 5B until the mouth 580 is pushed over the anchor 502 and the anchor 502 pushes the latch blocker 590 back in a direction indicated by arrow 503. When the blocker 590 has moved back a sufficient amount, it allows the latch 530 to rotate downwardly in a direction indicated by arrow 505. The frame 510 includes a first jaw 512 and the latch 530 includes a corresponding second jaw 532. When the latch 530 rotates downwardly, the first jaw 512 cooperates with the second jaw 532 to engage the anchor 502 and attach the latch assembly 500 to the anchor 502.

As described in greater detail below, the latch assembly 500 further includes a first guide feature 546a and a second guide feature 546b that project outwardly from a side portion of the latch 530. The first guide feature 546a is movably received in a first guide track or opening 516 in the frame 510. The second guide feature 546b is similarly received in a second guide track or opening 518 in the frame 510. In the illustrated embodiment, the actuator 550 includes an end portion with a hook-shaped engagement feature 552 that operably engages the first guide feature 546a.

Figure 6:
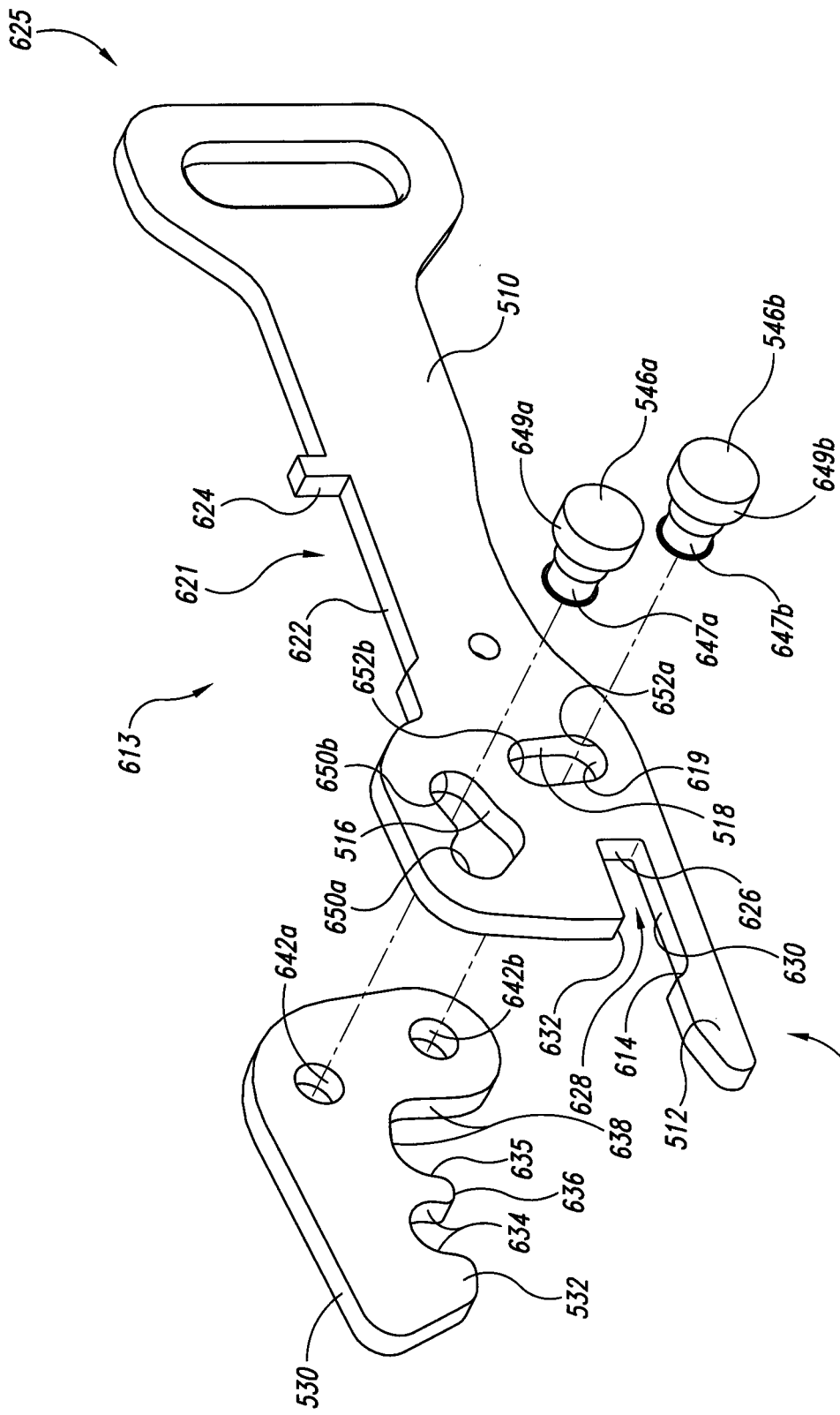
FIG. 6 is an exploded isometric view of a latch, frame, and guide features from the latch assembly of FIGS. 5A and 5B.
Figure 7:
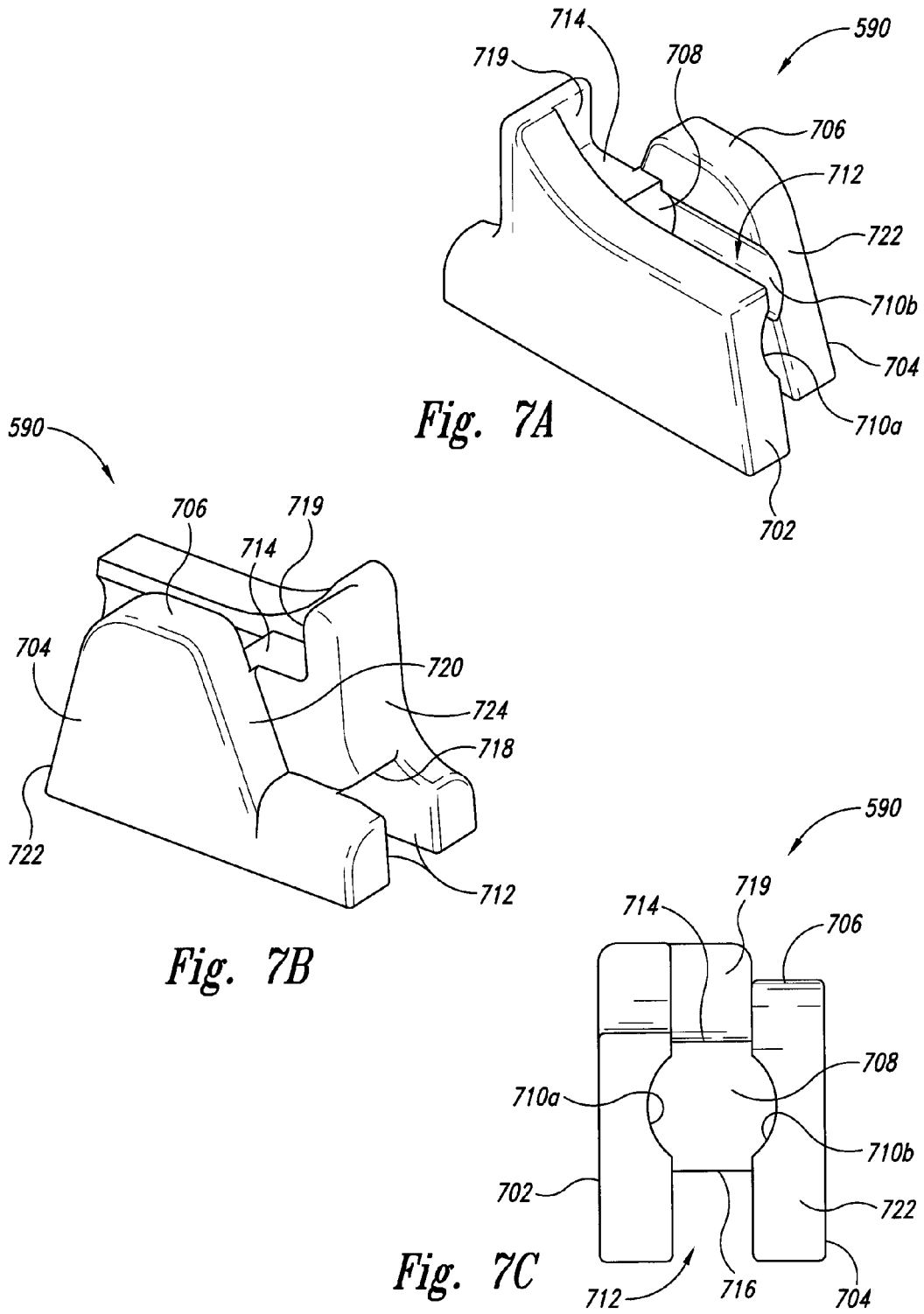
FIGS. 7A-7C are enlarged rear isometric, front isometric, and rear end views, respectively, of a latch blocker from the latch assembly of FIGS. 5A and 5B.

FIG. 6 is an exploded isometric view of the frame 510, the latch 530 and the guide features 546. The frame 510 includes a proximal end portion 625, a distal end portion 611, and a medial portion 613 therebetween. The first jaw 512 is positioned toward the distal end portion 611 and includes a first engagement surface 614 configured to at least partially engage the anchor 502 (FIGS. 5A and 5B). In the illustrated embodiment, the first engagement surface 614 forms a raised lip on the first jaw 512 having a radius of curvature that is at least generally similar to the cross-sectional radius of the bar forming the anchor 502. In other embodiments, however, the first engagement surface 614 can have other shapes. For example, the first engagement surface 614 can have rectilinear and/or other shapes to facilitate retention of the anchor 502 in the mouth 580 of the latch assembly 500. The frame 510 further includes a first recess 628 configured to slidably retain the latch blocker 590 (FIGS. 5A and 5B) adjacent to the first engagement surface 614. In the illustrated embodiment, the first recess 628 includes parallel first and second side surfaces 630 and 632, respectively, terminating in a contact surface 626.

The first opening 516 and the second opening 518 extend through the frame 510 proximate the distal end portion 611. In the illustrated embodiment, the first opening 516 is a non-circular opening that forms a slot having a generally "V" shape with a first semi-circular end portion 650a and a second semi-circular end portion 650b. The second opening 518 is a non-circular opening that forms a slot having a generally straight or linear shape with a first semi-circular end portion 652a and a second semi-circular end portion 652b. As described in greater detail below, the first end portion 652a of the second opening 518 forms a pivot surface 619. In other embodiments, however, the first opening 516 and the second opening 518, and the corresponding first and second end portions 650 and 652, can have other shapes to, for example, accommodate different motions of the first guide feature 546a and the second guide feature 546b.

An edge portion 621 of the frame 510 includes a second recess 622 and a stop 624. As described in greater detail below, the second recess 622 receives a biasing member (e.g., a coil spring; not shown in FIG. 6) that presses against the stop 624 and urges the actuator 550 (FIGS. 5A and 5B) toward the distal end portion 611 of the frame 510. In the illustrated embodiment, the medial portion 613 of the frame 510 has a reduced height in relation to the distal end portion 611 and a proximal end portion 625. In other embodiments, however, the frame 510 can have other shapes and/or configurations without departing from the spirit or scope of the present disclosure.

Referring next to the latch 530, the latch 530 of the illustrated embodiment is a pivotal member (e.g., a lever, catch, etc.) having second jaw 532 that includes a projection or tip portion with a second engagement surface 634 configured to cooperate with the first engagement surface 614 of the first jaw 512 to engage and retain the anchor 502 within the mouth 580 when the latch 530 is in the closed position. In the illustrated embodiment, the second engagement surface 634 includes a recess having a generally semi-circular shape with a radius of curvature that is at least generally similar to the radius of curvature of the first engagement surface 614. As a result, when closed together the first engagement surface 614 and the second engagement surface 634 can at least approximate the cross-sectional shape of the bar forming the anchor 502. In other embodiments, however, the second engagement surface 634 can have other shapes including, for example, other circular and non-circular (e.g., rectilinear) shapes.

In another aspect of this embodiment, the latch 530 includes a finger or tab 635 that extends downwardly between the second engagement surface 634 and a clearance recess 638. The tab 635 includes an abutment surface 636 on a distal portion thereof. As described in greater detail below, a side portion of the blocker 590 includes a corresponding blocking surface that contacts the abutment surface 636 and holds the latch 530 in the open position until an anchor or other structure pushes the blocker 590 inwardly in the direction of arrow 503 (FIG. 5B). When that happens, the side portion of the blocker 590 moves into the clearance recess 638 and allows the latch 530 to rotate downwardly in the direction of arrow 505 (FIG. 5B) into the closed position.

The latch 530 can also include a first aperture 642a configured to receive at least a portion of the first guide feature 546a, and a second aperture 642b configured to receive at least a portion of the second guide feature 546b. More specifically, in the illustrated embodiment, the first and second guide features 546 each include a cylindrical shaft portion 647 (identified individually as a first shaft portion 647a and a second shaft portion 647b) and a corresponding head portion 649 (identified individually as a first head portion 649a and a second head portion 649b) that is larger than the shaft portion 647. The first shaft portion 647a is configured to be inserted through the first opening 516 in the frame 510 and then into the first aperture 642a in the latch 530. Similarly, the second shaft portion 647b is configured to be inserted through the second opening 518 and into the second aperture 642b. In certain embodiments, the guide features 546 can be fixedly retained in the latch apertures 642 by, for example, a press-fit. In other embodiments, the guide features 546 can be fixed to the latch 530 by other suitable means known in the art (e.g., adhesives, swaging, welding, lock rings, etc.), or the latch 530 can be machined, cast, or otherwise formed so that the guide features 546 (or portions thereof) are integral parts of the latch 530. Although the shaft portions 647 and the head portions 649 of the illustrated embodiment are cylindrical, in other embodiments one or both of these features can have other shapes. In still further embodiments, the guide features 546 can be rotatably retained in the latch apertures 642 to allow them (or portions thereof) to spin with reference to the latch 530 to facilitate movement of the latch 530 relative to the frame 510.

In the foregoing manner, the guide features 546 movably attach the latch 530 to the frame 510, and enable pivotal movement of the latch 530 via movement of the guide features 546 through the corresponding openings 516 and 518. The guide features 546 can include, for example, metal (e.g., steel) pins, posts, studs, and/or other types of suitable features projecting from the latch 530 to movably couple the latch 530 to the frame 510. In yet other embodiments, it is contemplated that the latch 530 can include non-circular openings similar to the openings 516 and 518, and guide features similar to the guide features 546 can be fixedly attached to the frame 510 to enable the desired pivotal movement of the latch 530. Accordingly, the present disclosure is not limited to the particular embodiments of guide features or guide feature arrangements described above or shown in the corresponding Figures.

FIGS. 7A-7C are enlarged rear isometric, front isometric, and rear end views, respectively, of the latch blocker 590 configured in accordance with an embodiment of the disclosure. Referring to FIGS. 7A-7C together, the blocker 590 includes a first side portion 702 spaced apart from a second side portion 704 by a channel 712 extending therebetween. An inner surface of the first side portion 702 includes a first recess or cutout 710a, and an opposing inner surface of the second side portion 704 includes a corresponding second cutout 710b. The cutouts 710 are cylindrical in shape and are configured to accommodate a biasing member (e.g., a coil spring; not shown in FIGS. 7A-7C) positioned in the channel 712 with one end supported by a contact surface 708. An upper guide surface 714 extends from the contact surface 708 to a flange 719, and a lower guide surface 716 extends from the contact surface 708 to a forward edge 718. A bearing surface 724 for contacting anchors and other attach structures extends upwardly from the forward edge 718.

As shown to good effect in FIG. 7B, the second side portion 704 includes a blocking surface 706 extending at least generally horizontally between an angled front surface 720 and an angled rear surface 722. As described in greater detail below, the blocking surface 706 is configured to contact the abutment surface 636 on the latch tab 635 (FIG. 6) and hold the latch 530 in the open position, until an anchor or other structure pushes the blocker 590 back into the mouth 580 (FIG. 5A) and allows the latch 530 to rotate downwardly to the closed position.

The blocker 590 can be manufactured from various types of plastic (e.g., polypropylene or other thermoplastic polymers), thermosetting resins, fiber-reinforced resins, Delrin®, and/or other suitable materials known in the art. In other embodiments, the blocker 590 can be formed from suitable metals including, for example, steel, aluminum, etc. that is stamped, forged, cut, machined, cast, or otherwise formed to shape.

Figure 8:
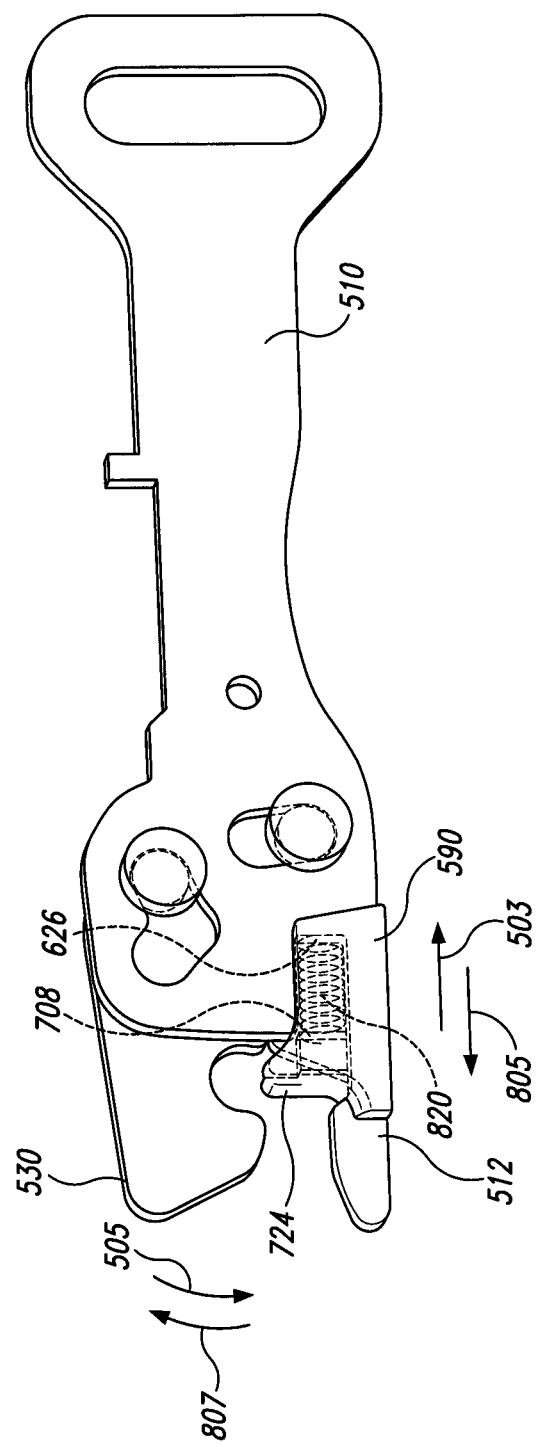
FIG. 8 is an isometric view illustrating installation of the latch blocker of FIGS. 7A-7C on the latch assembly of FIGS. 5A and 5B.

FIG. 8 is an isometric view illustrating the blocker 590 installed on the frame 510 in accordance with an embodiment of the disclosure. Referring to FIGS. 6, 7A-7C, and 8 together, to install the blocker 590 on the frame 510, a first biasing member 820 (e.g., a coil spring) is inserted between the cutouts 710 in the blocker 590. With the biasing member 820 in place, the blocker 590 is slid into the first recess 628 in the frame 510 so that the lower guide surface 716 on the blocker 590 contacts the first side surface 630 of the recess 628, and the upper guide surface 714 on the blocker 590 contacts the second side surface 632 of the recess 628. The blocker 590 is pushed into the first recess 628 until the forward edge 718 of the blocker 590 contacts the first engagement surface 614 of the first jaw 512. In this configuration, the biasing member 820 is compressed between the contact surface 708 on the blocker 590 and the opposing contact surface 626 on the frame 510.

As described in greater detail below, when an anchor or other structure moves into the mouth 580 and pushes against the bearing surface 724 of the blocker 590, the blocker 590 moves back in the direction of arrow 503 and further compresses the biasing member 820. This allows the latch 530 to pivot in the direction of arrow 505 to the closed position. Conversely, the compressed biasing member 820 urges the blocking member 590 outwardly in the direction of arrow 805 to release the anchor when the latch 530 pivots in the direction of arrow 807 to the open position shown in FIG. 8.

Figure 9A:
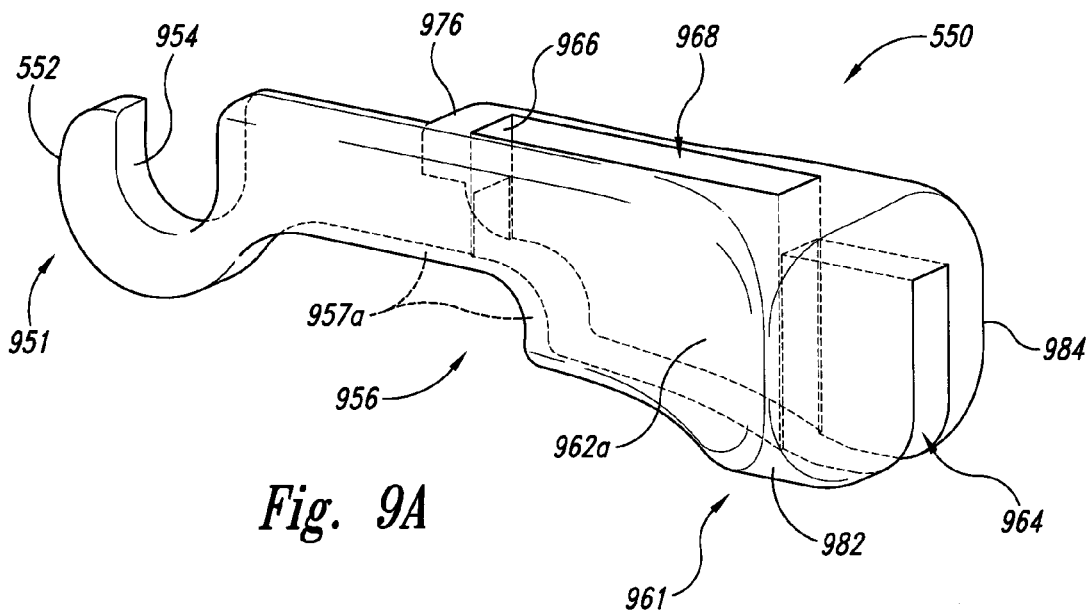
FIGS. 9A and 9B are enlarged rear and front isometric views, respectively, of a latch actuator from the latch assembly of FIGS. 5A and 5B.
Figure 9B:
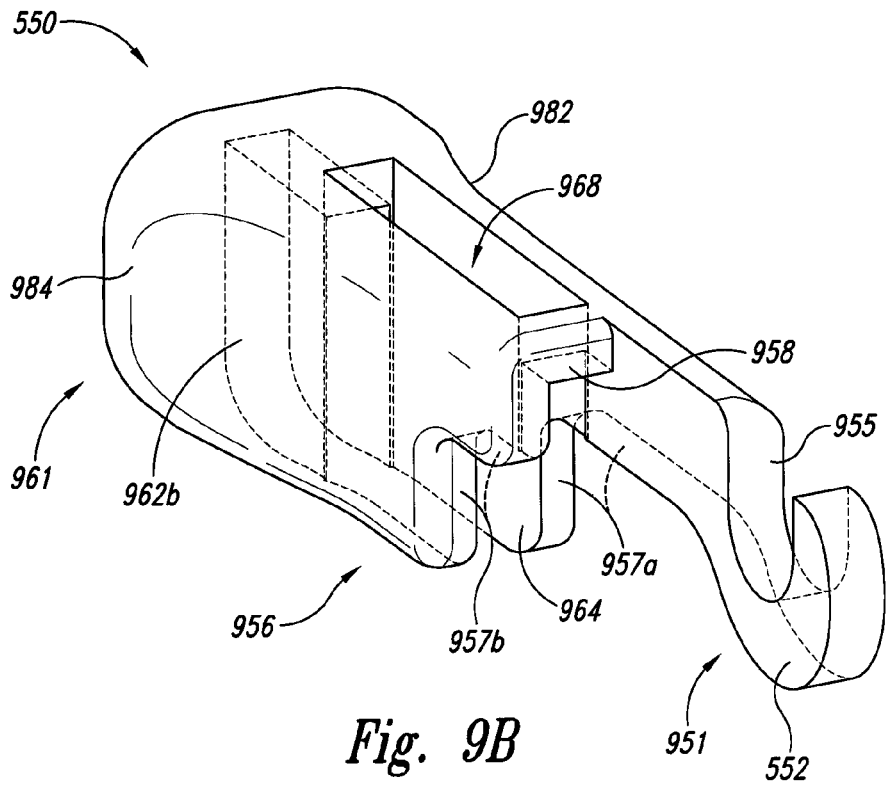

FIGS. 9A and 9B are enlarged rear and front isometric views, respectively, of the actuator 550 configured in accordance with an embodiment of the disclosure. Referring to FIGS. 9A and 9B together, the actuator 550 includes a proximal end portion 961, a distal end portion 951, and a medial portion 956 therebetween. The proximal end portion 961 includes a first side portion 982 spaced apart from a second side portion 984 by a longitudinal channel 964 extending therebetween. A cavity 968 having a contact surface 966 extends downwardly between the first side portion 982 and the second side portion 984 and opens into the channel 964. As described in greater detail below, the cavity 968 is configured to receive a second biasing member (e.g., a coil spring) that presses against the contact surface 966.

The first side portion 982 and the second side portion 984 each include a grip surface 962 (identified individually as a first grip surface 962a and a second grip surface 962b). In the illustrated embodiment, the grip surfaces 962 flare outwardly toward the proximal end portion 961 to facilitate manipulation of the actuator 550 by a user (not shown). More specifically, the grip surfaces 962 facilitate grasping the actuator 550 and moving it in the direction of arrow 503 (FIG. 5B) to release the latch assembly 500 from the anchor 502. The first side portion 982 includes a first cut-out or cut-away portion 957a extending between the first grip surface 962a and the distal end portion 951. The second side portion 984 terminates in a second cut-away portion 957b that transitions to a perpendicular face 958.

As shown to good effect in FIG. 9B, the distal end portion 951 extends from the first side portion 982. In the illustrated embodiment, the engagement feature 952 has a generally "U"-shaped configuration that movably engages the first guide feature 546a (FIG. 5B). More specifically, the engagement feature 552 includes a first abutment surface 954 (FIG. 9A) and an opposing second abutment surface 955 (FIG. 9B), which alternately bear against the first guide feature 546a in operation depending on the direction of movement of the actuator 550.

FIG. 10 is an isometric view illustrating the actuator 550 installed on the frame 510 in accordance with an embodiment of the disclosure. As this view illustrates, the engagement feature 552 is operably coupled to the first guide feature 546a, and the channel 964 is positioned over the medial portion 621 of the frame 510. A second biasing member 1074 is installed in the cavity 968 and compressed between the contact surface 966 on the actuator 550 and an opposing contact surface on the frame stop 624. During operation of the latch assembly 500, the actuator 550 can slide back and forth on the frame 510.

After the actuator 550 has been installed on the frame 510 as shown in FIG. 10, the first and second housing portions 570 can be joined together as shown in FIG. 5A. The fastener 572 can then be inserted through an aperture in the second housing portion 570b and the aperture 523 in the frame 510, and engaged with the first housing portion 570a (by, e.g., threading the fastener 572 into a corresponding threaded hole in the first housing portion 570a, a nut, etc.). The reduced width of the distal end portion 951 of the actuator 550 allows the first and second housing portions 570 to accommodate the actuator 550, the latch 530, and the frame 510. Moreover, the cut-away portions 957 allow the actuator 550 to slide within the first and second housing portions 570 without interfering with the fastener 572.

FIGS. 11A-11F are a series of side views illustrating various stages of operation of the latch assembly 500 in accordance with an embodiment of the disclosure. FIGS. 11A, 11C, and 11E are left side views with the second housing portion 570b removed for purposes of illustration, and FIGS. 11B, 11D, and 11F are corresponding right side views with the first housing portion 570a removed for purposes of illustration. In the embodiment illustrated in FIGS. 11A-11F, the latch 530 rotates about two different pivot points during operation.

In FIGS. 11A and 11B, the anchor 502 has pushed the blocker 590 back in the direction of arrow 503, and the actuator 550 has biased the latch 530 toward a first position 1110 in which the first jaw 512 and the second jaw 532 capture and retain the anchor 502. More specifically, the biasing member 1074 (FIG. 10) pushes against the contact surface 966 of the actuator 550 and urges the actuator 550 in the direction of arrow 805 to position A. This causes the second abutment surface 955 of the engagement feature 552 to drive the first guide feature 546a toward the first end portion 650a of the "V"-shaped first opening 516. When the first guide feature 546a is in this location, the second guide feature 546b is positioned toward the second end portion 652b of the second opening 518.

When the actuator 550 is at position A, the latch 530 is in the first position 1110 and the latch assembly 500 is closed. Moreover, the latch assembly 500 will remain closed and attached to the anchor 502 until a user (not shown) moves the actuator 550 in the direction of arrow 503 as described below with reference to FIGS. 11C-11F.

In FIGS. 11C and 11D, the latch assembly 500 is still closed (i.e., the anchor 502 is still retained between the first jaw 512 and second jaw 532), but the user has moved the actuator 550 in the direction of arrow 503 from position A to position B. As the actuator 550 moves in this manner, the first abutment surface 954 of the engagement feature 552 pulls the first guide feature 546a away from the first end portion 650a of the first opening 516. At the same time, the second guide feature 546b moves downwardly through the second opening 518 until it contacts the pivot surface 619. This movement causes the latch 530 to rotate about the anchor 502 in the direction of arrow 1105 from the first position 1110 (FIG. 11A) to a second position 1112. Accordingly, in the illustrated embodiment a cross-sectional center portion 1104 of the anchor 502 can represent a first pivot point of the latch 530. Although the latch 530 rotates to the second position 1112 when the actuator is moved to position B, the latch assembly 500 still remains attached to the anchor 502.

Referring next to FIGS. 11E and 11F, to fully release the latch assembly 500 from the anchor 502, the user continues moving the actuator 550 in the direction of arrow 503 from position B toward position C. As the actuator 550 moves in this manner, the first abutment surface 954 continues to contact the first guide feature 546a and drive it toward the second end portion 650b of the first opening 516. The second guide feature 546b, however, remains at the first end portion 652a of the second opening 518 in contact with the pivot surface 619.

As a result, the latch 530 rotates about the second guide feature 546b in the direction of arrow 807 from the second position 1112 (FIG. 11C) to a third position 1114. Accordingly, when the second guide feature 546b is positioned at the pivot surface 619, a cross-sectional center portion 1106 of the second guide feature 546b can represent a second pivot point of the latch 530. When the actuator 550 is at position C, the latch 530 is in the third position 1114 and the latch assembly 500 is open.

As shown by comparing FIG. 11D to FIG. 11F, when the actuator 550 is moved back to position C and the latch assembly 500 is moved away from the anchor 502, the first biasing member 820 drives the blocker 590 forward in the direction of arrow 805 until the blocking surface 706 moves under the abutment surface 636 and holds the latch 530 in the open position. The forward movement of the blocker 590 can help eject the anchor 502 from the latch mouth 580. The first guide feature 546a holds the actuator 550 back in position C against the compressive force of the second biasing member 1074. The latch 530 will remain in the open position until the anchor 502 or other structure pushes the blocking surface 706 back in the direction of arrow 503 and out from under the abutment surface 636.

Returning to FIGS. 11C and 11D, when the anchor 502 presses against the blocker 590 and pushes it back in the direction of arrow 503, the blocking surface 706 moves back toward the clearance recess 638 of the latch 530 and out of the way of the abutment surface 636. This allows the latch 530 to rotate downwardly in the direction of arrow 505 and capture the anchor 502 between the latch engagement surface 634 and the frame engagement surface 614. More specifically, the second biasing member 1074 (FIG. 10) urges the second abutment surface 955 of the engagement feature 552 against the first guide feature 546a. This drives the first guide feature 546a from the second end portion 650b of the "V"-shaped first opening 516 toward the vertex of the first opening 516. As the first guide feature 546a moves along this path, the latch 530 rotates about the second pivot point 1106 in the direction of arrow 505 and the actuator 550 moves from position C to position B.

Returning next to FIGS. 11A and 11B, the second biasing member 1074 continues to drive the actuator 550 in the direction of arrow 805 from position B to position A. This causes the first guide feature 546a to move toward the first end portion 650a of the first opening 516 and the second guide feature 546b to move toward the second end portion 652b of the second opening 518. As the guide features 546 move along these paths, the latch 530 rotates about the first pivot point 1104 in the direction of arrow 1107 to the first position 1110. When the latch 530 is in this position, the actuator 550 is at position A and the latch assembly 500 is closed about the anchor 502.

Figure 12A:
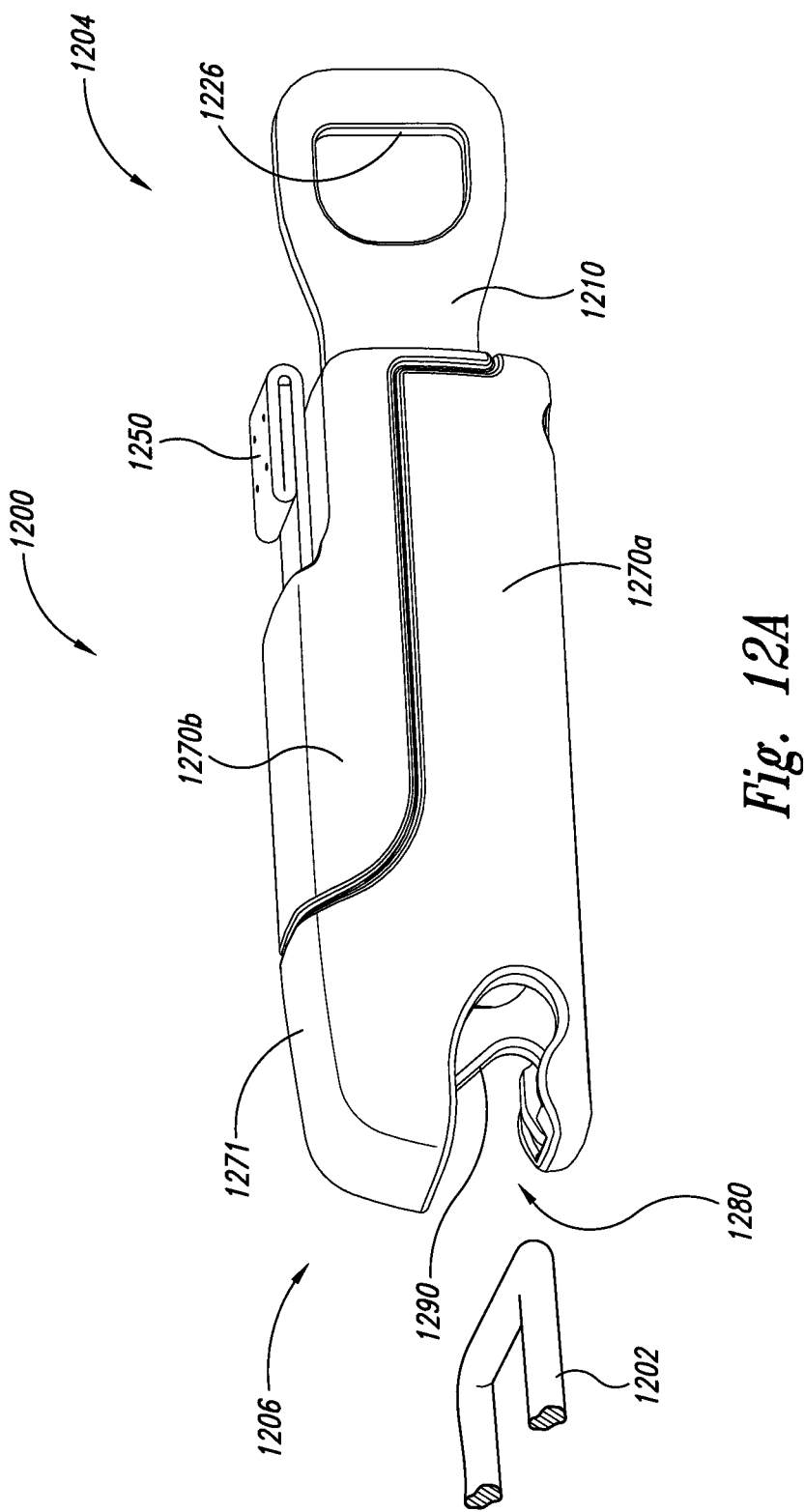
FIG. 12A is an isometric view of a latch assembly configured in accordance with another embodiment of the disclosure.
Figure 12B:
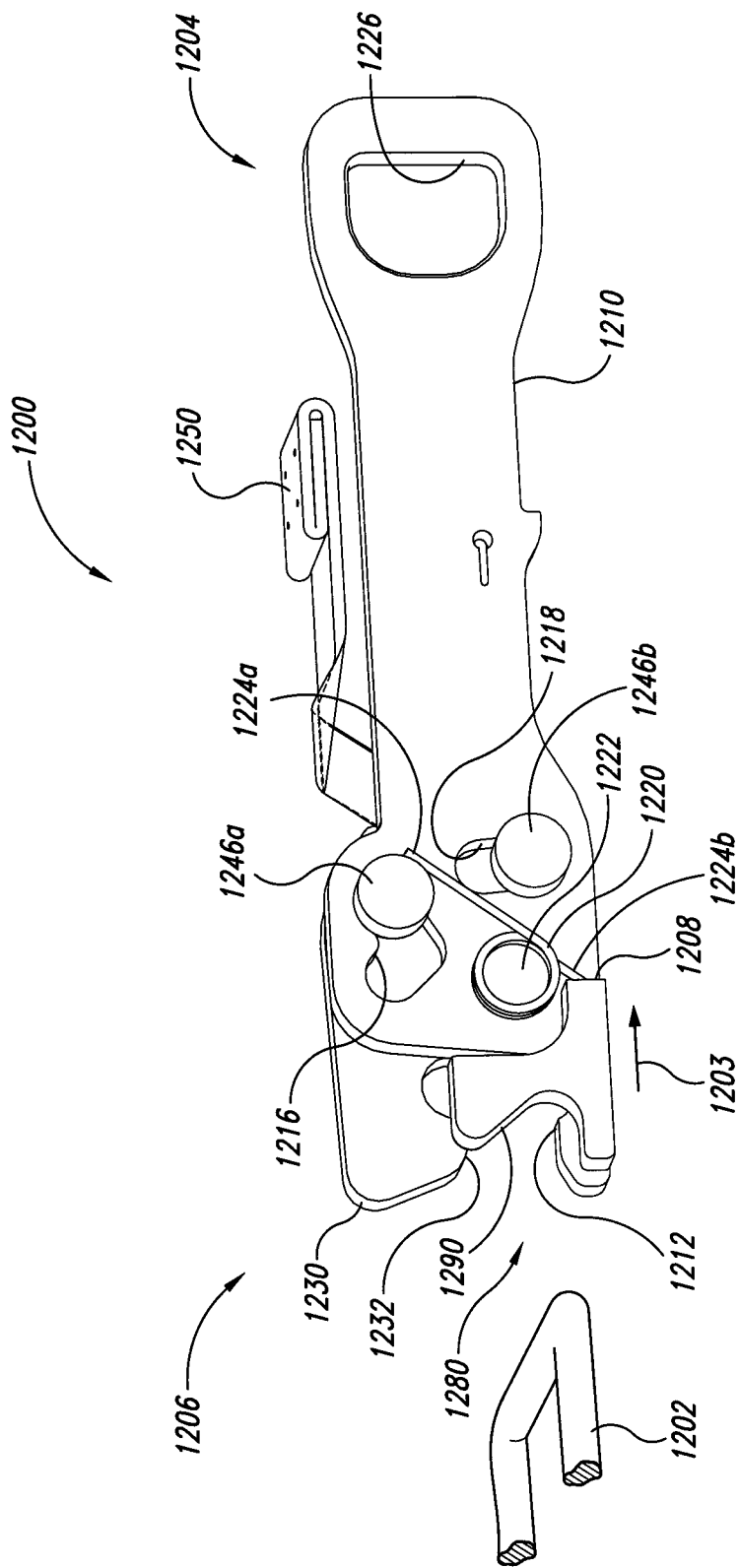
FIG. 12B is an isometric view of the latch assembly with the housing removed for purposes of illustration.

FIG. 12A is an isometric view of a latch assembly 1200 configured in accordance with another embodiment of the disclosure, and FIG. 12B is an isometric view of the latch assembly 1200 with a housing 1271 removed for purposes of illustration. As with the latch assemblies 100 and 500 described in detail above, the latch assembly 1200 can be used for a number of different restraint systems and in a number of different arrangements. In one embodiment, for example, the latch assembly 1200 can be used in place of the latch assembly 100 (or the latch assembly 500) to secure the passenger restraint 110 to the seat 104 as shown in FIG. 1. In other embodiments, however, the latch assembly 1200 can be attached to other anchors in other arrangements in the vehicle 116 as well as other types of vehicles.

Referring to FIGS. 12A and 12B together, many features of the latch assembly 1200 are at least generally similar in structure and function to corresponding features of the latch assembly 500 described above with reference to FIGS. 5A-11F. For example, the latch assembly 1200 includes a pivotable member or latch 1230 operably coupled to a frame 1210. Like their counterparts described above, the latch 1230 and the frame 1210 can be formed from suitable types of metals including, for example, steel, stainless steel, or steel alloy plate or sheet that is stamped, forged, cut, machined, cast and/or otherwise formed to shape. In other embodiments, the latch 1230 and/or the frame 1210 can be formed from other suitable metallic materials (e.g., aluminum, titanium, etc.), other suitable non-metallic materials (e.g., fiber-reinforced resin materials such as graphite epoxy, carbon fiber, etc.), and/or other materials having suitable strength, manufacturing, cost and/or other characteristics known in the art. The housing 1271 includes a bottom or first portion 1270a that fits together with a top or second portion 1270b. The housing portions 1270 can be manufactured from various types of injection-molded plastic (e.g., polypropylene or other thermoplastic polymers), thermal-setting resins, fiber-reinforced resins, and/or other suitable materials known in the art.

As described in greater detail below, in one aspect of this embodiment the latch assembly 1200 further includes a release actuator in the form of a lanyard-type pull web or pull strap 1250. The pull strap 1250 extends through an aperture in the second housing portion 1270b and is fixedly attached to the latch 1230. The pull strap 1250 can be formed from various types of strong and flexible materials, including woven fabric materials typically used for seat belts or webbing (e.g., woven nylon, polypropylene, polyester, etc.). In other embodiments, the pull strap can be manufactured from plastics, nylon, leather, and/or other materials having suitable strength.

The latch assembly 1200 includes a proximal end portion 1204 and a distal end portion 1206. The proximal end portion 1204 includes a web aperture or opening 1226 configured to receive and be securely attached to, for example, a conventional seatbelt, strap or web (e.g., a woven fiber web), such as the belt 112 illustrated in FIG. 1. A web or other structure can be attached to the frame 1210 via the opening 1226 using any number of different techniques known in the art (e.g., by passing an end portion of the web through the opening 1226 and then stitching the end portion to the web to form a closed loop). In addition, those of ordinary skill in the art will appreciate that in other embodiments a web can be attached to the frame 1210 using other known techniques, such as fasteners. Moreover, in still further embodiments, the web opening 1226 can be configured to be attached to other members and/or other structures. For example, in some embodiments the web opening 1226 can be attached directly to a child seat or other passenger restraint, or to a structural member carried by the child seat, passenger restraint or vehicle. Accordingly, the latch assembly 1200 described herein is not limited to the particular methods of use illustrated in the accompanying figures and described herein, but can be utilized in a wide variety of applications to secure persons, cargo, equipment, etc. in moving vehicles without departing from the spirit or scope of the present disclosure.

The distal end portion 1206 of the latch assembly 1200 includes a mouth 1280 configured to receive a structural member such as a metal bar or anchor 1202. The anchor 1202 can be at least generally similar in structure and function to the anchors 102 and 502 described above with reference to FIGS. 1, 5A and 5B, respectively.

In another aspect of this embodiment, the latch assembly 1200 includes a first guide feature 1246a and a second guide feature 1246b that project outwardly from a side portion of the latch 1230. The first guide feature 1246a is movably received in a first guide track or opening 1216 in the frame 1210. The second guide feature 1246b is similarly received in a second guide track or opening 1218 in the frame 1210. In the illustrated embodiment, the guide features 1246 include pins that extend through the respective openings 1216 and 1218 and allow the latch 1230 to pivot back and forth as the guide features 1246 travel from one end of their respective opening to the other.

An ejector 1290 is biased forward in the mouth 1280 by a first biasing member 1220. In the illustrated embodiment, the first biasing member 1220 is a torsion spring having one or more windings which extend around a cylindrical stud 1222 that protrudes outwardly from a side portion of the frame 1210. The torsion spring can be formed from metallic wire, spring steel wire, and/or other suitable materials known in the art. The first biasing member 1220 includes a first end portion 1224a that operably bears against the first guide feature 1246a, and a second end portion 1224b that operably bears against a contact surface 1208 on an aft portion of the ejector 1290.

As described in greater detail below, a second biasing member (not shown in FIGS. 12A and 12B) holds the latch 1230 in the open position illustrated in FIGS. 12A and 12B until the anchor 1202 pushes the ejector 1290 back in the direction indicated by arrow 1203. As the ejector 1290 moves back, the contact surface 1208 pushes against the second end portion 1224b of the first biasing member 1220. This creates a torsional force in the first biasing member 1220 that causes the first end portion 1224a to press against the first guide feature 1246a and drive the first guide feature 1246a forward and downward in the first opening 1216. The torsional force provided by the first biasing member 1220 overcomes the spring force (in the second biasing member) holding the latch 1230 in the open position. As a result, continued movement of the ejector 1290 in the direction indicated by arrow 1203 causes the first guide feature 1246a to continue moving forward and upward in the first opening 1216 until the latch 1230 fully closes about the anchor 1202.

The frame 1210 includes a first jaw 1212 and the latch 1230 includes a corresponding second jaw 1232. When the latch 1230 rotates downwardly, the first jaw 1212 cooperates with the second jaw 1232 to capture and retain the anchor 1202. These and other details of the latch assembly 1200 are described in greater detail below.

Figure 13:
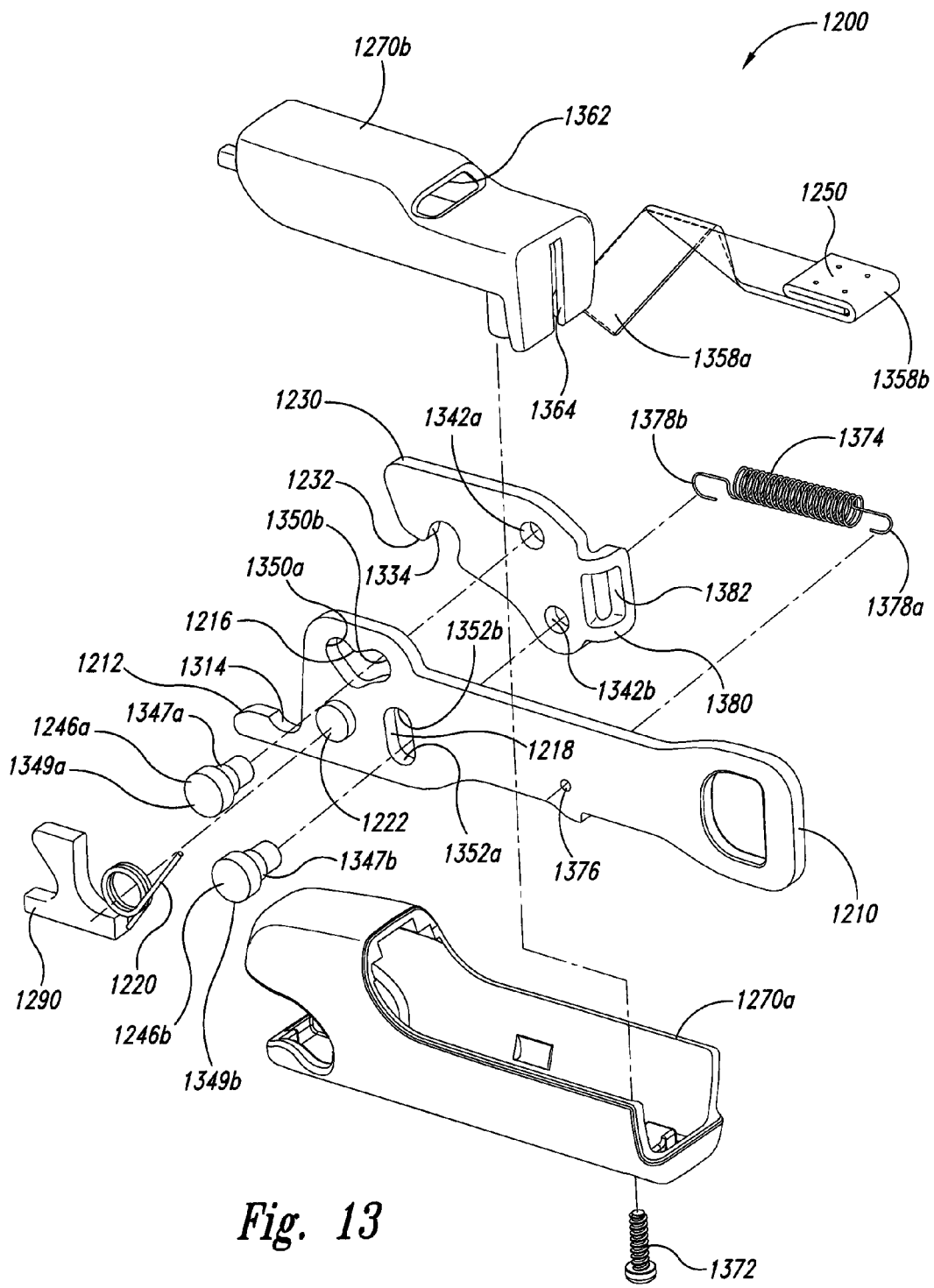
FIG. 13 is an exploded isometric view of the latch assembly of FIGS. 12A and 12B.

FIG. 13 is an exploded rear isometric view of the latch assembly 1200 configured in accordance with an embodiment of the disclosure. In the illustrated embodiment, the first jaw 1212 includes a first engagement surface 1314 configured to at least partially engage the anchor 1202 (FIGS. 12A and 12B). The first engagement surface 1314 forms a raised lip on the first jaw 1212 having a radius of curvature that is at least generally similar to the cross-sectional radius of the bar forming the anchor 1202. In other embodiments, however, the first engagement surface 1314 can have other shapes.

Turning next to the latch 1230, the second jaw 1232 includes a second engagement surface 1334 configured to cooperate with the first engagement surface 1314 to engage and retain the anchor 1202 within the mouth 1280 when the latch 1230 is in the closed position. In the illustrated embodiment, the second engagement surface 1334 has a generally semi-circular shape with a radius of curvature that is at least generally similar to the radius of curvature of the first engagement surface 1314. As a result, the first engagement surface 1314 and the second engagement surface 1334 can at least approximate the cross-sectional shape of the anchor 1202 when closed together. In other embodiments, however, the second engagement surface 1334 can have other shapes including, for example, other circular and non-circular (e.g., rectilinear) shapes.

In another aspect of this embodiment, the latch 1230 includes a first aperture 1342a configured to receive at least a portion (e.g., a distal end portion) of the first guide feature 1246a, and a second aperture 1342b configured to receive at least a portion of the second guide feature 1246b. More specifically, in the illustrated embodiment, the first and second guide features 1246 each include a cylindrical shaft portion 1347 (identified individually as a first shaft portion 1347a and a second shaft portion 1347b) and a corresponding head portion 1349 (identified individually as a first head portion 1349a and a second head portion 1349b) that is larger than the corresponding shaft portion 1347. The first shaft portion 1347a is inserted through the first opening 1216 in the frame 1210 and then into the first aperture 1342a in the latch 1230. Similarly, the second shaft portion 1347b is inserted through the second opening 1218 and into the second aperture 1342b. As with the guide features 546 described above with reference to, e.g., FIG. 6, the guide features 1246 can be fixedly retained in the apertures 1342 by a number of suitable methods known in the art including, for example, press-fit, staking, adhesive, welding, lock rings, etc. In addition to the foregoing features, in the illustrated embodiment, the proximal end portion of the latch 1230 includes a flange 1380 having an aperture 1382 formed therein to receive a distal end portion 1358a of the pull strap 1250. As described in greater detail below, the distal end portion 1358a of the pull strap 1250 passes through the aperture 1382 to fixedly attach the pull strap 1250 to the latch 1230.

In the illustrated embodiment, the first opening 1216 in the frame 1210 is a non-circular opening that forms a slot or track having a generally "V"-shape with a first semi-circular end portion 1350a and a second semi-circular end portion 1350b. The second opening 1218 is similarly a non-circular opening that forms a slot having a straight, or an at least approximately straight shape with a first semi-circular end portion 1352a and a second semi-circular end portion 1352b. In other embodiments, the first opening 1216 and the second opening 1218, and the corresponding first and second end portions 1350 and 1352, respectively, can have other shapes to, for example, accommodate different motions of the first guide feature 1246a and/or the second guide feature 1246b.

As mentioned above, the latch assembly 1200 also includes a second biasing member 1374. In the illustrated embodiment, the second biasing member 1374 is a coil spring having a first end portion 1378a formed in the shape of a hook, and a second end portion 1378b that is also formed into a hook shape. The first end portion 1378a is engaged with a spring aperture 1376 in the frame 1210, and the second end portion 1378b is engaged with the proximal end portion of the latch 1230 via the aperture 1382. In operation, the second biasing member 1374 is stretched in tension and biases the latch 1230 toward the open position (FIGS. 12A and 12B). In other embodiments, the second biasing member 1374 can have other configurations and/or be made from other materials. For example, in one embodiment the second biasing member 1374 can be a rubber or other elastic member, or a torsion spring that biases the latch 1230 toward the open position. Moreover, in other embodiments the second biasing member 1374 can be operably coupled between the latch 1230 and the frame 1210 (or other member) in other ways, such as with fasteners rather than hooks.

The latch assembly 1200 can be assembled in one embodiment as follows. First, the distal end portion 1358a of the pull strap 1250 can be inserted through the aperture 1382 in the latch flange 1380 and sewn or otherwise fixedly attached to the latch flange 1380. The latch 1230 can then be moveably coupled to the frame 1210 via the guide features 1246. Next, the second biasing member 1374 can be operably extended between the aperture 1382 in the latch flange 1380 and the spring aperture 1376 in the frame 1210. The first biasing member 1220 can then be positioned over the stud 1222 as illustrated in FIG. 12B. The ejector 1290 can then be positioned in its forward location in the first housing portion 1270a, followed by the frame 1210 and latch 1230 sub-assembly. Once these components are properly positioned in the first housing portion 1270a, the pull strap 1250 can be fed through a strap aperture 1362 in the second housing portion 1270b, and the second housing portion 1270b can be mated to the first housing portion 1270a so that the frame 1210 fits neatly into a slot 1364 formed in a proximal end portion of the second housing portion 1270b. Once the first and second housing portions 1270 are properly fit together as shown in FIG. 12A, a screw or other suitable fastener(s) 1372 can be inserted through a suitable aperture in the first housing portion 1370a and threadably engaged with corresponding socket on the second housing portion 1370b to complete assembly.

FIGS. 14A-14F are a series of views illustrating various stages of operation of the latch assembly 1200 with the housing 1271 removed for purposes of illustration and clarity. FIGS. 14A, 14C and 14E are left side views of the latch assembly 1200, and FIGS. 14B, 14D and 14F are corresponding right side views of the latch assembly 1200. In the embodiment illustrated in FIGS. 14A-14F, the latch 1230 rotates about two different pivot points during operation.

Referring first to FIGS. 14A and 14B together, the anchor 1202 has pushed the ejector 1290 back in the direction of arrow 1203, and the resulting torsional force on the first biasing member 1220 has caused the first end portion 1224a to drive the latch 1230 toward a first position 1410 in which the first jaw 1212 and the second jaw 1232 capture and retain the anchor 1202. More specifically, the first end portion 1224a of the first biasing member 1220 pushes against the first guide feature 1246a, and drives the first guide feature 1246a toward the first end portion 1350a of the "V"-shaped first opening 1216. When the first guide feature 1246a is in this location, the second guide feature 1246b is positioned toward the second end portion 1352b of the second opening 1218.

When a proximal end portion 1358b of the pull strap 1250 is in position A and the latch 1230 is in the first position 1410, the latch assembly 1200 is closed. Moreover, the latch assembly 1200 will remain closed and attached to the anchor 1202 until a user (not shown) grasps the pull strap 1250 and pulls it in the direction of arrow 1203 as described below with reference to FIGS. 14C-14F.

As shown in FIG. 14B, when the latch assembly 1200 is in the first and closed position 1410, the second biasing member 1374 is extended in tension. Although the tension force tends to pull the latch 1230 back in the direction of arrow 1203 and pivot the latch about the anchor 1202, the torsional resistance applied by the first biasing member 1220 (FIG. 14A) overcomes the tension in the second biasing member 1374 and, as a result, holds the latch 1230 in the closed position 1410.

Referring next to FIGS. 14C and 14D, in these views the latch assembly 1200 is still closed (i.e., the anchor 1202 is still retained between the first jaw 1212 and the second jaw 1232), but the user has pulled the proximal end portion 1358b of the pull strap 1250 back in the direction of arrow 1203 from position A to position B. As the pull strap 1250 moves in this direction, it pulls on the latch 1230 and overcomes the torsional resistance of the first biasing member 1220, causing the first guide feature 1246a to move away from the first end portion 1350a of the first opening 1216. At the same time, the second guide feature 1246b moves downwardly through the second opening 1218 until it contacts the pivot surface at the first end portion 1352a. This movement causes the latch 1230 to rotate about the anchor 1202 in the direction of arrow 1405 from the first position 1410 (FIG. 14A) to a second position 1412. Although the latch 1230 rotates to the second position 1412 when the pull strap is moved to position B, the latch assembly 1200 still remains attached to the anchor 1202.

Referring next to FIGS. 14E and 14F, to fully release the latch assembly 1200 from the anchor 1202, the user continues pulling the proximal end portion 1358b of the pull strap 1250 in the direction of arrow 1203 from position B toward position C. As the pull strap 1250 moves in this direction, it pulls on the latch 1230, causing the first guide feature 1246a to move toward the second end portion 1350b of the first opening 1216. The second guide feature 1246b, however, remains at the first end portion 1352a of the second opening 1218. As a result, the latch 1230 rotates or pivots about the second guide feature 1246b in the direction of arrow 1407 from the second position 1412 (FIG. 14C) to a third position 1414. When the proximal end portion 1358b of the pull strap 1250 is in position C, the latch 1230 is in the third position 1414 and the latch assembly 1200 is open.

As illustrated by comparing FIG. 14C to FIG. 14E, when the pull strap 1250 is moved back to position C and the latch assembly 1200 is moved away from the anchor 1202, the torsional force in the first biasing member 1220 causes the second end portion 1224b of the first biasing member 1220 to drive the ejector 1290 forward in the direction of arrow 1408 and push the anchor 1202 away from the latch mouth 1280 (or, conversely, push the latch assembly 1200 away from the anchor 1202). The second biasing member 1374 holds the latch 1230 back in the open position 1414, and the latch 1230 will remain in this position until the anchor 1202 or another structure pushes the ejector 1290 back in the direction of arrow 1203.

Returning to FIGS. 14C and 14D, when the anchor 1202 presses against the ejector 1290 and pushes it back in the direction of arrow 1203, the torsional force in the first biasing member 1220 overcomes the tension in the second biasing member 1374 and drives the first guide feature 1246a forward in the first opening 1216. This causes the latch 1230 to rotate downwardly in the direction of arrow 1409 and capture the anchor 1202 between the latch engagement surface 1334 and the frame engagement surface 1314 (FIG. 13). More specifically, the first end portion 1224a of the first biasing member 1220 urges the first guide feature 1246a from the second end portion 1350b of the "V"-shaped first opening 1216 toward the vertex of the first opening 1216. As the first guide feature 1246a moves along this path, the latch 1230 rotates in the direction of arrow 1409 about the second guide feature 1246b and the pull strap 1250 moves from position C to position B.

Returning next to FIGS. 14A and 14B, the first biasing member 1220 continues to drive the first guide feature 1246a toward the first end portion 1350a of the first opening 1216. Concurrently, the second guide feature 1246b moves toward the second end portion 1352b of the second opening 1218. As the guide features 1246 move along their respective paths, the latch 1230 rotates about the anchor 1202 in the direction of arrow 1406 to the first position 1410. When the latch 1230 is in this position, the proximal end portion 1358b of the pull strap 1250 has returned to position A and the latch assembly 1200 is fully closed about the anchor 1202.

Figure 15A:
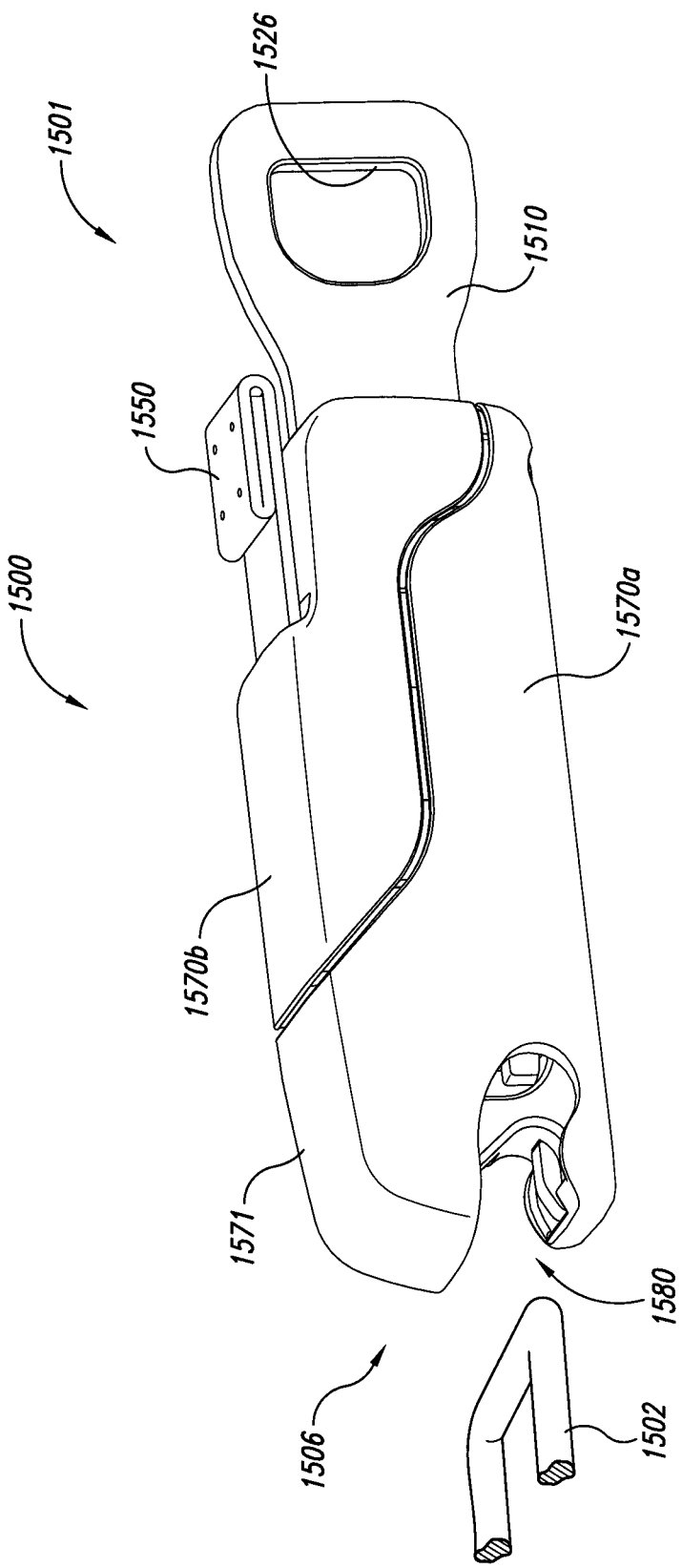
FIG. 15A is an isometric view of a latch assembly configured in accordance with a further embodiment of the disclosure.
Figure 15B:
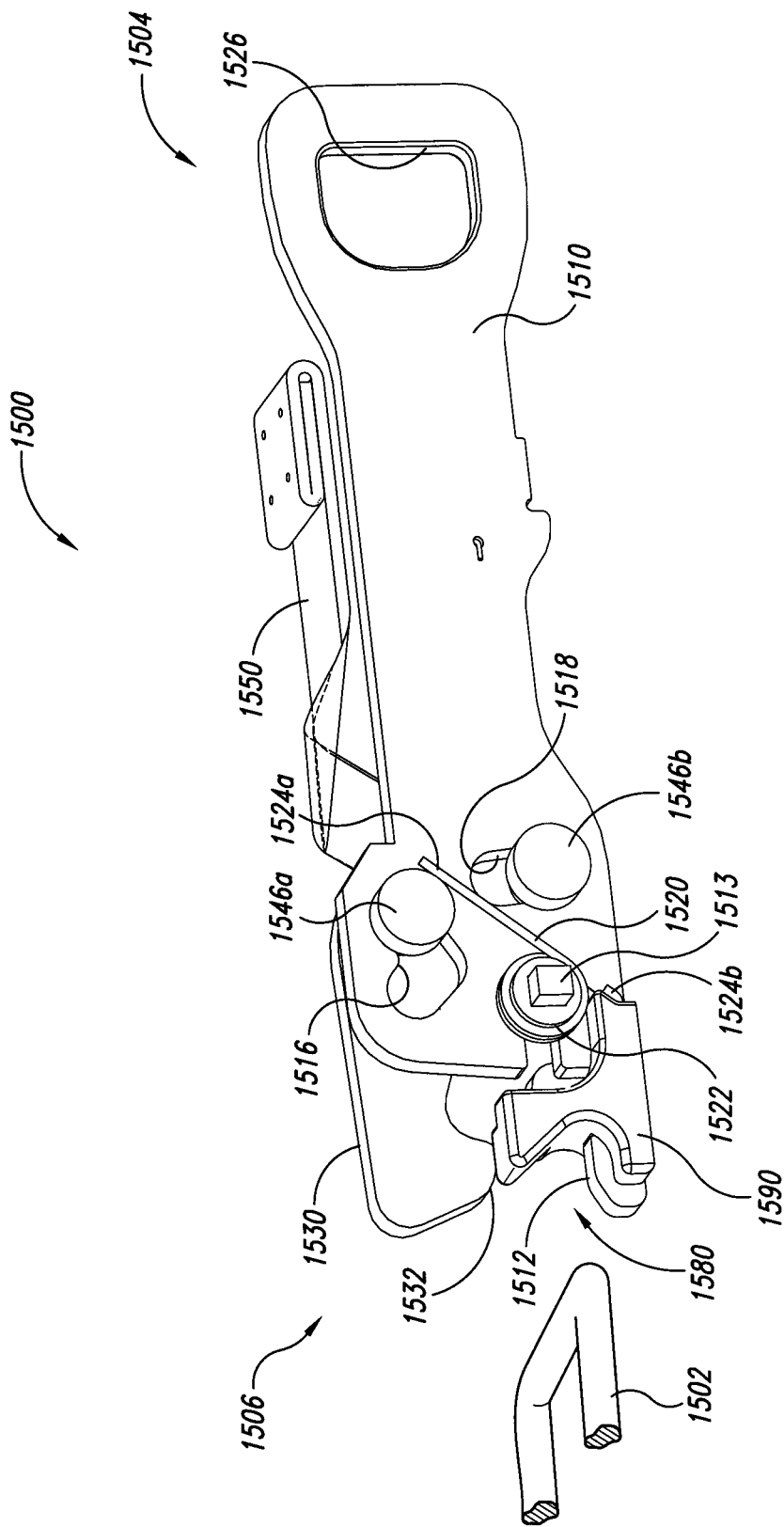
FIG. 15B is an isometric view of the latch assembly with a housing removed for purposes of illustration.

FIG. 15A is an isometric view of a latch assembly 1500 configured in accordance with another embodiment of the disclosure, and FIG. 15B is an isometric view of the latch assembly 1500 with a housing 1571 removed for purposes of clarity. The housing 1571 includes a bottom or first portion 1570a that fits neatly together with a complimentary top or second portion 1570b to enclose a portion of the latch assembly 1500 therewithin. As with the housing portions 1270 discussed above with reference to FIGS. 12A-13, the housing portions 1570 can be manufactured from various types of suitable materials known in the art including, for example, injection-molded plastic materials, thermosetting resins, etc., and can be joined together by one or more screws or other suitable fasteners.

Referring to FIGS. 15A and 15B together, in these views the latch assembly 1500 is open prior to engagement with a structural member, such as a metal bar or anchor 1502. The anchor 1502 can be at least generally similar in structure and function to the anchors 102, 502 and 1202 described above. Many features of the latch assembly 1500 can be at least generally similar in structure and function to corresponding features of the latch assembly 1200 described in detail above with reference to FIGS. 12A-14F. For example, the latch assembly 1500 includes a frame 1510 having a web aperture or opening 1526. The opening 1526 is positioned toward a proximal end portion 1504 of the latch assembly 1500, and is configured to receive, for example, a conventional seat belt or web, such as the belt 112 described above with reference to FIG. 1. As discussed above with reference to the latch assembly 1200, the web, belt or other member can be attached to the frame 1510 via the opening 1526 using any number of suitable methods known in the art including. Such methods include, for example, passing an end portion of the web through the opening 1526 and then stitching the end portion to the web to form a closed loop through the opening 1526. In other embodiments, a belt or web can be attached to the frame 1510 using rivets and/or other types of suitable fasteners known in the art.

In still further embodiments, the frame 1510 can be attached to structures and/or members other than a belt or web. For example, in some embodiments the frame 1510 can be attached directly to a child seat, passenger restraint, or other portion of the vehicle (or to a structural member carried by the child seat, passenger restraint, or other portion of the vehicle) via the opening 1526 or via another portion of the frame 1510. In yet other embodiments, an adjustable buckle (e.g., the adjustable buckle 114 shown in FIG. 1), a web adjuster, or a web retractor can be fixedly attached to the latch assembly 1500 or otherwise incorporated into the latch assembly 1500 toward the proximal end portion 1504. In these embodiments, the belt or web can be operably coupled to the latch assembly 1500 via the adjustable buckle, web adjuster, or retractor.

As with the latch assemblies 100, 500 and 1200 described in detail above, the latch assembly 1500 can be used in a number of different restraint systems and in a number of different arrangements. In one embodiment, for example, the latch assembly 1500 can be used in place of the latch assembly 100 to secure the child safety seat (passenger restraint 110) to the seat 104 as shown in FIG. 1. In other embodiments, however, the latch assembly 1500 can be used to secure a child safety seat to the seat 104 and/or to other portions of the vehicle 116 in other arrangements (e.g., child seat facing forward, aft, etc.). For example, in various embodiments the latch assembly 1500 (or the latch assembly 1200, 500 or 100 described above) can be used as a latch in the systems described in U.S. Provisional Application No. 61/167,484, entitled "Child Safety Seat Attachment Belt Retractor System," which is incorporated herein in its entirety by reference. Accordingly, the latch assembly 1500 described herein is not limited to use in the particular arrangements and combinations illustrated in the accompanying figures, but can be utilized in a wide variety of applications and arrangements to secure child seats, persons, cargo, equipment, etc. in moving vehicles without departing from the spirit or scope of the present disclosure.

A distal end portion 1506 of the latch assembly 1500 includes a mouth 1580 configured to receive the anchor 1502. A pivotable lever or latch 1530 is operably coupled to the frame 1510 proximate the mouth 1580 by a first guide feature 1546a and a second guide feature 1546b. The first guide feature 1546a is moveably received in a first guide track or opening 1516 in the frame 1510, and the second guide feature 1546b moveably received in a second opening 1518 in the frame 1510. In the illustrated embodiment, the first and second guide features 1546 can be at least generally similar in structure and function to the corresponding first and second guide features 1246 described in detail above. As described in greater detail below, the frame 1510 includes a first jaw 1512 that cooperates with a second jaw 1532 on the latch 1530 to capture and retain the anchor 1502 when the anchor 1502 is inserted into the mouth 1580.

Like their counterparts described above with reference to the latch assembly 1200, the latch 1530, the frame 1510, and/or the guide features 1546 can be formed from suitable types of metallic materials. Moreover, the guide features 1546 can be attached to the latch 1530 in a manner that is at least generally similar to that described above for the latch assembly 1200. In other embodiments, however, the latch 1530, the frame 1510, and/or the guide features 1546 can be formed from non-metallic materials (e.g., fiber-reinforced resin materials), and/or other suitable materials known in the art.

The latch assembly 1500 further includes a first biasing member 1520. In the illustrated embodiment, the first biasing member 1520 is a torsion spring that is at least generally similar in structure and function to the first biasing member 1220 described above with reference to FIGS. 12B-14F. The torsion spring can be formed from metallic wire, spring steel wire, and/or other suitable materials known in the art. In other embodiments, the first biasing member 1520 can be replaced or augmented by one or more other biasing members known in the art, such as flat springs, hair pin springs, compression springs (e.g., coil springs), rubber members, and/or other resilient members. In one aspect of this embodiment, however, the first biasing member 1520 includes one or more windings that extend around a cylindrical sleeve or bushing 1522 (e.g., a Delrin® bushing, plastic bushing, metal bushing, etc.) that is inserted onto a stud 1513 (e.g., a square stud) that projects outwardly from the frame 1510. The first biasing member 1520 also includes a first end portion 1524a that contacts and presses against the first guide feature 1546a, and a second end portion 1524b that presses against an ejector 1590. The ejector 1590 is slideably positioned on the frame 1510, and is biased forward in the mouth 1580 by the second end portion 1524b of the first biasing member 1520. The ejector 1590 is similar in structure and function to the ejector 1290 described above with reference to FIGS. 12B-14F, but differs in shape as described in more detail below with reference to FIGS. 17A and 17B.

The latch assembly 1500 further includes a release actuator in the form of a web, tether, or pull strap 1550. The pull strap 1550 is operably coupled to the latch 1530, and is at least generally similar in structure and function to the pull strap 1250 described in detail above with reference to FIGS. 12A-14F. Accordingly, the pull strap 1550 can be formed from various types of durable, strong and flexible materials known in the art, including woven fabric materials such as those typically used for seatbelts or webbing (e.g., woven nylon, polypropylene, polyester, etc.). In other embodiments, however, the latch assembly 1500 can utilize other types of release actuators, including both flexible and non-flexible actuators such as push buttons, pull buttons, triggers, etc.

The latch assembly 1500 operates in a manner that is at least generally similar to the latch assembly 1200 described in detail above. Further details describing the operation of the latch assembly 1500 are provided below with reference to FIGS. 18A-18F.

Figure 16:
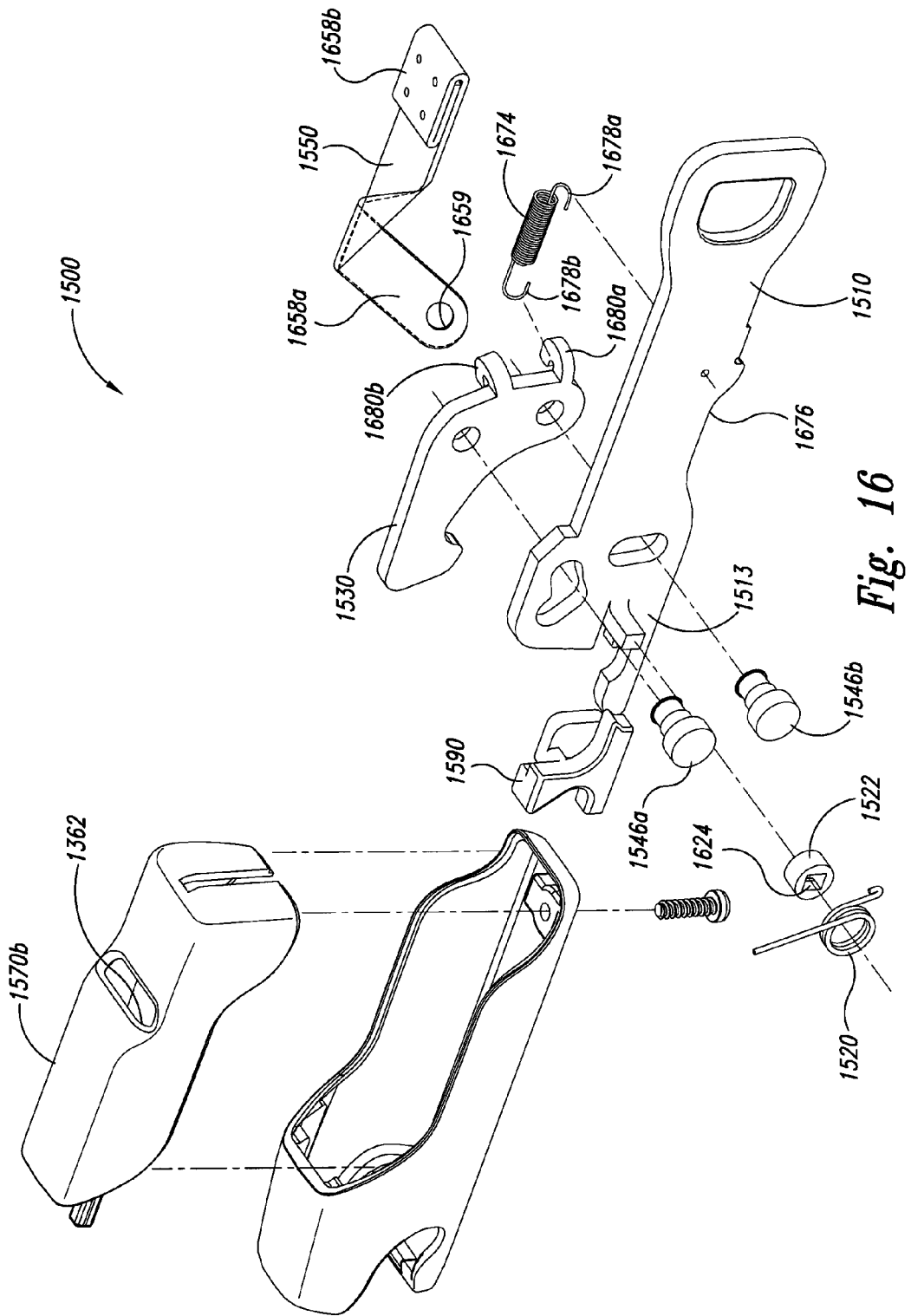
FIG. 16 is an exploded rear isometric view of the latch assembly of FIGS. 15A and 15B.

FIG. 16 is an exploded rear isometric view of the latch assembly 1500 configured in accordance with an embodiment of the disclosure. In the illustrated embodiment, the bushing 1522 includes an aperture 1624 (e.g., a square or rectangular aperture) that enables the bushing 1522 to fit securely over the stud 1513. In this embodiment, the stud 1513 is formed by making parallel cuts in a forward edge portion of the frame 1510, and bending the material between the two cuts outwardly at a right angle to the frame 1510. In other embodiments, the stud 1513 can be formed using other suitable techniques or structures known in the art including, for example, by securing a pin or fastener to the frame 1510. In still further embodiments, the bushing 1522 can be omitted and a single stud, pin, fastener, insert, etc. of appropriate shape and size can be used in its place.

In another aspect of the illustrated embodiment, a proximal end portion of the latch 1530 includes a first engagement feature 1680a and a second engagement feature 1680b. In particular embodiments, the engagement features 1680 can be portions of the latch 1530 which are formed into hooks. In other embodiments, the engagement features 1680 can include openings or apertures formed in the latch 1530. Similar to the latch assembly 1200 described above, a second biasing member 1674 biases the latch 1530 toward the open position illustrated in FIGS. 15A and 15B until the anchor 1502 or other structure pushes the ejector 1590 back into the mouth 1580. In the illustrated embodiment, the second biasing member 1674 is a spring (e.g., a coil spring) having a first end portion 1678a formed into a hook shape, and a second end portion 1678b that is also formed into a hook shape. The first end portion 1678a is received in a spring aperture 1676 in the frame 1510, and the second end portion 1678b is coupled to the first engagement feature 1680a on the latch 1530.

In a further aspect of this embodiment, the pull strap 1550 includes a distal end portion 1658a and a proximal end portion 1658b. The distal end portion 1658a passes through an opening 1362 in the second housing portion 1570b and is operably coupled to the second engagement feature 1680b on the latch 1530. More particularly, in the illustrated embodiment the distal end portion 1658a includes an engagement aperture or opening 1659 therein that is configured to fit over the second engagement feature 1680b to operationally attach the pull strap 1550 to the latch 1530.

Figure 17A:
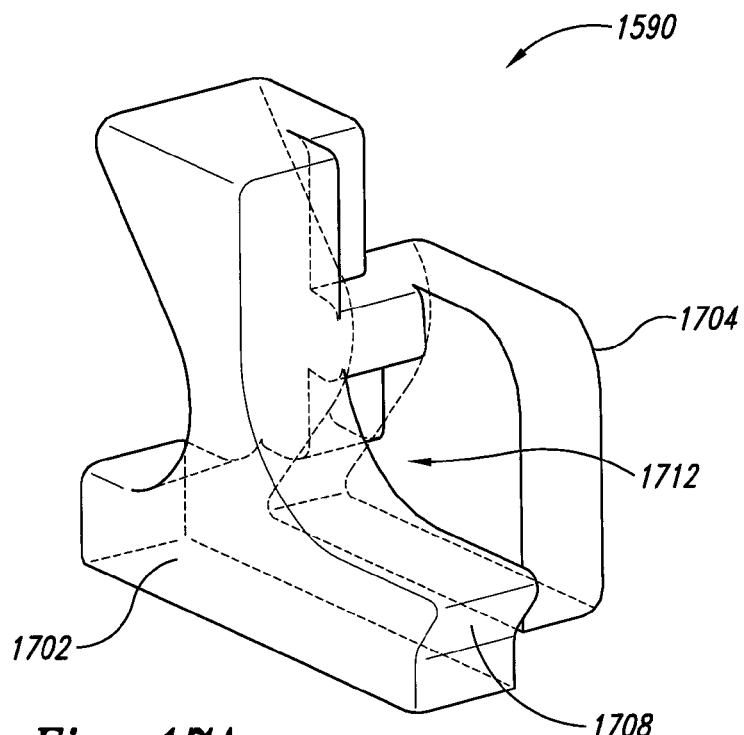
FIGS. 17A and 17B are enlarged rear and front isometric views, respectively, of an ejector from the latch assembly of FIGS. 15A and 15B.
Figure 17B:
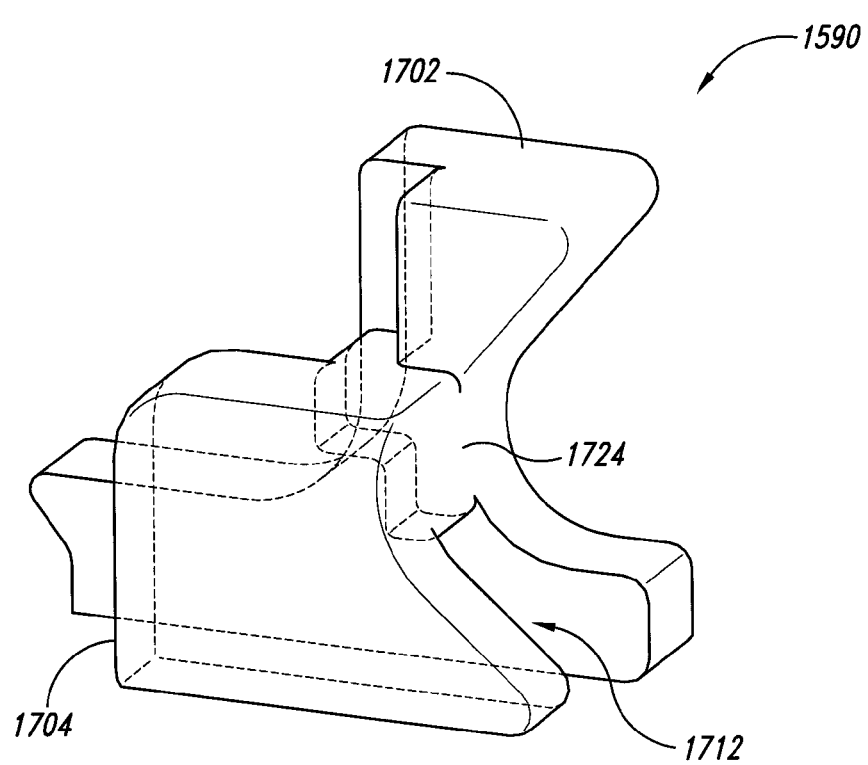

FIGS. 17A and 17B are enlarged rear isometric and front isometric views, respectively, of the ejector 1590 configured in accordance with an embodiment of the disclosure. Referring to FIGS. 17A and 17B together, the ejector 1590 is at least generally similar in structure and function to the ejector 1290 described above with reference to FIGS. 12B-14F. In this particular embodiment, however, the ejector 1590 includes a first side portion 1702, a second side portion 1704, and a channel 1712 extending through a lower portion thereof. The channel 1712 enables the ejector 1590 to slidably straddle the first jaw 1512 of the frame 1510 with the first side portion 1702 positioned on one side of the frame 1510 and the second side portion 1704 positioned on the other side of the frame 1510. The first side portion 1702 of the ejector 1590 includes an angled contact surface 1708 configured to operably engage the second end portion 1524b of the first biasing member 1520 (FIG. 15B). The ejector 1590 further includes a bearing surface 1724 that the anchor 1502 or other structure can contact to drive the ejector 1590 back into the mouth 1580 against the force of the first biasing member 1520. Like the blocker 590 described above with reference to FIGS. 7A-7C, the ejector 1590 can be manufactured from various types of suitable plastics (e.g., polypropylene or other thermoplastic polymers), thermosetting resins, fiber-reinforced resins, Delrin®, and/or other suitable materials known in the art including suitable metallic materials.

FIGS. 18A-18F are a series of side views illustrating various stages of operation of the latch assembly 1500 with the housing 1571 removed for purposes of illustration and clarity. FIGS. 18A, 18C and 18E are left side views of the latch assembly 1500, and FIGS. 18B, 18D and 18F are corresponding right side views of the latch assembly 1500. In the illustrated embodiment, the latch assembly 1500 can operate in the same way, or at least in a very similar way, as the latch assembly 1200 described above with reference to FIGS. 14A-14F. Accordingly, the latch 1530 can pivot about two spaced apart pivot points as moves to the fully open or fully closed position. In other embodiments, the latch assembly 1500 or variations thereof can operate differently.

Referring first to FIGS. 18A and 18B, in these views the latch 1530 is in an open or first position 1814, and remains in this position prior to attachment to the anchor 1502 (shown in partial cross-section in FIGS. 18A-18F for clarity) or other structural member. When the latch 1530 is in the open position 1814, the proximal end portion 1658b of the pull strap 1550 is in position C. To couple the latch assembly 1500 to the anchor 1502, the anchor 1502 is pressed against the ejector 1590 to push the ejector 1590 back in the direction of arrow 1803. This causes the contact surface 1708 of the ejector 1590 to drive the second end portion 1524b of the first biasing member 1520 back in the direction of arrow 1803. This creates torsion in the first biasing member 1520 that causes the first end portion 1524a to overcome the tension in the second biasing member 1674 and drive the first guide feature 1546a forward in the first opening 1516.

Referring next to FIGS. 18C and 18D, as the first end portion 1524a of the first biasing member 1520 urges the first guide feature 1546a forward toward the bottom of the "V"-shaped first opening 1516, the latch 1530 rotates downwardly in the direction of arrow 1809 about the second guide feature 1546b toward a second position 1812. In this embodiment, the second guide feature 1546b (or a cross-sectional center portion thereof) can represent a first pivot point of the latch 1530. This rotation of the latch 1530 causes the proximal end portion 1658b of the pull strap 1550 to move forward from position C to position B. When the latch 1530 is in the second position 1812, the anchor 1502 is captured by a first engagement surface 1814 on the first jaw 1512 and a second engagement surface 1834 on the second jaw 1532.

Referring next to FIGS. 18E and 18F, as the first end portion 1524a of the first biasing member 1520 continues to drive the first guide feature 1546a toward the forward end portion of the first opening 1516, the second guide feature 1546b moves upwardly through the second opening 1518. As the guide features 1546 move along these paths, the latch 1530 rotates about the anchor 1502 in the direction of arrow 1806 to a third or closed position 1810, and the proximal end portion 1658b of the pull strap 1250 moves forward to position A. Accordingly, in this embodiment the anchor 1502 (or a cross-sectional center portion thereof) can represent a second pivot point of the latch 1530.

As shown in FIG. 18F, when the latch 1530 is in the fully closed position 1810, the second biasing member 1674 is extended in tension. Although this tension force tends to pivot the latch 1530 back in the direction of arrow 1805 (FIGS. 18C and 8D), the torsional force in the first biasing member 1520 (FIG. 18E) overcomes the tension in the second biasing member 1374 and, as a result, holds the latch 1530 in the closed position 1810. In the illustrated embodiment, if a force is applied to the latch assembly 1500 in the direction of arrow 1803, the first guide feature 1546a will bear against an upper edge region 1890 of the forward end portion of the first opening 1516 and hold the latch 1530 in the closed position 1810. Accordingly, the latch assembly 1500 is securely coupled to the anchor 1502 when the latch 1530 is in the fully closed position 1810.

The latch assembly 1500 can be released in a manner that is at least generally similar to the manner described above for the latch assembly 1200. More specifically, the user or operator can initiate release by pulling the pull strap 1550 back in the direction of arrow 1803 from position A to position B. As shown in FIGS. 18C and 18D, as the pull strap 1550 moves in this direction, it pulls the latch 1530 and overcomes the torsional resistance of the first biasing member 1520, causing the first guide feature 1546a to move away from the forward end portion of the first opening 1516. At the same time, the second guide feature 1546b moves downwardly through the second opening 1518. This movement causes the latch 1530 to rotate about the anchor 1502 in the direction of arrow 1805 from the closed position 1810 (FIGS. 18E and 18F) to the second position 1812.

Referring next to FIGS. 18A and 18B, to continue releasing the latch assembly 1500, the user continues pulling the proximal end portion 1658b of the pull strap 1550 in the direction of arrow 1803 from position B toward position C. As the pull strap 1550 moves in this direction, it pulls the latch 1530, causing the first guide feature 1546a to move toward the aft end portion of the first opening 1516. The second guide feature 1546b, however, remains at the lower end portion of the second opening 1218. As a result, the latch 1530 rotates or pivots about the second guide feature 1546b in the direction of arrow 1807 from the second position 1812 toward the first or open position 1814. When the proximal end portion 1658b of the pull strap 1550 reaches position C, the latch 1530 is in the open position 1814 and the latch assembly 1500 can be moved away from the anchor 1502.

As illustrated by comparing FIG. 18C to FIG. 18A, when the pull strap 1550 is moved back to position C and the latch assembly 1500 is moved away from the anchor 1502, the torsional force in the first biasing member 1520 causes the second end portion 1524b to drive the ejector 1590 forward in the direction of arrow 1808. The second biasing member 1674 (FIG. 18B) holds the latch 1530 back in the open position 1814, and the latch 1530 remains in this position until the anchor 1502 or other structure pushes the ejector 1590 back in the direction of arrow 1803 during attachment of the latch assembly 1500 to the anchor 1502 or other structure.

Figure 19A:
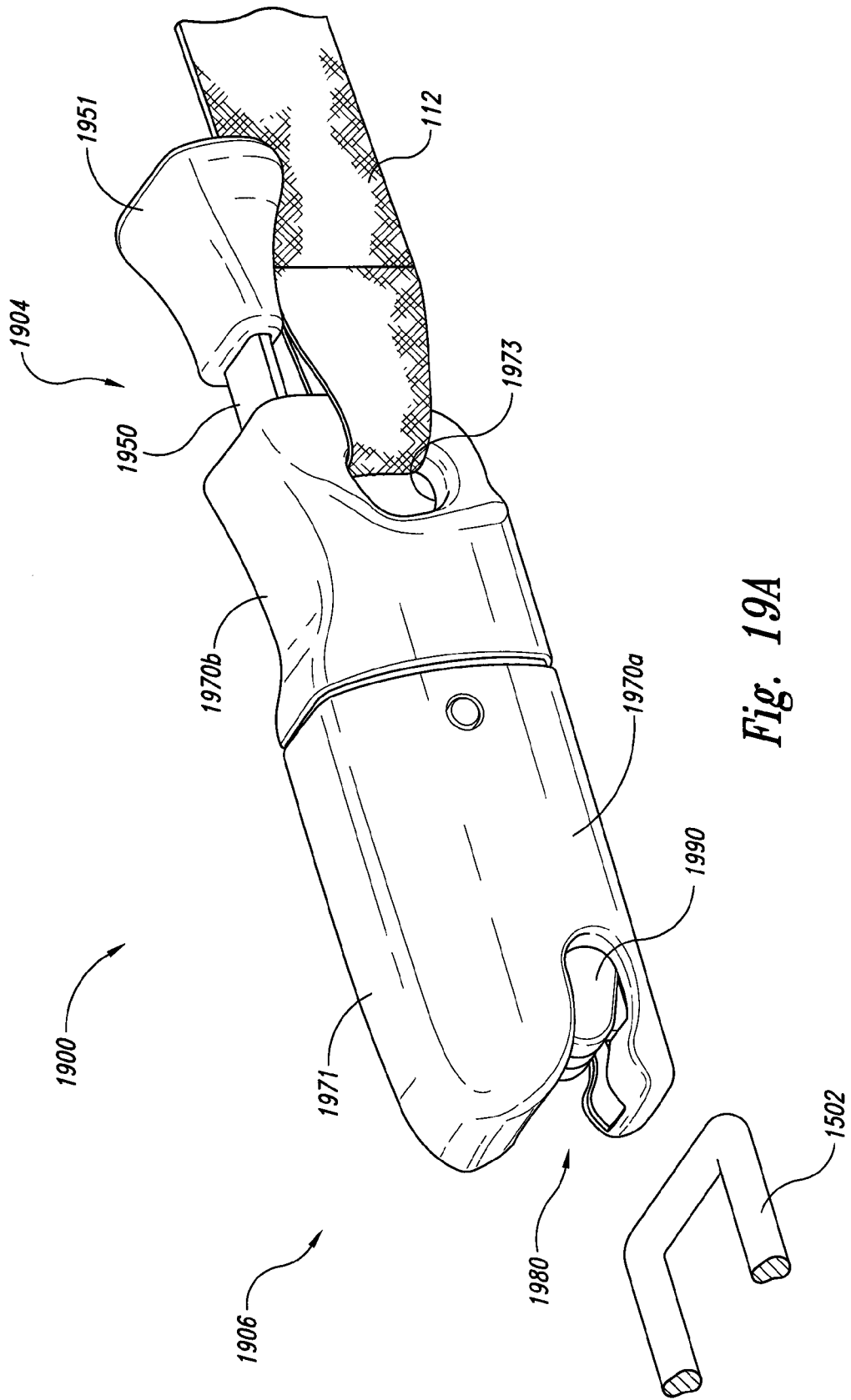
FIG. 19A is an isometric view of a latch assembly configured in accordance with another embodiment of the disclosure.
Figure 19B:
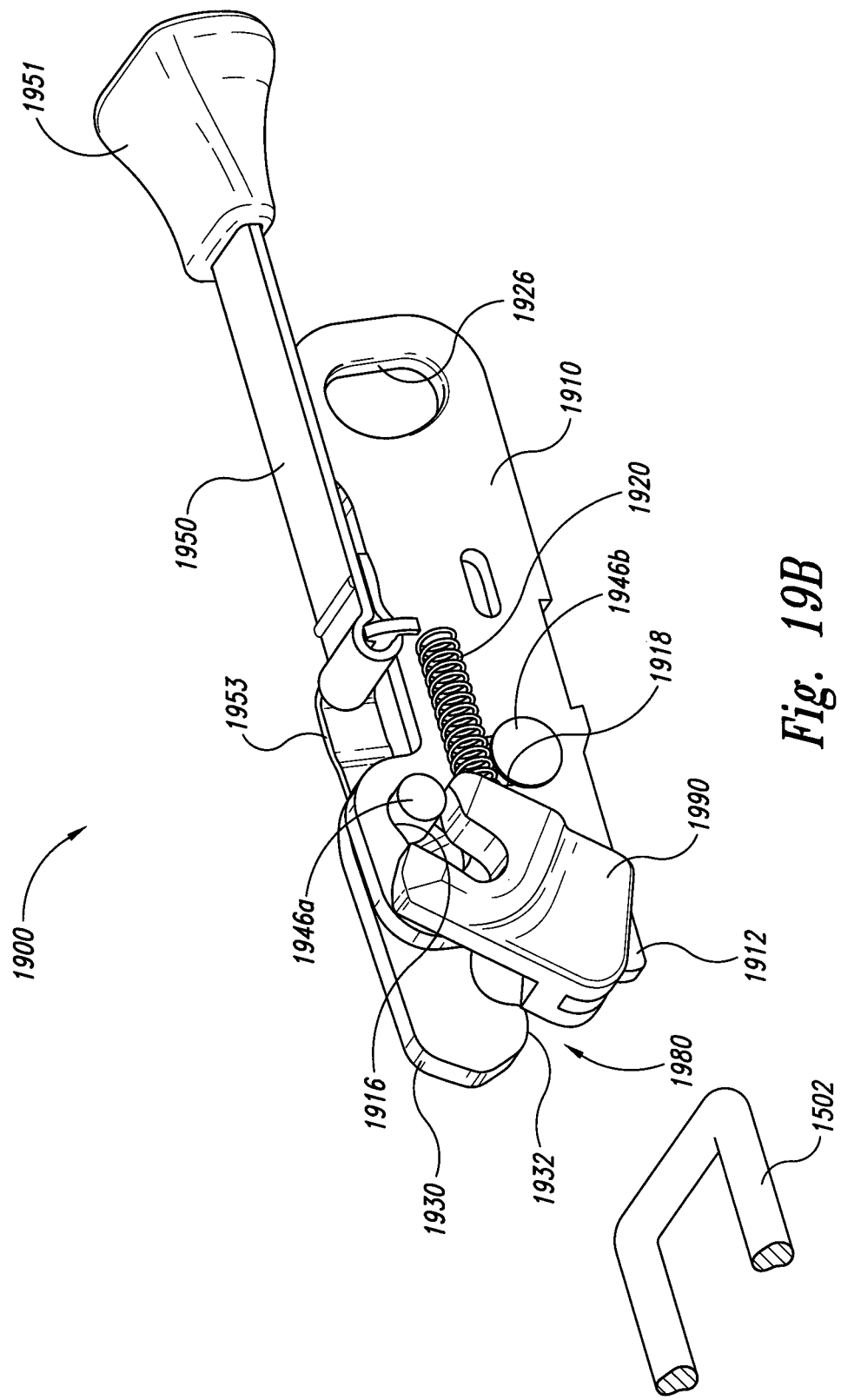
FIG. 19B is an isometric view of the latch assembly with a housing removed for purposes of illustration.

FIG. 19A is an isometric view of a latch assembly 1900 configured in accordance with a further embodiment of the disclosure, and FIG. 19B is an isometric view of the latch assembly 1900 with a housing 1971 removed for ease of illustration. Referring to FIGS. 19A and 19B together, in these views the latch assembly 1900 is shown in an open position prior to engagement to a structural member, such as a metal bar or the anchor 1502. Many features of the latch assembly 1900 can be at least generally similar in structure and function to corresponding features of one or more of the latch assemblies described in detail above with reference to FIGS. 1-18F (e.g., the latch assemblies 100, 500, 1200 and/or 1500). For example, the housing 1971 includes a front or first portion 1970*a* that fits neatly together with a complementary rear or second portion 1970*b* to cover the inner workings of the latch assembly 1900. Moreover, the latch assembly 1900 includes a frame 1910 (e.g., a metal frame) having a web aperture or opening 1926 positioned toward a proximal end portion 1904 of the latch assembly 1900 to receive and engage a conventional seatbelt or web, such as the belt 112 described above with reference to FIG. 1. In further embodiments, the frame 1910 can be attached directly to structures and/or members other than a belt or web. For example, in some embodiments the frame 1910 could be bolted, fastened, or otherwise attached directly to a child seat, passenger restraint, or other portion of a vehicle, etc. In other embodiments, an adjustable buckle, a web adjuster, or a web retractor can be attached or otherwise incorporated into the latch assembly 1900 or otherwise incorporated into the latch assembly 1900 toward the proximal end portion 1904. In such embodiments, the belt or web can be operably coupled to the latch assembly 1900 via the adjustable buckle, web adjuster, retractor, etc.

As with the latch assemblies 100, 500, 1200 and 1500 described in detail above, the latch assembly 1900 can be used in a number of different restraint systems and in a number of different arrangements. Accordingly, the latch assembly 1900 described herein is not limited to the particular arrangements or combinations illustrated in the accompanying figures, but can be utilized in a wide variety of applications and arrangements to secure child seats, persons, cargo, equipment, etc. in moving vehicles.

A distal end portion 1906 of the latch assembly 1900 includes a mouth 1980 configured to receive the anchor 1502. A pivotal lever or latch 1930 is operably coupled to the frame 1910 proximate the mouth 1980 by a first guide feature 1946*a* and a second guide feature 1946*b*. The first guide feature 1946*a* is moveably received in a first guide track or opening 1916 in the frame 1910, and the second guide feature 1946*b* moveably received in a second opening 1918 in the frame 1910. The guide features 1946, the openings 1916 and 1918, and the latch 1930 can be at least generally similar in structure and function to the corresponding features, openings, and latch of the latch assembly 1500 described in detail above with reference to FIGS. 15A though 18F.

The frame 1910 includes a first jaw 1912 that cooperates with an opposing second jaw 1932 on the latch 1930 to capture and retain the anchor 1502 when the anchor 1502 is inserted into the mouth 1980. As shown in FIG. 19B, the latch assembly 1900 further includes a biasing member 1920 (e.g., a coil spring). As described in greater detail below, the biasing member 1920 pushes against an ejector 1990 during operation of the latch assembly 1900.

In one aspect of this embodiment, the latch 1930 is actuated via a pull strap 1950 that is operably coupled to a handle or knob 1951. The pull strap 1950 can be fabricated from a flexible material having suitable strength, such as woven nylon. The knob 1951 is configured so that it can be easily grasped by an operator and pulled to release the latch assembly 1900. The pull strap 1950 is attached to a latch coupling 1953, which in turn is pivotally coupled to the latch 1930 via the first guide feature 1946*a*. Accordingly, as described in greater detail below, when the operator pulls on the knob 1951, the latch coupling 1953 pulls the latch 1930 back to open the latch 1930 and release the anchor bar.

Figure 20A:
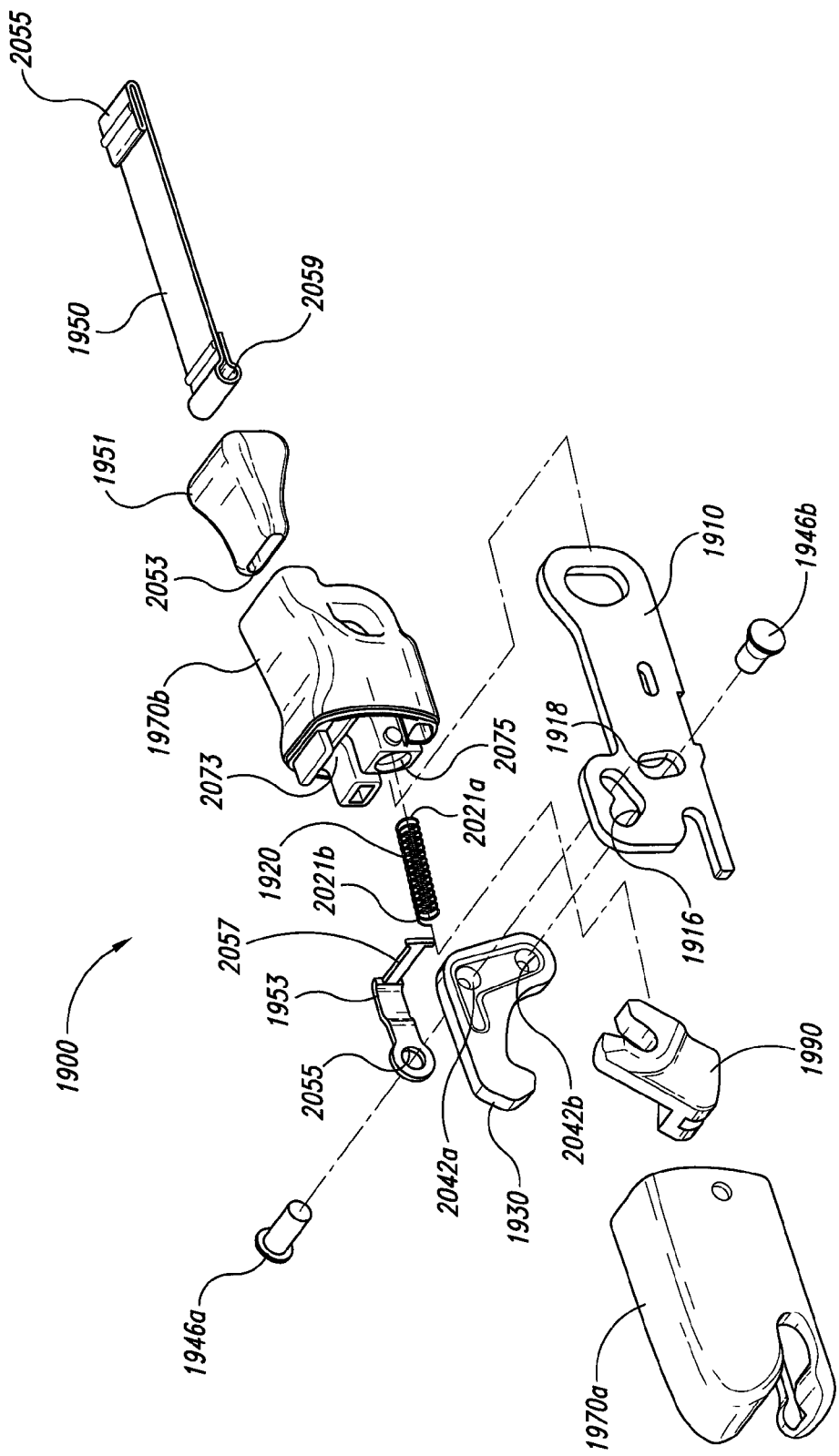
FIGS. 20A and 20B are exploded front and rear isometric views, respectively, of the latch assembly of FIGS. 19A and 19B.
Figure 20B:
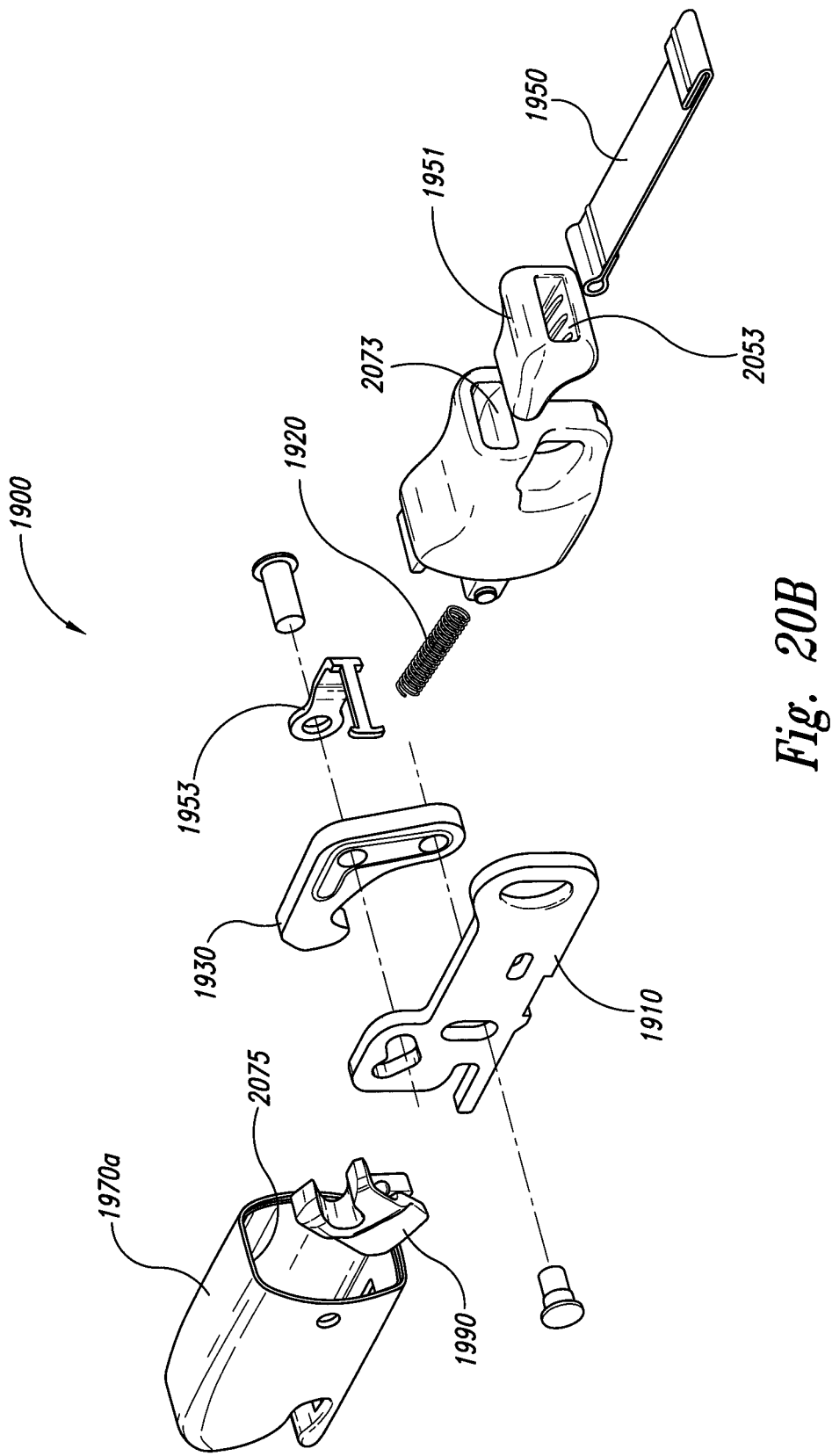

FIGS. 20A and 20B are exploded front and rear isometric views, respectively, of the latch assembly 1900. Referring to FIGS. 20A and 20B together, the knob 1951 includes a through hole 2053 that receives the pull strap 1950. A first end portion 2055 of the pull strap 1950 engages the knob 1951, and a second end portion 2059 includes a loop of material that slides over an arm 2057 of the latch coupling 1953 after passing through a strap aperture 2073 in the second housing portion 1970*b*. In the illustrated embodiment, the first guide feature 1946*a* is a cylindrical pin that that passes through an opening 2055 in the latch coupling 1953 to pivotally attach the latch coupling 1953 to the latch 1930. The first guide feature 1946*a* continues to extend through a first aperture 2042*a* in the latch 1930 and then through the first guide feature opening 1916 in the frame 1910. As described in greater detail below, a distal end portion of the first guide feature 1946*a* extends beyond the frame 1910 and is acted upon by the ejector 1990. The second guide feature 1946*b* passes through the second opening 1918 in the frame 1910 and then into a second aperture 2042*b* in the latch 1930. The guide features 1946 can be press fit in the latch apertures 2042, or they can be retained by staking, swaging, and/or other suitable means known in the art.

A first end portion 2021*a* of the biasing member 1920 is received in a socket 2075 formed in the second housing portion 1970*b*. A second end portion 2021*b* of the biasing member 1920 is operably coupled to the ejector 1990 as described in greater detail below. As shown to good effect in FIG. 20B, the first housing portion 1970*a* is substantially hollow and is configured to receive a portion of the frame 1910, the ejector 1990, and the latch 1930 in an interior region 2075 thereof.

Figure 21:
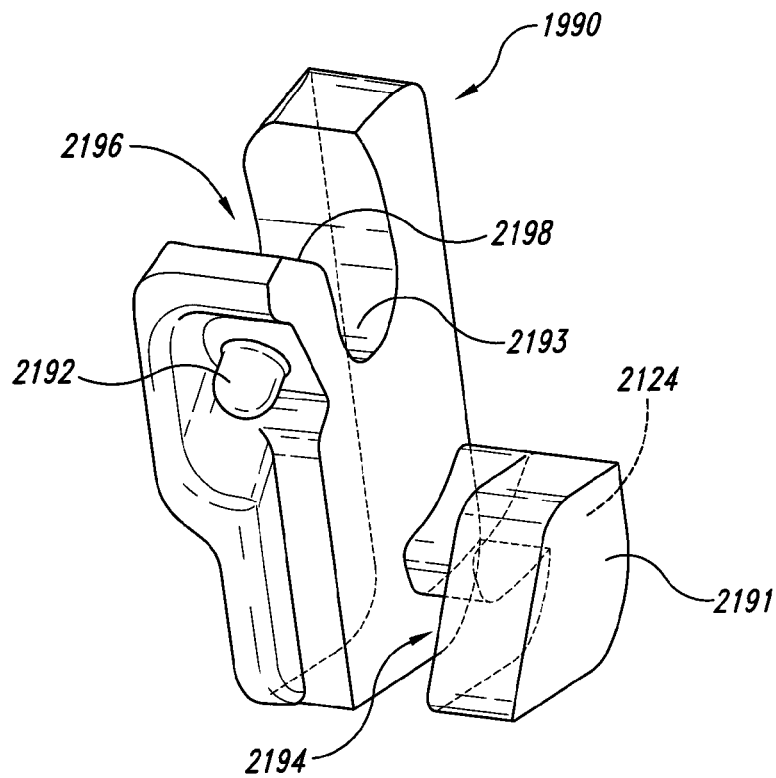
FIG. 21 is an enlarged isometric view of an ejector from the latch assembly of FIGS. 19A and 19B.

FIG. 21 is an enlarged isometric view of the ejector 1990 configured in accordance with an embodiment of the disclosure. Like the ejectors 1290 and 1590 described in detail above, the ejector 1990 can be manufactured from various types of suitable materials including suitable plastic (e.g., polypropylene or other thermal plastic polymers), thermosetting resins, fiber-reinforced resins, Delrin®, and/or other suitable materials known in the art including suitable metallic materials. The ejector 1990 includes a biasing member engagement feature 2192. In the illustrated embodiment, the engagement feature 2192 is a short stud or bump configured to be inserted into the second end portion 2021*b* of the biasing member 1920 to hold the second end portion 2021*b* in position.

In another aspect of this embodiment, the ejector 1990 includes an angled blocking surface 2198 adjacent to a notch or recess 2196. The recess 2196 can form a guide track that includes a seat (e.g., a generally semi-circular seat) 2193 configured to receive the distal end portion of the first guide feature 1946*a* during operation of the latch assembly 1900. The ejector 1990 further includes a base portion 2191 having a bearing surface 2124 and a slot or channel 2194. The bearing surface 2124 is configured to contact the anchor 1502 when the latch assembly 1900 is engaged with the anchor 1502 (FIGS. 19A and 19B). The channel 2194 is configured to slidably fit over the first jaw 1912 of the frame 1910 (FIG. 19B).

Figure 22A:
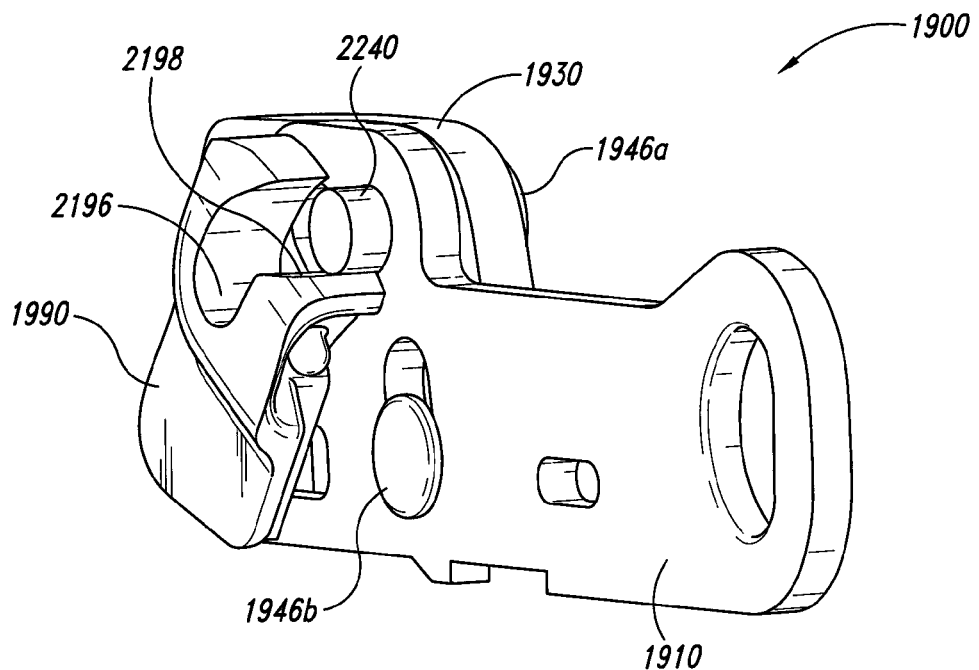
FIGS. 22A and 22B are rear and front isometric views, respectively, of a sub-assembly of the latching components of FIGS. 19A and 19B.
Figure 22B:
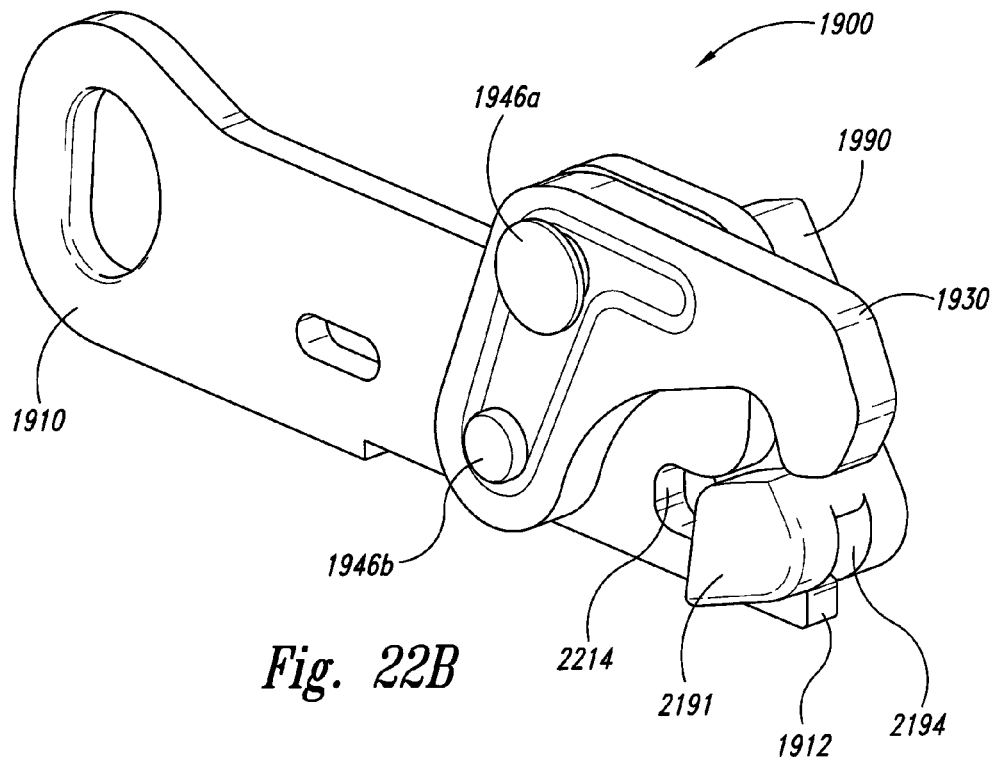

FIGS. 22A and 22B are rear and front isometric views, respectively, illustrating the arrangement of the ejector 1990 and the latch 1930 on the frame 1910 in accordance with an embodiment of the disclosure. Other components of the latch assembly 1900 have been omitted from these Figures for purposes of illustration. Referring to FIGS. 22A and 22B together, the ejector 1990 is supported on the frame 1910 so that a portion of the first jaw 1912 extends through the channel 2194. When the ejector 1990 is in the forward position shown in FIGS. 22A and 22B, the blocking surface 2198 bears against the first guide feature 1946*a* and holds the latch 1930 in the open position. As described in greater detail below, when an anchor or other member presses against the bearing surface 2124 and pushes the ejector 1990 back into the mouth 1980, the base portion 2191 rotates rearwardly into a recess 2214 formed in the frame 1910 and the blocking surface 2198 releases the first guide feature 1946*a* allowing the latch 1930 to close.

Figure 22C:
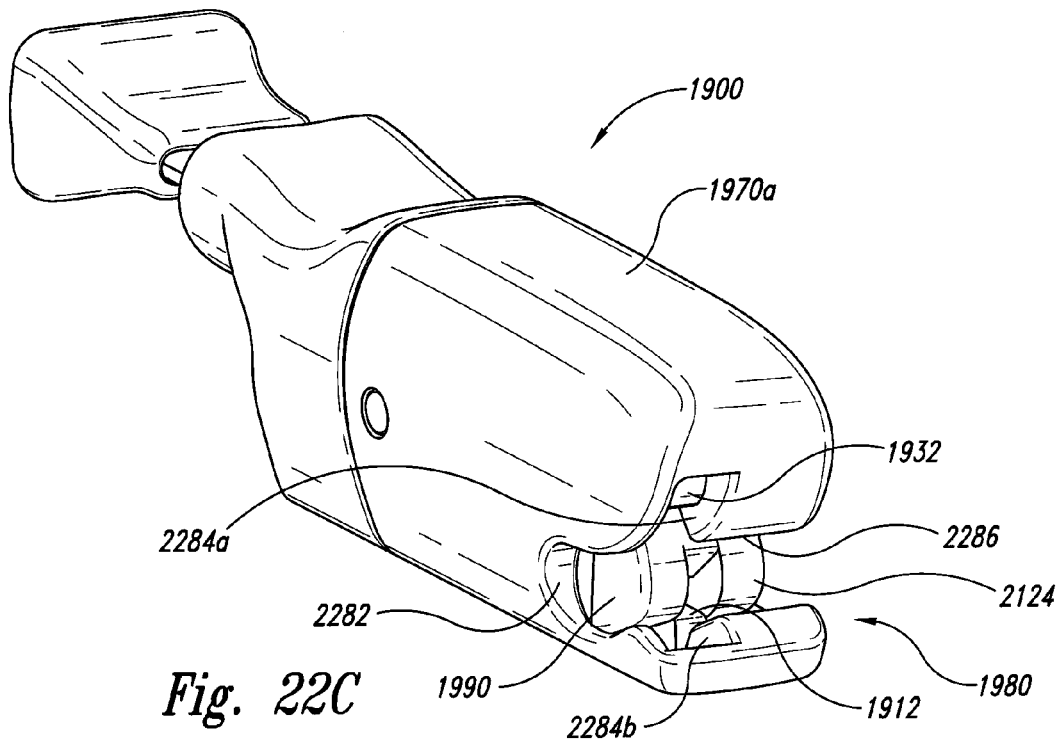
FIG. 22C is a front isometric view illustrating aspects of the mouth of the latch assembly of FIGS. 19A and 19B.

FIG. 22C is a front isometric view of the latch assembly 1900 illustrating various aspects of the mouth 1980. In the illustrated embodiment, the mouth 1980 includes a cutout or opening 2282 formed in the first housing portion 1970*a*. The opening 2282 includes a first slot portion 2284*a* and an opposing second slot portion 2284*b* that accommodate movement of the latch jaw 1932 between the open position (shown) and the closed position, respectively. The opening 2282 also includes an edge portion 2286 that contacts the bearing surface 2124 of the ejector 1990 and acts as a stop to limit forward movement of the ejector 1990 under force of the biasing member 1920 (FIG. 19B).

Figure 23C:
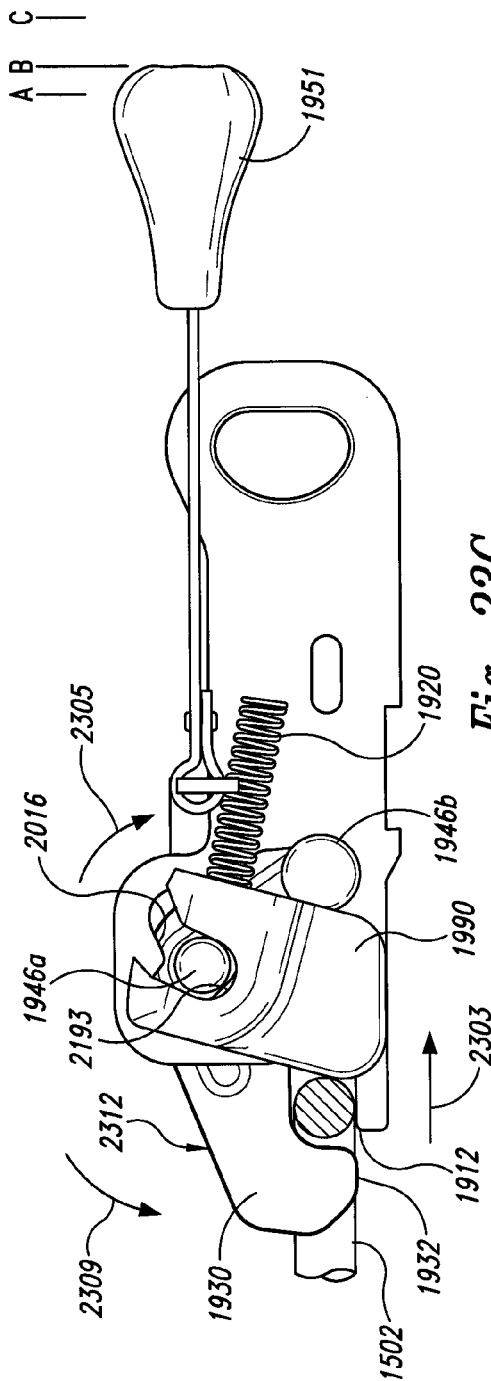
Figure 23D:
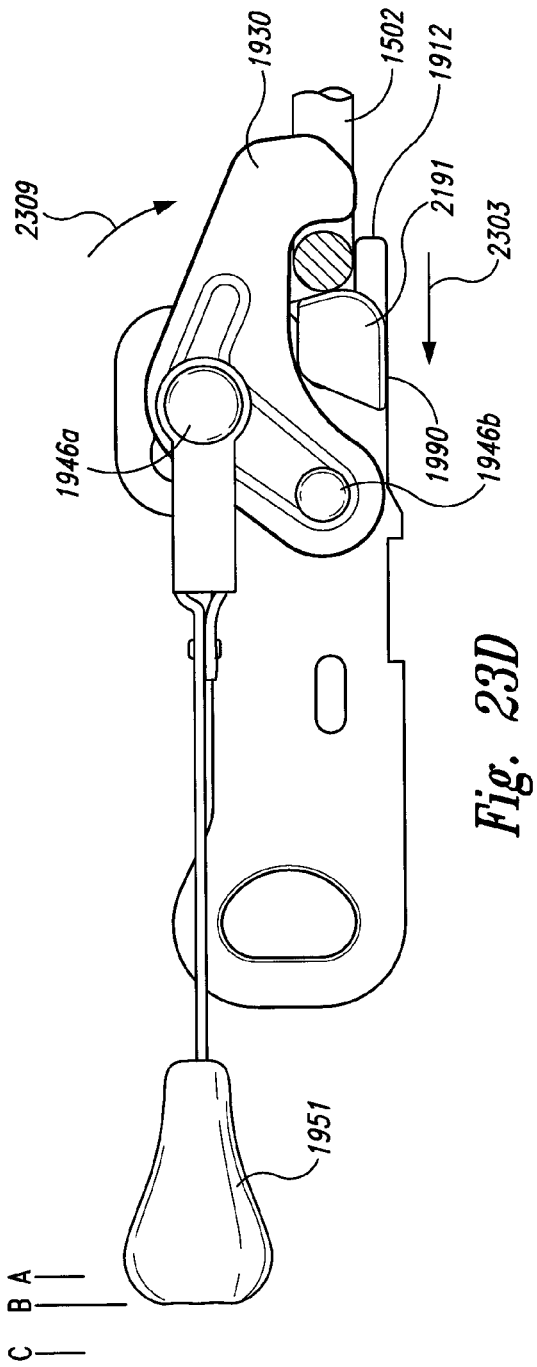
Figure 23E:
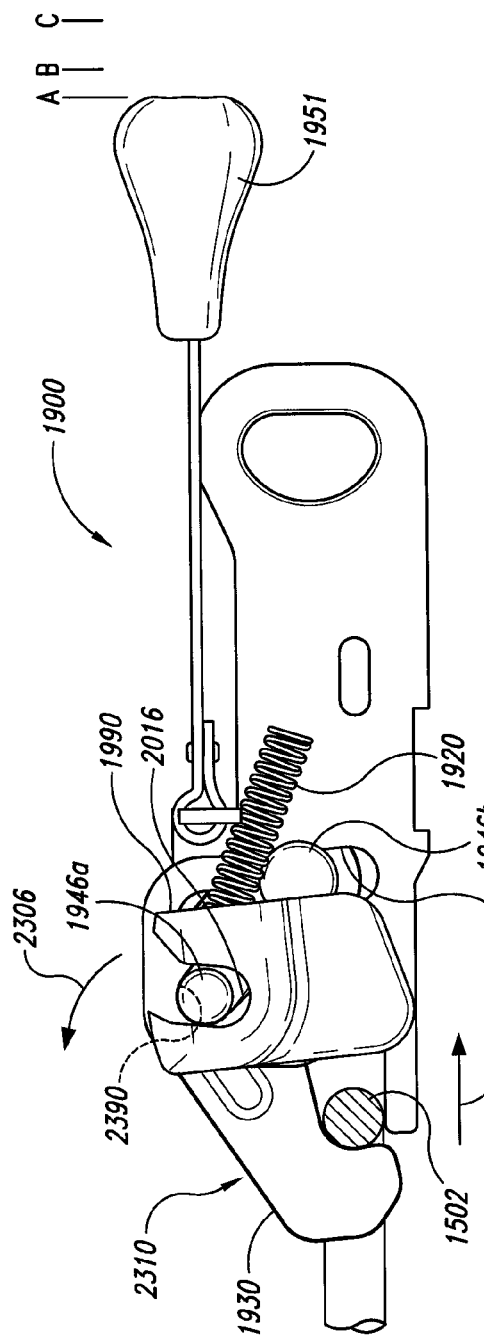
Figure 23F:
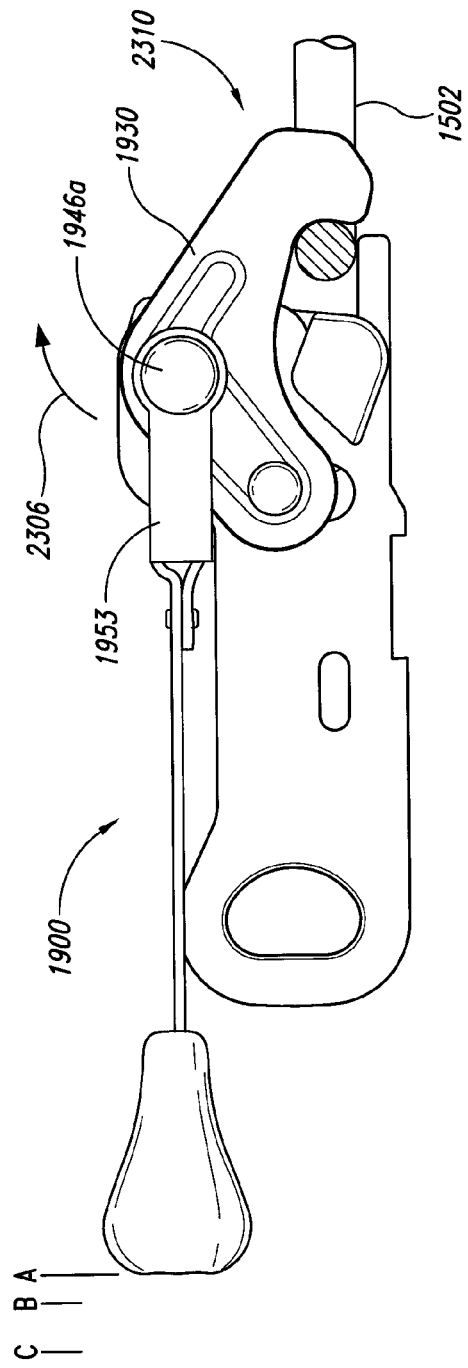

FIGS. 23A-F are a series of side views illustrating various stages of operation of the latch assembly 1900 with the housing 1971 removed for purposes of illustration and clarity. FIGS. 23A, 23C and 23E are left side views of the latch assembly 1900, and FIGS. 23B, 23D and 23F are corresponding right side views of the latch assembly 1900. Movement of the latch 1930 during operation of the latch assembly 1900 can be at least generally similar, if not the same, as movement of the latch 1530 during operation of the latch assembly 1500 as described above with reference to FIGS. 18A-18F. For example, as with the latch assemblies 1200, 1500, etc. described above, the latch 1930 can pivot about two spaced apart pivot points as it moves to the fully open or fully closed positions.

Referring first to FIGS. 23A and 23B, the compressive force of the biasing member 1920 pushes the ejector base portion 2191 forward and drives the ejector blocking surface 2198 against the first guide feature 1946*a*. This holds the first guide feature 1946*a* against the upper end portion of the first opening 2016, which in turn holds the latch 1930 in an open or first position 2314. The latch 1930 remains in the open position prior to attachment to the anchor 1502 (shown in partial cross-section in FIGS. 23A-F for clarity). When the latch 1930 is in the open position 2314, the proximal end portion of the pull strap 1950 or, in this case the knob 1951, is in position C. To attach the latch assembly 1900 to the anchor 1502, the anchor 1502 is pressed against the ejector bearing surface 2124 to push the ejector 1990 back in the direction of arrow 2303. This causes the ejector 1990 to initially rotate about the first guide feature 1946*a* against the compressive force of the biasing member 1920.

Referring next to FIGS. 23C and 23D, as the anchor 1502 continues to drive against the ejector 1990, the biasing member 1920 drives the upper portion of the ejector 1990 forward, urging the first guide feature 1946*a* forward and downward toward the bottom of the "V"-shaped first opening 2016 as shown in FIG. 23C. This rotates the latch 1930 downwardly in the direction of arrow 2309 about the second guide feature 1946*d* toward a second position 2312. In this embodiment, the second guide feature 1946*b* (or a cross-sectional center portion thereof) can represent a first pivot point of the latch 1930. This closing rotation of the latch 1930 causes the pull knob 1951 to move forward from position C to position B. When the latch 1930 is in the second position 2312, the anchor 1502 is captured between the first jaw 1912 and the second jaw 1932.

Turning next to FIGS. 23E and 23F, as the biasing member 1920 continues to push against the upper portion of the ejector 1990, the ejector 1990 drives the first guide feature 1946*a* out of the seat 2193 and toward the forward end portion of the first opening 2016. This also causes the second guide feature 1946*b* to move upwardly through the second opening 2018. As the guide features 1946 move along these respective paths, the latch 1930 rotates about the anchor 1502 in the direction 2306 to a third or closed position 2310. Accordingly, in this embodiment the anchor 1502 (or a cross-sectional center portion thereof) can represent a second pivot point of the latch 1930. As the latch 1930 rotates to the closed position, the knob 1951 moves forward to position A. If a force is applied to the frame 1910 in the direction of arrow 2303 by, for example, a substantial pull on the belt 112 (FIG. 19A), the first guide feature 1946*a* will bear against an upper edge region 2390 of the forward end portion of the first opening 2016 and hold the latch 1930 in the closed position 2310.

The sequential motion of the ejector 1990 as shown in FIGS. 23A, 23C, and 23E can be described as an "over-center" rocking motion that controls movement of the latch 1930. In one embodiment, the guide features 1954 make can make a "clicking" noise as they arrive at the end portions of their respective paths to audibly confirm to the user that the latch 1930 is in the fully closed position.

The latch assembly 1900 can be released in a manner that is at least generally similar to the manner described above for the latch assembly 1500. For example, the user or operator can initiate release by pulling the strap 1950 back in the direction of arrow 2303 from position A to position B. As shown in FIGS. 23C and 23D, when the strap 1950 is pulled with a force sufficient to overcome the compression force of the biasing member 1920, the first guide feature 1946*a* moves away from the forward end portion of the first opening 2016 to the bottom of the "V" adjacent to the ejector seat 2193. Simultaneously, the second guide feature 1946*b* moves downwardly through the second opening 2018. This movement causes the latch 1930 to rotate about the anchor 1502 in the direction of arrow 2305 from the closed position 2310 (FIGS. 23E and 23F) to the second position 2312.

Returning next to FIGS. 23A and 23B, to continue releasing the latch assembly 1900, the user continues pulling the knob 1951 in the direction of arrow 2303 from position B to position C. As the pull strap 1950 moves in this direction, it pulls the first guide feature 1946*a* back toward the aft end portion of the first opening 2016. The second guide feature 1946*b*, however, remains at the lower end portion of the second opening 2018. As a result, the latch 1930 rotates or pivots about the second guide feature 1946*b* in the direction of arrow 2307 from the second position 2312 toward the first or open position 2314. When the knob 1951 reaches position C, the latch 1930 is in the open position 2314 and the latch assembly 1900 can be removed from the anchor 1502. As explained above, in this position the biasing member 1920 drives the blocking surface 2198 of the ejector 1990 against the first guide feature 1946*a* and holds the latch 1930 in the open position 2314.

From the foregoing, it will be appreciated that specific embodiments of the disclosure have been described herein for purposes of illustration, but that various modifications may be made without deviating from the spirit and scope of the various embodiments of the disclosure. For example, the latch assemblies can include a different number of pivot points or pivot points in different locations. Moreover, the latch assemblies can also be coupled to other or different portable passenger restraints, including, for example, forward facing child car seats. Further, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

We claim:

1. A latch assembly for engaging an anchor member, the latch assembly comprising:
 a frame having a first jaw portion and first and second openings proximate the first jaw portion;
 a pivotable latch having a second jaw portion, wherein the latch is operably coupled to the frame by a first guide feature movably received in the first opening and a second guide feature movably received in the second opening;
 an ejector operably coupled between the frame and the latch; and
 a biasing member urging the ejector against the first guide feature to selectively move the latch from an open position to a closed position by pivoting the latch about a first pivot point and then a second pivot point spaced apart from the first pivot point.

2. The latch assembly of claim 1 wherein the frame includes a proximal end portion having a web aperture and a distal end portion proximate the first jaw portion, and wherein moving the ejector toward the proximal end portion causes the ejector to drive the latch to the closed position by pivoting the latch about the first pivot point and then the second pivot point.

3. The latch assembly of claim 1 wherein the frame includes a proximal end portion having a web aperture and a distal end portion proximate the first jaw portion, wherein the ejector includes a base portion having a bearing surface and an upper portion having a recess configured to receive the first guide feature, and wherein pressing the bearing surface toward the proximal end portion of the frame causes the recess to move the first guide feature toward the distal end portion of the frame and pivot the latch about the first pivot point and then the second pivot point.

4. The latch assembly of claim 1 wherein the first opening is a slot having a generally "V" shape.

5. The latch assembly of claim 1 wherein the first opening is a slot having a generally "V" shape with first and second upper end portions and a bottom mid portion, wherein the first guide feature is positioned against the first upper end portion of the "V" when the latch is in the open position, wherein pushing the ejector back against the biasing member causes the ejector to drive the first guide feature toward the bottom mid portion of the "V" and then toward the second upper end portion of the "V" to close the latch.

6. The latch assembly of claim 1 wherein the ejector includes a notch configured to receive the first guide feature, wherein pushing the ejector back against the biasing member causes the first guide feature to move into the notch.

7. The latch assembly of claim 1 wherein the ejector includes a blocking surface adjacent to a notch configured to receive the first guide feature, wherein the blocking surface holds the first guide feature in the open latch position, and wherein pushing the ejector back against the biasing member causes the first guide feature to move off of the blocking surface and into the notch.

8. A latch assembly for releasably securing a child seat to an anchor in a vehicle, the latch assembly comprising:
 a frame having a proximal end portion and a distal end portion, the frame further having a first opening, a second opening, and a first jaw proximate the distal end portion;
 a latch movably coupled to the frame proximate the distal end portion by a first guide feature movably received in the first opening and a second guide feature movably received in the second opening, wherein the latch includes a second jaw spaced apart from the first jaw to define a latch mouth therebetween;
 an anchor ejector operably coupled to the frame between the first and second jaws, wherein movement of the ejector toward the proximal end portion of the frame causes the second jaw to move toward the first jaw as the latch pivots about a first pivot point and then a second pivot point spaced apart from the first pivot point; and
 a biasing member urging a first portion of the ejector against the first guide feature, wherein movement of a second portion of the ejector toward the proximal end portion of the frame causes the first portion of the ejector to drive the first guide feature toward the distal end of the frame.

9. A latch assembly for releasably securing a child seat to an anchor in a vehicle, the latch assembly comprising:
 a frame having a proximal end portion and a distal end portion, the frame further having a first opening, a second opening, and a first jaw proximate the distal end portion;
 a latch movably coupled to the frame proximate the distal end portion by a first guide feature movably received in the first opening and a second guide feature movably received in the second opening, wherein the latch includes a second jaw spaced apart from the first jaw to define a latch mouth therebetween; and
 an anchor ejector operably coupled to the frame between the first and second jaws, wherein movement of the ejector toward the proximal end portion of the frame causes the second jaw to move toward the first jaw as the latch pivots about a first pivot point and then a second pivot point spaced apart from the first pivot point, wherein the ejector includes a blocking surface, and wherein the blocking surface bears against the first guide feature to hold the latch in an open position.

10. The latch assembly of claim 9 wherein the first and second jaws at least partially define a mouth, and wherein the anchor ejector is slidably coupled to the frame within the mouth.

11. The latch assembly of claim 9 wherein movement of the ejector toward the proximal end portion of the frame causes the latch to pivot from an open position toward a closed position.

12. The latch assembly of claim 9 wherein the first and second guide features are fixedly attached to the latch.

13. The latch assembly of claim 9 wherein the first opening in the frame is a slot having a generally "V" shape, and wherein the ejector rotates over-center as the first guide feature moves from a first end portion of the slot to a second end portion of the slot.

14. The latch assembly of claim 9 wherein movement of the ejector toward the proximal end portion of the frame causes the latch to pivot in a first direction from an open position toward a closed position, and wherein the latch assembly further comprises a release actuator operably coupled to the latch, wherein movement of the release actuator from a first actuator position toward a second actuator position rotates the latch in a second direction about the second pivot point, and wherein continued movement of the release actuator from the second actuator position toward a third actuator position rotates the latch in the second direction about the first pivot point to return the latch to the open position.

15. A latch system for releasably coupling a web to an anchor in a vehicle, the latch system comprising:
- a frame having a proximal end portion for engaging the web and a distal end portion for engaging the anchor;
- a latch movably coupled to the frame toward the distal end portion via a first guide feature and a second guide feature; and
- an ejector operable to hold the latch in an open position via the first guide feature, wherein the latch is movable from the open position to a closed position via a first rotation about a first axis and a second rotation about a second axis spaced apart from the first axis.

16. The latch system of claim 15 wherein the frame includes an elongate slot, wherein the first guide feature extends through the elongate slot, and wherein the ejector is operable to hold the latch in the open position by holding the first guide feature against an end portion of the elongate slot.

17. The latch system of claim 15, further comprising means for releasing the latch system from the anchor by:
- pivoting the latch about the second axis; and
- pivoting the latch about the first axis to move the latch to the open position.

18. The latch system of claim 17 wherein the means for releasing the latch system includes a flexible strap operably coupled to the latch.

19. The latch system of claim 15 wherein rotation of the latch includes the ejector contacting the anchor and driving the latch about the first axis and the second axis.

20. A latch assembly for releasably securing a child seat to an anchor in a vehicle, the latch assembly comprising:
- a frame having a proximal end portion, a distal end portion, and a first jaw proximate the distal end portion;
- a latch movably coupled to the frame via a guide feature and proximate the distal end portion, wherein the latch includes a second jaw configured to move toward the first jaw to engage the anchor in a closed position as the latch rotates in a first direction about a first pivot point and then a second pivot point spaced apart from the first pivot point;
- an elector positionable to engage the guide feature to hold the latch in an open position; and
- a release actuator operably coupled to the latch, wherein pulling the release actuator away from the distal end portion of the frame rotates the latch in a second direction about the second pivot point and then the first pivot point to move the second jaw away from the first jaw to release the anchor and return the latch to an open position.

21. The latch assembly of claim 20 wherein the release actuator includes a flexible strap.

22. The latch assembly of claim 20 wherein the guide feature is a first guide feature, wherein the frame includes a first elongate opening and a second elongate opening, and wherein the latch is movably coupled to the frame by the first guide feature movably received in the first elongate opening and a second guide feature movably received in the second elongate opening.

* * * * *